US008085331B2

(12) United States Patent
Kato et al.

(10) Patent No.: US 8,085,331 B2
(45) Date of Patent: Dec. 27, 2011

(54) SOLID-STATE IMAGING DEVICE, DRIVING METHOD THEREOF, AND CAMERA

(75) Inventors: Yoshiaki Kato, Shiga (JP); Akiyoshi Kohno, Kanagawa (JP); Hiroshi Matsumoto, Osaka (JP); Takeshi Fujita, Kyoto (JP)

(73) Assignee: Panasonic Corporation, Osaka (JP)

( * ) Notice: Subject to any disclaimer, the term of this patent is extended or adjusted under 35 U.S.C. 154(b) by 577 days.

(21) Appl. No.: 12/330,050

(22) Filed: Dec. 8, 2008

(65) Prior Publication Data

US 2009/0160993 A1   Jun. 25, 2009

(30) Foreign Application Priority Data

Dec. 21, 2007  (JP) .................................. 2007-331019
Apr. 18, 2008  (JP) .................................. 2008-109532

(51) Int. Cl.
*H04N 5/335* (2011.01)
(52) U.S. Cl. .......................... 348/312; 348/311; 348/298
(58) Field of Classification Search .................. 348/298, 348/311, 312, 322, E5.091
See application file for complete search history.

(56) References Cited

U.S. PATENT DOCUMENTS

| 7,884,872 | B2* | 2/2011 | Hasuka et al. | ................. | 348/313 |
| 7,982,790 | B2* | 7/2011 | Kato | .............................. | 348/312 |
| 2004/0262703 | A1 | 12/2004 | Kanbe | | |
| 2007/0064138 | A1 | 3/2007 | Wada | | |
| 2007/0165128 | A1 | 7/2007 | Kato | | |
| 2007/0235756 | A1 | 10/2007 | Kato | | |
| 2008/0018770 | A1 | 1/2008 | Kato | | |
| 2008/0074527 | A1 | 3/2008 | Kato | | |

FOREIGN PATENT DOCUMENTS

| JP | 2005-093915 A | 4/2005 |
| JP | 2005-109021 A | 4/2005 |

OTHER PUBLICATIONS

English language Abstract and partial translation of JP 2005-093915 A.
English language Abstract of JP 2005-109021 A.

* cited by examiner

*Primary Examiner* — David N Spector
(74) *Attorney, Agent, or Firm* — Greenblum & Bernstein, P.L.C

(57) ABSTRACT

An objective of the present invention is to provide the solid-state imaging device and the driving method thereof which can control: a poor picture quality, such as blooming, to maximize a dynamic range of the photodiode; and a poor picture quality resulted from an incomplete read-out operation. A solid-state imaging device in the present invention includes: a solid-state imaging element; and a driving pulse controlling unit applying a driving pulse to each of read-out gates of a column CCD. The driving pulse controlling unit transfers in a column direction signal charge within a charge transfer region of the column CCD by applying a column transfer clock having a LOW level voltage and a MIDDLE level voltage, and the LOW level voltage and the MIDDLE level voltage are minus voltages.

18 Claims, 42 Drawing Sheets

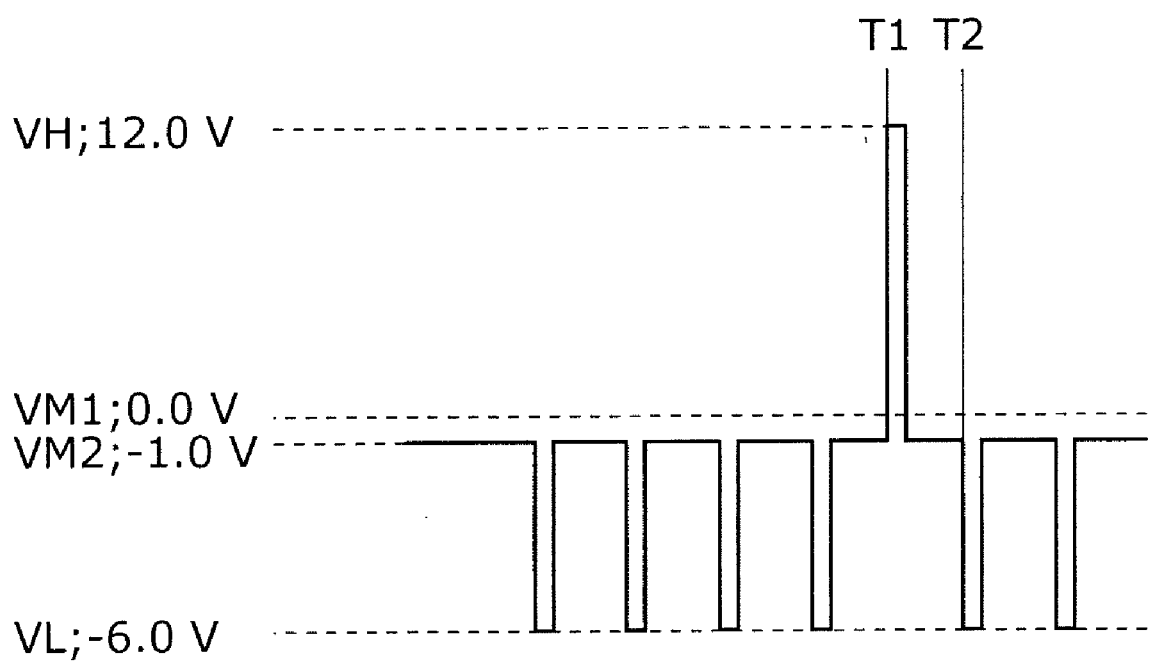

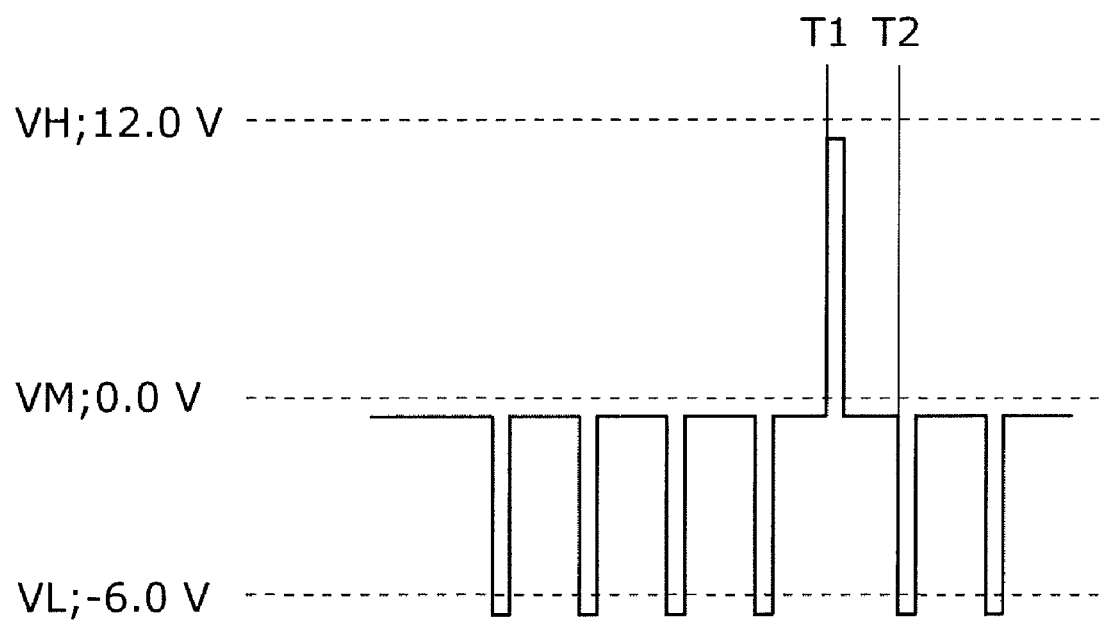
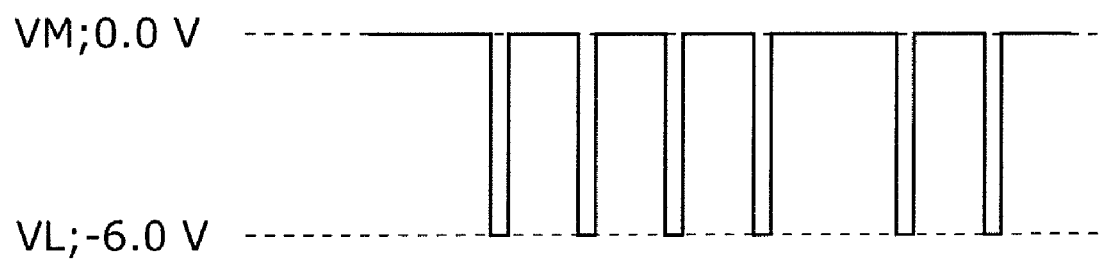

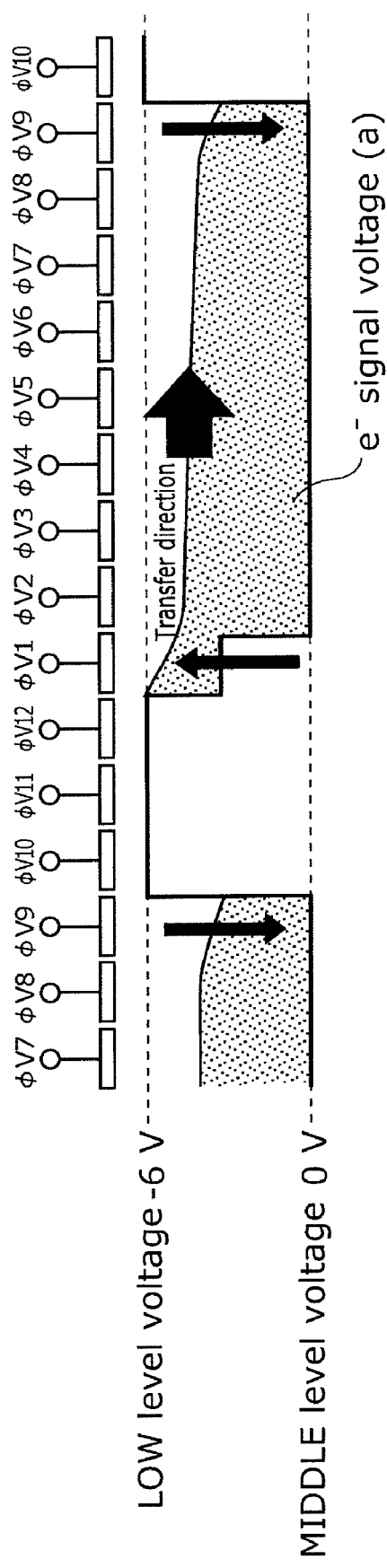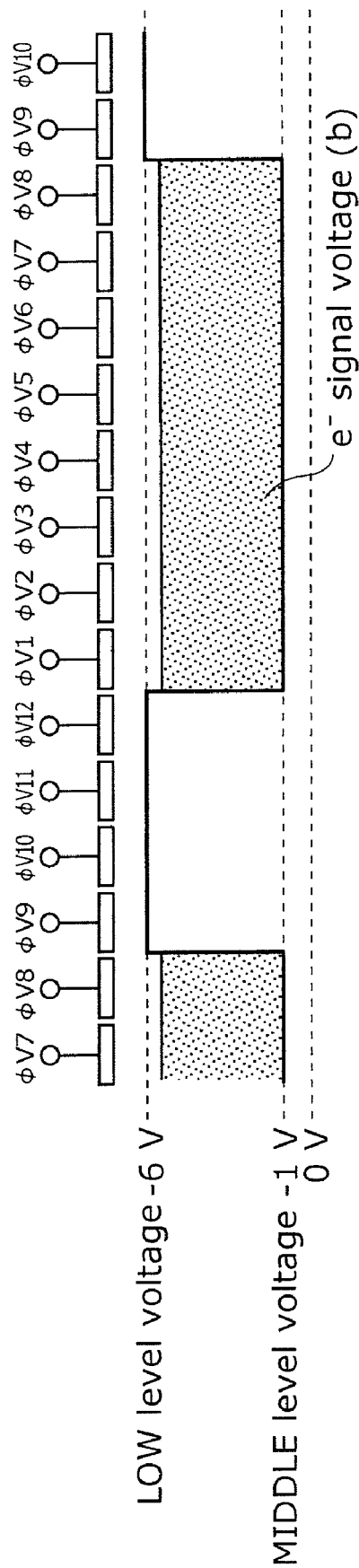

SOLID-STATE IMAGING DEVICE, DRIVING METHOD THEREOF, AND CAMERA

BACKGROUND OF THE INVENTION (1) Field of the Invention

The present invention relates to solid-state imaging devices, such as a CCD image sensor, and driving methods thereof, and particularly to a technique for isolating a photodiode.

(2) Description of the Prior Art

Recent solid-state imaging devices have achieved high-pixel density of 10 million pixels or more, which allows the users to record a still picture as clear as a picture taken on silver film, and a moving picture. Along with the introduction of the devices having the high-pixel density, a pitch of a unit pixel size of a solid-state imaging device becomes smaller than 2 μm, and the unit pixel size continues to be miniaturized. With reference to an interline-transfer solid-state imaging device (ITCCD) as an example, a structure of a conventional solid-state imaging device and a driving method thereof (Patent Reference: Japan Unexamined Patent Application Publication No. 2005-93915) shall be described hereinafter.

FIG. 1 is a schematic block diagram of a conventional ITCCD.

The ITCCD includes: a photodiode 532 provided two-dimensionally on a semiconductor substrate (not shown); a column CCD 533 for transferring in a column direction signal charge accumulated in the photodiode 532; a row CCD 535 for transferring in a row direction the signal charge transferred by the column CCD 533; and an output unit 536 detecting, and outputting the signal charge transferred by the row CCD 535.

FIG. 2 is a cross-sectional view of the conventional ITCCD (a cross-sectional view taken from the line A-A' of FIG. 1).

A p-type well region 538 is formed in an n-type semiconductor substrate 537. In the p-type well region 538, a highly-concentrated n-type semiconductor region (signal charge accumulation region) 539 and a highly-concentrated p-type semiconductor region (positive charge accumulation region) 540, composing the photodiode 532, is formed. On the n-type semiconductor region 539 is formed.

Further, in the p-type well region 538, an n-type channel region (charge transfer region) 541 composing the column CCD 533 is formed. The p-type semiconductor region 542 is formed under the channel region 541. On a side of the channel region 541, a p-type channel stop region 543 is formed.

A transfer electrode 546, serving as a read-out electrode and a transfer electrode, is formed above the semiconductor substrate 537 via an insulation film 545. Over the transfer electrode 546, a photo-shield film 548 is formed via an interlayer insulating film 547.

Here, the transfer electrode 546 includes: a transfer electrode serving as a read-out electrode for reading out the signal charge from the photodiode 532 to the column CCD 533 (also referred to as "read-out gate", hereinafter); and a transfer electrode not serving as a read-out electrode, that is, only for transferring the signal charge in a column direction (also referred to as "non read-out gate", hereinafter).

FIG. 3 shows a driving pulse controlling unit driving the column CCD 533. FIG. 4 shows a wave form of a voltage pulse provided from the driving pulse controlling unit (φV pulse). It is noted that FIG. 4 shows a wave form of a voltage pulse applied to the read-out gate. The wave form of the voltage pulse applied to the non read-out gate is a wave form of which the voltage pulse illustrated in FIG. 4 has no HIGH level voltage VH.

The driving pulse controlling unit generates a voltage pulse (column transfer pulse) out of the incoming HIGH level voltage VH, a MIDDLE level voltage VM, and a LOW level voltage VL.

In the ITCCD structured above: the HIGH level voltage VH is applied to the read-out gate at a signal charge read time T1; and the signal charge accumulated in the photodiode 532 is read out to the column CCD 533, before the voltage pulse becomes the MIDDLE level voltage VM. Then, as shown in a voltage change at T2, voltage changes of the MIDDLE level voltage VM and the LOW level voltage VL are applied to the read-out gate and the non read-out gate, and thus, the signal charge is transferred in a column direction.

When the MIDDLE level voltage VM is applied to either the read-out gate or the non read-out gate, the underneath of the gate is in a state of accumulating the signal charge, so that the signal charge (electron) is accumulated. Meanwhile, when the LOW level voltage VL is applied, the underneath of the gate is in a barrier state. Hence, the signal charge is displaced. Several read-out gates and several non read-out gates form a group. Either the MIDDLE level voltage VM or the LOW level voltage VL is applied to each of the read-out gates or non read-out gates, so that signal charge in each of the photodiodes is transferred in a column direction without mixing.

While the HIGH level voltage VH is not applied to the read-out gate, photo-electrically converted electrons are accumulated in the photodiode 532 until the next HIGH level voltage VH is applied. Here, a large amount of incident light causes the photodiode 532 to be saturated with the signal charge until the next HIGH level voltage VH is applied, so that the signal charge exudes to a neighboring column CCD 553, and causes blooming. In order to avoid this, a typical technique is to extract excessive signal charge to an overflow drain (not shown) in a deep part of the substrate.

SUMMARY OF THE INVENTION

A typical disadvantage caused by the conventional solid-state imaging device and the method thereof is that potential control at a gate portion (well region near the read-out gate) becomes difficult due to reduction of the area of a region in which the read-out gate is formed. As a result of miniaturization of a unit pixel, the signal charge tends to exude, such as blooming. In other words, even though enough distance and dopant concentration are essential in order to form an isolation between a photodiode and a column CCD, the miniaturization fails to keep the distance, and an enough potential barrier cannot be secured between the photodiode and the column CCD. Thus, the blooming control becomes difficult.

In addition, in the case where: the distance between the photodiode and the column CCD is decreased; and the dopant concentration in the well region between the photodiode and the column CCD is increased, the charge transfer from the photodiode to the column CCD tends to be incomplete in a signal charge read-out operation. Thus, it is difficult to control the dopant concentration and the potential, miniaturizing a unit pixel. The objective of Patent Reference; namely, Japanese Unexamined Patent Application Publication No. 2005-93915 is to secure a potential barrier without increasing dopant concentration in a well region between a photodiode and a column CCD. However, further miniaturization of unit pixels clearly hinders the achievement of the objective.

The present invention is conceived in view of the above problems and has as an objective to provide a solid-state imaging device having miniaturized unit pixels and a driving method thereof which can: maintain isolation between a photodiode and a column CCD to prevent exudation of signal charge; prevent occurrence of residual transfer charge in the signal charge read-out operation; and fully take advantage of the characteristics of the photodiode.

In other words, an objective of the present invention is to provide the solid-state imaging device and the driving method thereof which can control: a poor picture quality, such as blooming, to maximize a dynamic range of the photodiode; and a poor picture quality resulted from an incomplete read-out operation.

In order to achieve the above objectives, a solid-state imaging device in the present invention includes: a solid-state imaging element having a semiconductor substrate of a first conductivity type on which a second conductivity type well region is formed, photodiodes arranged two dimensionally on the semiconductor substrate, each of the photodiodes formed in the well region, and a column CCD having a read-out gate, a non read-out gate, and a charge transfer region, the read-out gate reading out signal charge of the photodiode and transferring the signal charge in a column direction, the non read-out gate transferring signal charge in a column direction, and the charge transfer region, which is formed in the well region, for transferring the read-out signal charge; and a driving pulse controlling unit configured to control the solid-state imaging element by applying a first driving pulse to each of read-out gates, wherein the driving pulse controlling unit transfers in a column direction signal charge within the charge transfer region by applying the first driving pulse to each of the read-out gates, the first driving pulse for alternating a first voltage at a MIDDLE level and a second voltage at a LOW level, and the first and the second voltages are minus voltages with respect to a potential of the well region. Here, the driving pulse controlling unit may generate the first driving pulse upon receiving the first and the second voltages from a power source.

This causes: a first driving pulse of which both of the MIDDLE level voltage (first voltage) and the LOW level voltage (second voltage) have minus voltages to be applied to the read-out gate; and the signal charge to be transferred in a column direction. Hence, a potential increases in the well region separating the column CCD and the photodiode, resulting in a pinning state. As a result, even though saturating the photodiode, the signal charge does not exude to the column CCD. Hence, a deficiency such as blooming can be controlled without increasing dopant concentration in the well region between the photodiode and the column CCD. In other words, the solid-state imaging device in the present invention can control: a poor picture quality, such as blooming, to maximize a dynamic range of the photodiode; and a poor picture quality resulted from an incomplete read-out operation.

In addition, the driving pulse controlling unit may include: a driving pulse generating unit generating a second driving pulse alternating a third voltage at the LOW level and a fourth voltage at the MIDDLE level; and a pulse shifting unit shifting the second driving pulse by a predetermined voltage to generate the first driving pulse.

This makes no additional power source to make the MIDDLE level voltage a minus voltage, and thus, increasing number of parts and power consumption can be controlled.

Further, the driving pulse controlling unit may transfer in a column direction the signal charge within the charge transfer region by applying the second driving pulse to each of non read-out gates.

This causes the first driving pulse applied to the read-out gate and the second driving pulse alternately applied to the non read-out gate to have different MIDDLE level voltage and LOW level voltage. Hence, the charge transfer is performed in a state that a potential step is formed based on a voltage difference between the read-out gate and the non read-out gate. Thus, the potential step accelerates the charge transfer, and a transfer efficiency of the signal charge in transfer operations can be improved.

Moreover, the solid-state imaging element may include a diode, and the pulse shifting unit may include a clamp circuit causing the diode to shift the second driving pulse by a predetermined voltage.

This utilizes a diode within the solid-state imaging element as the diode for the clamp circuit. Thus, the number of parts can be decreased.

In addition, the photodiode includes a first semiconductor region of a second conductivity type formed on a surface of the well region, and a second semiconductor region of a first conductivity type formed under the first semiconductor region, the first and the second semiconductor regions are located beside the charge transfer region, and a side portion of the first semiconductor region, facing to the charge transfer region recedes in a direction away from the charge transfer region with respect to a side portion of the second semiconductor region, facing to the charge transfer region.

This allows the first semiconductor region to be structured with a distance from the charge transfer region. Thus, a potential to isolate the column CCD and the photodiode can be sufficiently decreased at a read-out operation of the signal charge.

It is noted that the first driving pulse and the second driving pulse are described as two kinds of driving pulses in order to show the difference of driving pulse voltages at a column transfer. Instead, several driving pulses each having different timing can also be utilized.

Further, the present invention may also be structured as a solid-state imaging device including: a solid-state imaging element having a semiconductor substrate of a first conductivity type on which a second conductivity type well region is formed, photodiodes arranged two dimensionally on the semiconductor substrate, each of the photodiodes formed in the well region, and a column CCD having a read-out gate and a non read-out gate provided on each of the photodiodes, and a charge transfer region, the read-out gate reading out signal charge of the photodiode, the non read-out gate transferring the signal charge in a column direction, and the charge transfer region, which is formed in the well region, for transferring the read-out signal charge; and a driving pulse controlling unit controlling the solid-state imaging element by applying a driving pulse to each of read-out gates and each of non read-out gates, wherein, in a column transfer period in which transfer of the signal charge in a column direction is performed, the driving pulse controlling unit transfers in a column direction signal charge within the charge transfer region by applying the driving pulse to each of the read-out gates and the non read-out gates, the driving pulse alternating a fifth voltage at a LOW level and a sixth voltage at a MIDDLE level, the driving pulse controlling unit applies a seventh voltage at the MIDDLE level to at least either each of the read-out gates or the non read-out gates in a non column transfer period in which the transfer of the signal charge is suspended, the seventh voltage is a minus voltage with respect to a potential of the well region, the photodiode includes a first semiconductor region of a second conductivity type formed on a surface of the well region, and a second semiconductor region of a first conductivity type formed under the first semiconductor region, the first and the second semiconductor regions are located beside the charge transfer region, and a side portion, of the first semiconductor region, facing to the charge transfer region recedes in a direction away from the charge transfer region with respect to a side portion, of the second semiconductor region, facing to the charge transfer region.

This causes the MIDDLE level voltage (seventh voltage) at the read-out gate and the non read-out gate in the non column transfer period to be a minus voltage. Since the non column transfer period is much longer than the column transfer period, setting the MIDDLE level voltage in the non column transfer period to a minus voltage, and controlling to keep the potential of the read-out gate part (the well region isolating the column CCD and the photodiode) high and to increase hole concentration can significantly reduce blooming and a white defect. In other words, blooming and a white defect can be significantly reduced without increasing dopant concentration of the read-out gate part. Hence, the solid-state imaging device in the present invention can control: a poor picture quality, such as blooming, to maximize a dynamic range of the photodiode; and a poor picture quality resulted from an incomplete read-out operation. Meanwhile, an electric potential difference, which significantly affects capacity of a charge packet in the column transfer period, between the MIDDLE level voltage and the LOW level voltage can be fixed. Thus, reduction of transfer efficiency is not observed.

Further, the first semiconductor region is formed with a distance from the charge transfer region. Thus, a potential to isolate the column CCD and the photodiode at a read-out operation of the signal charge can be sufficiently decreased.

It is noted that the present invention can be implemented as: a driving method utilizing characteristic units included in such a solid-state imaging device as steps; and a program to cause a computer to execute the steps, as well as the solid-state imaging device. As a matter of course, such a program can be distributed via recording media such as a CD-ROM, and transmission media such as the Internet. In addition the present invention can be structured in a camera including the solid-state imaging device.

As the above description has clarified, the solid-state imaging device in the present invention and a driving method thereof allows a well region in the vicinity of a read-out gate to be formed with dopant concentration thereof lowered, which facilitates a read-out operation of signal charge. Further, an effect of the MIDDLE level voltage of the column transfer clocks shifted to minus allows a potential barrier at a gate part to be enlarged in a state other than a moment of the signal charge read-out operation. Thus, overflow of charge from the photodiode to the column CCD can be controlled. As a result, an occurrence of blooming can be reduced and a dynamic range of a photodiode can be maximized.

Hence, the present invention maximizes unit pixel characteristics along with miniaturization of pixels. Thus, a practical value of the present invention is significantly high in today's miniaturizing pixels.

FURTHER INFORMATION ABOUT TECHNICAL BACKGROUND TO THIS APPLICATION

The disclosure of Japanese Patent Application Nos. 2007-331019 filed on Dec. 21, 2007, and 2008-109532 filed on Apr. 18, 2008 including specifications, drawings and claims is incorporated herein by reference in their entirety.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 10 exemplifies column transfer pulses $\phi V1$, $\phi V3$, and $\phi V5$ provided from the driving pulse controlling unit;

FIG. 20B exemplifies column transfer pulses $\phi V1$, $\phi V3$, and $\phi V5$ applied to a read-out gate by the driving pulse controlling unit;

FIG. 20C exemplifies column transfer pulses $\phi V2$, $\phi V4$, and $\phi V6$ applied to a non read-out gate by the driving pulse controlling unit;

FIG. 35A shows potential distribution, in a column transfer period, in a column CCD of the fifth embodiment;

FIG. 35B shows potential distribution, in a column transfer period, in the column CCD of the fifth embodiment;

DESCRIPTION OF THE PREFERRED EMBODIMENTS

Embodiments of the present invention shall be described in detail below, with reference to the drawings.

First Embodiment

Figure 1:
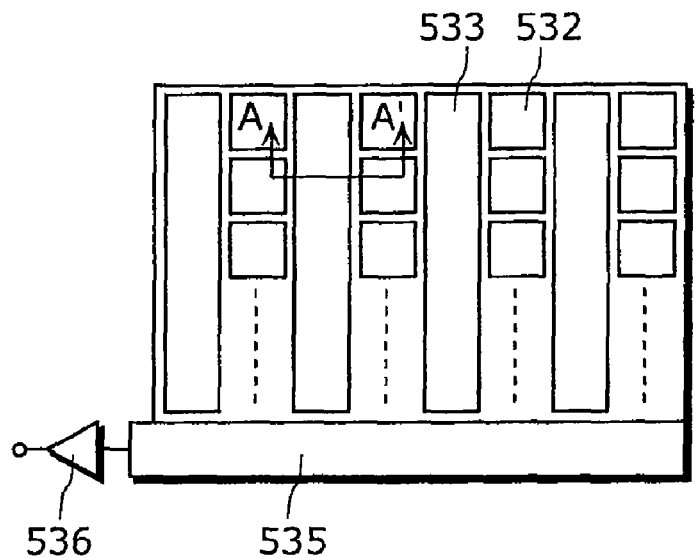
FIG. 1 is a schematic diagram of a conventional ITCCD.
Figure 2:
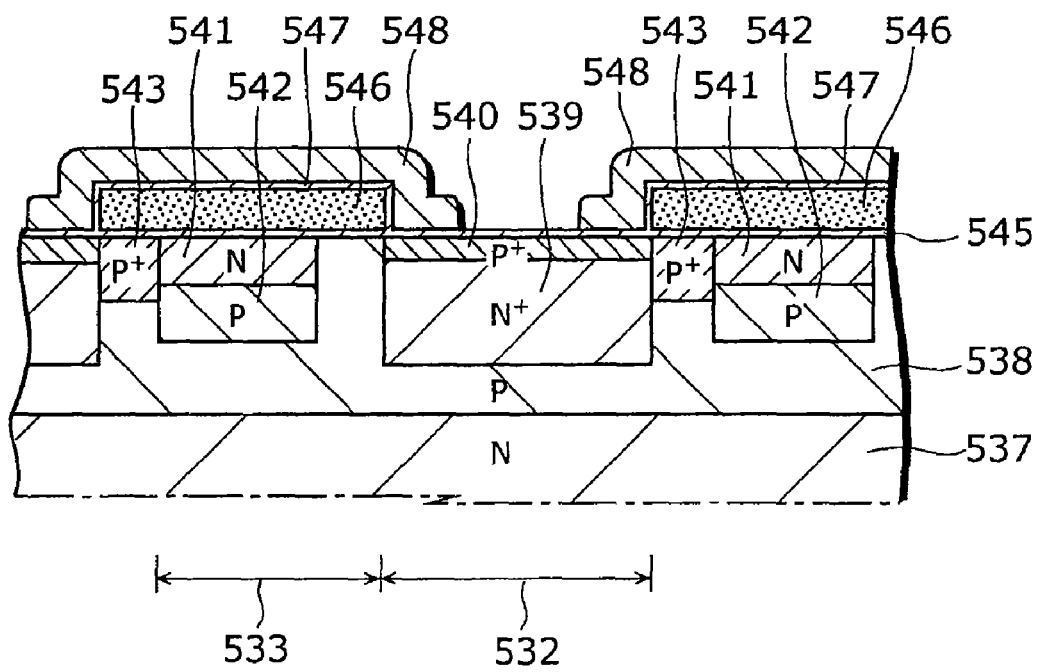
FIG. 2 is a cross-sectional view of the conventional ITCCD (a cross-sectional view taken from the line A-A' of FIG. 1)
Figure 3:
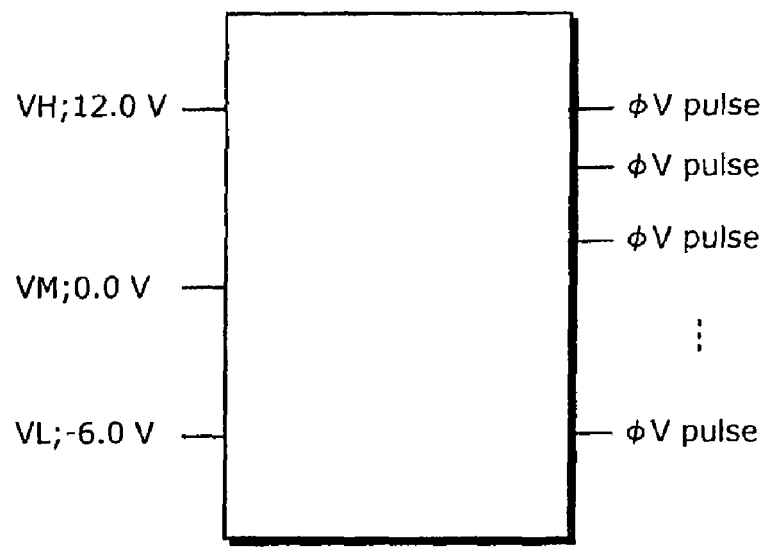
FIG. 3 shows a driving pulse controlling unit driving the column CCD.
Figure 4:
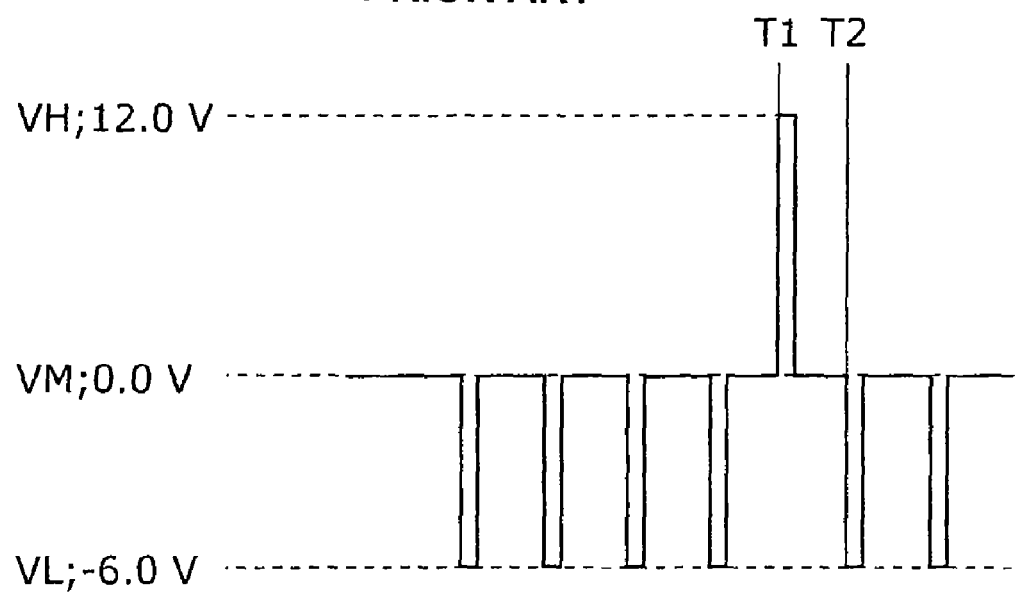
FIG. 4 shows a wave form of a voltage pulse applied to a read-out gate.
Figure 5:
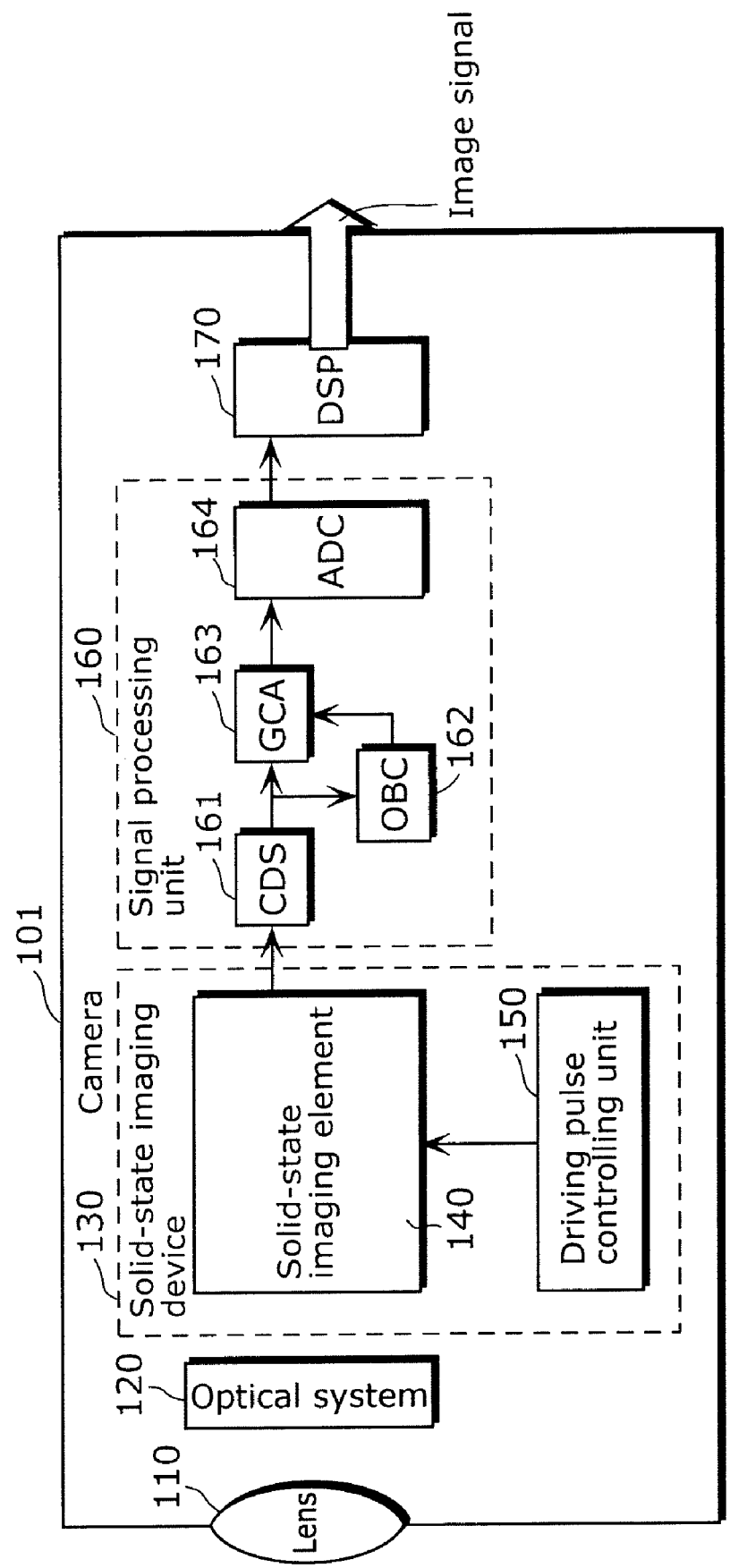
FIG. 5 illustrates a structure of a camera using a solid-state imaging device in a first embodiment of the present invention.

FIG. 5 shows a structure of a camera (imaging device) using a solid-state imaging device in a first embodiment.

As shown in FIG. 5, a camera 101 includes: a lens 110 forming an optical image of an object on a solid-state imaging element; an optical system 120, such as a mechanical shutter and a mirror optically processing the optical images passing through the lens 110; a solid-state imaging device 130 in the present invention; a signal processing unit 160; and a digital signal processor (referred also to as "DSP", hereinafter) 170.

The solid-state imaging device 130 includes a solid-state imaging element 140 and a driving pulse controlling unit 150.

The solid-state imaging element 140, such as an CCD image sensor, generates a pixel signal in accordance with an amount of received light.

Following a direction from the DSP 170, the driving pulse controlling unit 150 controls the solid-state imaging element 140 by generating various driving pulses at various sets of timing. Specifically, the driving pulse controlling unit 150 controls the solid-state imaging element 140 by applying a driving pulse to a read-out gate and a non read-out gate of a column CCD in the solid-state imaging element 140.

The signal processing unit 160 includes: a CDS (Correlated Double Sampling) circuit 161 obtaining a difference between a field through signal and an output signal provided from the solid-state imaging element 140; an OB clamp circuit 162 detecting an OB (Optical Black) level signal provided from the CDS circuit 161; a GCA (Gain Control Amplifier) 163 obtaining a difference between the OB level signal and an effective pixel signal level, and then adjusting a gain of the difference; and an ADC (Analogue-to-Digital Converter) 164 converting an analogue signal provided from the GCA 163 into a digital signal.

The DSP 170 performs signal processing on the digital signal provided from the ADC 164 and controls the driving pulse controlling unit 150.

Figure 6:
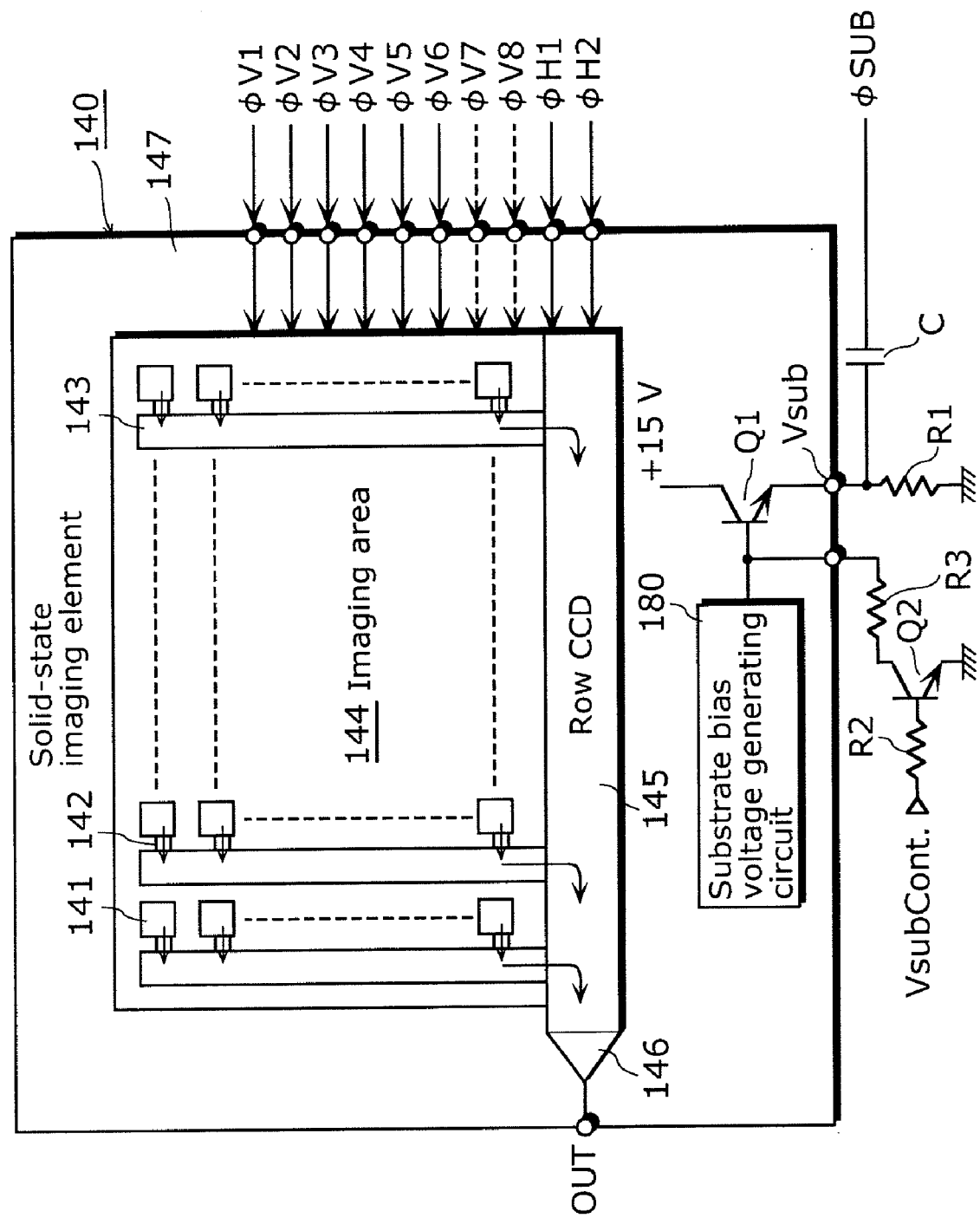
FIG. 6 is a block diagram showing a structure of a solid-state imaging element in the first embodiment.

FIG. 6 is a block diagram showing a structure of the solid-state imaging element 140 illustrated in FIG. 5.

As shown in FIG. 6, the solid-state imaging element 140, an interline-transfer (IT) CCD image sensor, includes: a semiconductor substrate (referred also to as a substrate, hereinafter) 147; photodiodes 141 two-dimensionally arranged on the semiconductor substrate 147; column CCDS 143; a row CCD 145; an output amplifier 146; a substrate bias voltage generating circuit 180; and a transistor Q1. In addition, FIG. 6 also illustrates a transistor Q2, resistors R1 to R3, and a condenser C as a circuit for modulating a bias voltage (referred also to as a substrate bias, hereinafter) Vsub supplied to the semiconductor substrate 147 of the solid-state imaging element 140.

The solid-state imaging element 140 is structured to preliminary increase in saturating a signal charge amount Qs to be decreased by controlling the substrate bias Vsub, expecting the decrease thereof in the event of a frame read-out. Here, the frame read-out is a technique to read out signal charge on an odd-numbered line and signal charge on an even-numbered line on a field-to-field basis with the mechanical shutter of the optical system 120 (not shown) closed upon elapsing an exposure time. The technique is often used when recording a single still picture.

In FIG. 6, the photodiodes 141 are two-dimensionally arranged to form an imaging area 144. Each of the photodiodes 141 converts, to accumulate, incident light to signal charge in accordance with the amount of the incident light. Each of the photodiodes 141 is structured out of a pn-junction photodiode, for example. An application of a read-out pulse to a read-out gate part 142 of the column CCD 143 causes the signal charge accumulated in each of the photodiodes 141 in a column line to be read out to the column CCD 143.

The column CCD 143 is provided for each of column lines having the photodiodes 141, and transfers in a column direction the signal charge read out from each of the photodiodes 141 via the read-out gate part 142 to the row CCD 145. The column CCD 143 has a read-out gate for reading out the signal charge, of the photodiode 141, to the column CCD 143, and a non read-out gate for transferring signal charge in a column direction. Here, the read-out gate and the non read-out gate are provided for each of the photodiodes 141. In the case of an IT solid-state imaging element, transfer electrodes (read-out gate and non read-out gate) driven by column transfer clocks (driving pulse) φV1 to φV6 in six phases are alternatively arranged on each of the column CCDS 143. Upon applying the column transfer clicks φV1 to φV6 to the transfer electrodes, the signal charge read out from each of the photodiodes 141 is sequentially transferred by the associated column CCD 143 in a column direction. This forwards the signal charge for one scanning line (one line) from the column CCDS 143 to the row CCD 145 in a row blanking period. Out of the six phases of the column transfer clocks φV1 to φV6, the second, fourth, and sixth column transfer clocks φV2, φV4, and φV6, possibly obtain alternating two values; namely a LOW level voltage and a HIGH level voltage for a column transfer. On the contrary, each of the transfer electrodes to which the first, third, and fifth column transfer clocks φV1, φV3, and φV5 are applied also serves as a read-out electrode for each of read-out gate parts 142. Thus, the column transfer clocks φV1, φV3, and φV5 possibly obtain sequentially changing three voltages; namely, the LOW level voltage, a MIDDLE level voltage, and the HIGH level voltage. The third value, a HIGH level voltage pulse, is a read-out pulse provided to the read-out gate part 142.

Here, the column transfer clocks φV1 to φV6 provided to the column CCD 143 are an example of first driving pulses in the present invention. The MIDDLE level voltage of the column transfer clocks φV1 to φV6 is an example of a first voltage in the present invention, and the LOW level voltage a second voltage in the present invention.

It is noted that in the case where the column CCD 143 is structured to perform transfer driving on column transfer clocks φV1 to φV8, out of eight phases of the column transfer clocks φV1 to φV8, the second, fourth, sixth, and eighth column transfer clocks, φV2, φV4, and φV6 are applied to the non read-out gate, and the column transfer clocks φV1, φV3, φV5, and φV7 are applied to the read-out gate. The embodiment shall exemplify below the case of the six-phase drive.

In the row blanking period, the row CCD 145 sequentially transfers in a row direction the signal charge, for one line, transferred from the column CCDS 143 within one row scanning period, and forwards the signal via the output amplifier 146. The row CCD 145 is transfer-driven by two phases of row transfer clocks φH1 and φH2, for example, and sequentially transfers in a row direction the signal charge, for one line, transferred from the column CCDS 143 in a row scanning period after the row blanking period.

The output amplifier 146 sequentially converts the signal charge transferred in a row direction by the row CCD 145 into signal voltages, and forwards the signal voltages.

The substrate bias voltage generating circuit 180 generates a substrate bias voltage Vsub, and applies the substrate bias voltage Vsub to the semiconductor substrate 147 via the transistor Q1. Controlled by a VsubCont signal, the substrate bias voltage Vsub is set to a first bias voltage when the transistor Q2 is off, and a second bias voltage having a lower voltage when the transistor Q2 is on.

The above solid-state imaging element 140 is formed on the semiconductor substrate 147. Various kinds of timing signals, including a substrate shutter pulse φSUB for sweeping the signal charge accumulated in the photodiodes 141 to the semiconductor substrate 147, are applied to the semiconductor substrate 147. It is noted that a substrate shutter function by the substrate shutter pulse φSUB is also referred to as an electronics shutter.

Figure 7:
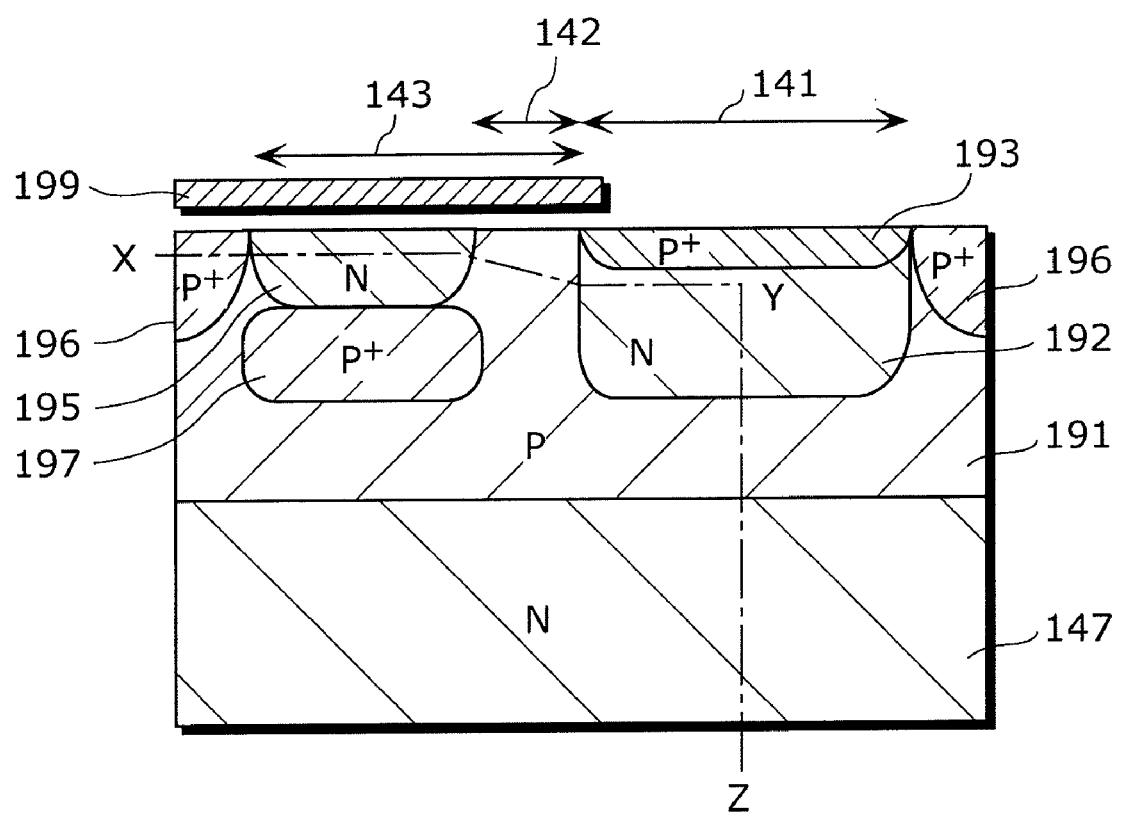
FIG. 7 is a cross-sectional view showing a structure of the solid-state imaging element, in a substrate in-depth direction, of the first embodiment.

FIG. 7 is a cross-sectional view showing a structure of the photodiode 141 and the column CCD143 in a substrate in-depth direction.

As shown in FIG. 7, a p-type well region 191 is formed on a surface of an n-type semiconductor substrate 147. On the surface of the p-type well region 191, a $p^+$-type hole storage region 193 is formed. Under the hole storage region 193, an N-type signal charge accumulating region 192 is formed. The photodiode 141 is structured to have the signal charge accumulating region 192 and the hole storage region 193.

Here, the n-type semiconductor substrate 147 exemplifies a semiconductor substrate of a first conductivity type in the present invention, and the p-type well region 191 a second conductivity type well region in the present invention. Further, the $p^+$-type hole storage region 193 exemplifies a first semiconductor region of a second conductivity type in the present invention, and the n-type signal charge accumulating region 192 a second semiconductor region of a first conductivity type in the present invention.

A charge amount of signal charge e accumulated in the photodiode 141 is determined depending on height of a potential barrier of an overflow barrier OFB structured in the p-type well region 191. The overflow barrier OFB determines the saturating signal charge amount Qs accumulated in the photodiode 141. In the case where accumulated signal charge Qs exceeds the saturating signal charge amount Qs, an exceeding amount of the signal charge goes over the potential barrier and is swept to the semiconductor substrate 147 side.

As described above, the semiconductor substrate 147 has a photodiode 141 structured to have a so-called vertical type overflow drain structure.

Along a crosswise direction in the photodiode 141, the n-type charge transfer region 195 and a $p^+$-type channel stopper region 196 are formed via a portion including the read-out gate part 142 in the p-type well region 191. The charge transfer region 195, a region for transferring the signal charge read out from the photodiode 141, is formed in the p-type well region 191. Under the charge transfer region 195, a $p^+$-type impurity diffusion region 197 is formed in order to prevent a smear component from incorporating.

Above the semiconductor substrate 147, a transfer electrode 199 made of polysilicon, for example, is disposed so as to be located above the charge transfer region 195.

The column CCD 143 is structured to have the charge transfer region 195 and the transfer electrode 199. A portion of the transfer electrode 199 lay above the p-type well region 191 serves as a gate electrode of the read-out gate part 142.

To the semiconductor substrate 147 is applied a substrate bias Vsub determining a charge amount of the signal charge accumulated in the photodiode 141 (in other words, determining a potential of the overflow barrier OFB).

Figure 8:
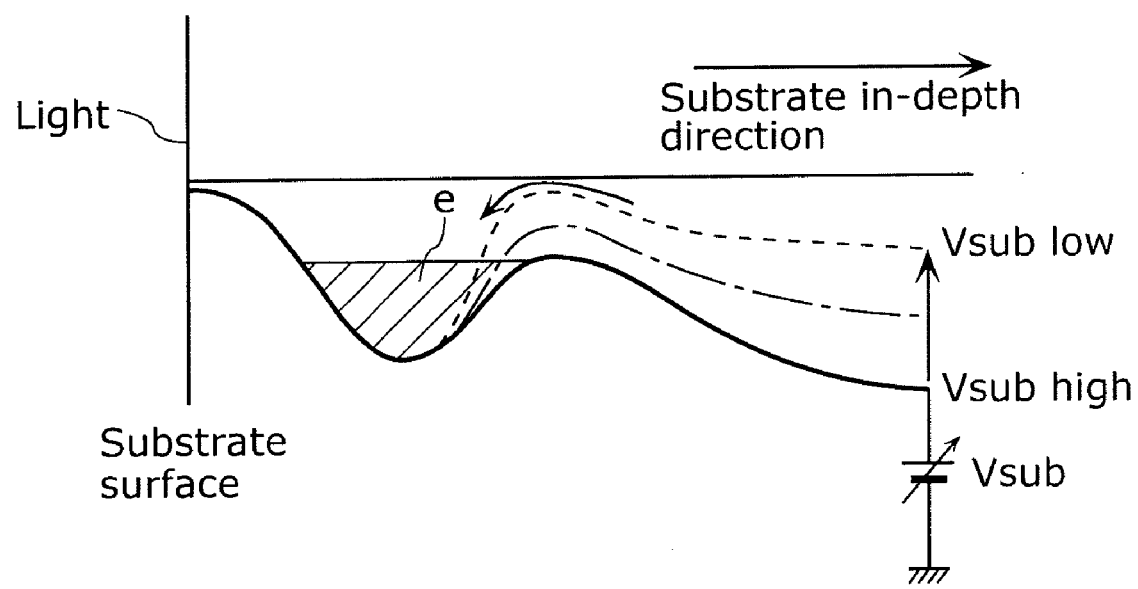
FIG. 8 shows potential distribution in a substrate in-depth direction of the photodiode.

FIG. 8 shows a potential distribution in a substrate in-depth direction of the photodiode 141.

The charge amount of the signal charge e accumulated in the photodiode 141 is decided depending on height of a potential barrier of the overflow barrier OFB. In other words, the overflow barrier OFB determines the saturating signal charge amount Qs accumulated in the photodiode 141. In the case where the accumulated charge amount exceeds the saturating signal charge amount Qs, an exceeding amount of the signal charge goes over the potential barrier and is swept to the semiconductor substrate 147 side. The potential of the overflow barrier OFB in the vertical type overflow drain structure can be controlled by an overflow drain bias; namely, the substrate bias Vsub. In other words, the height of the barrier can be controlled by the substrate bias Vsub.

The driving pulse controlling unit 150 executes a long delay accumulating mode when the DSP 170 issues an instruction that the signal charge should be accumulated in the photodiode 141 for a time of two column periods or more (8 seconds, for example), and the mechanical shutter of the optical system 120 is opened.

When the instructed time elapses and the mechanical shutter is closed, the driving pulse controlling unit 150 finishes the execution of the long delay accumulating mode, transfer-drives the column CCDS 143 alone, and then executes a column CCD sweeping mode for sweeping channel noise of the column CCDS 143. Next, when the execution of the column CCD sweeping mode ends, the driving pulse controlling unit 150 causes the column CCDS 143 to read out the signal charge accumulated in all the photodiodes 141, and to transfer the read out signal charge from the column CCDS 143 to the row CCD 145. Then, the driving pulse controlling unit 150 causes the output amplifier 146 to forward the signal.

Figure 9A:
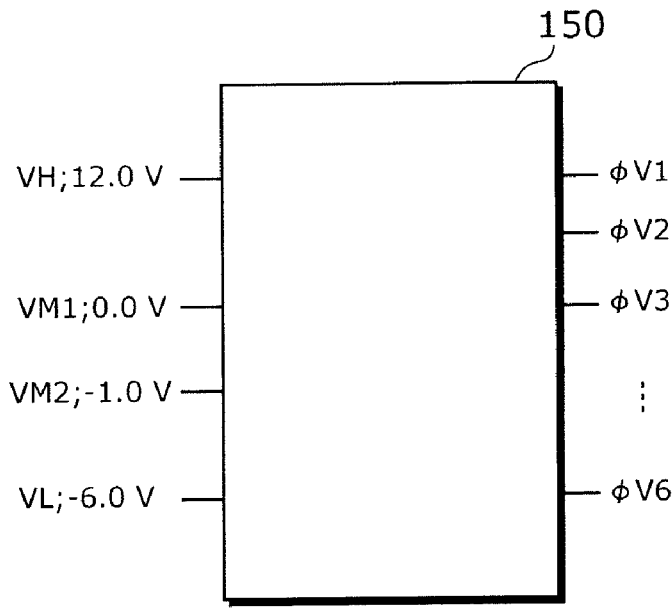
FIG. 9A is a block diagram showing a schematic structure of the driving pulse controlling unit in the first embodiment.
Figure 9B:
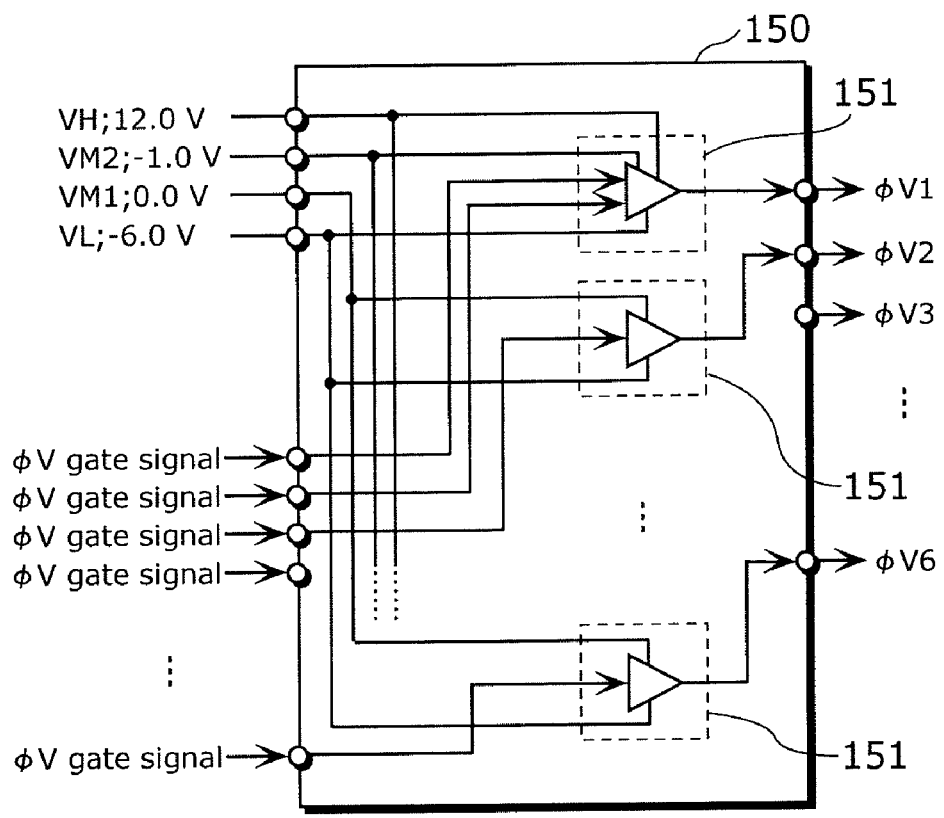
FIG. 9B shows a detailed structure of the driving pulse controlling unit in the first embodiment.

FIG. 9A is a block diagram showing a schematic structure of the driving pulse controlling unit 150 in FIG. 5, and FIG. 9B shows a detailed structure of the driving pulse controlling unit 150.

As shown in FIGS. 9A and 9B, the driving pulse controlling unit 150 requires, as the power source voltages, a MIDDLE level voltage VM2 in addition to the HIGH level voltage VH, a GND level voltage VM1, and the LOW level voltage VL. Here, the HIGH level voltage VH is 12 V, the LOW level voltage VL is −6 V, and the MIDDLE level voltage VM2 is −1 V. Compared with a conventional input power source voltage, the input power source voltages additionally have the MIDDLE level voltage VM2, −1 V as power supply, generated using the −6 V power source via a regulator. Receiving the input power source voltages and a φV gate signal, the driving pulse controlling unit 150 causes a pulse generator 151 to generate the column transfer clocks φV1 to φV6, and applies the column transfer clocks to each of the read-out gates or the non read-out gates.

FIG. 10 exemplifies column transfer pulses φV1, φV3, and φV5 provided from the driving pulse controlling unit 150.

Figure 11A:
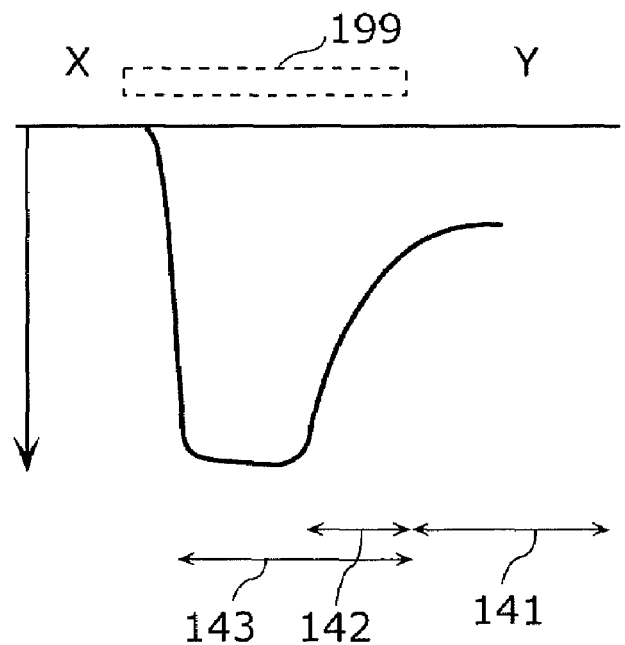
FIG. 11A shows potential distribution in a signal charge read-out operation.

Reflecting the power source voltages applied to the driving pulse controlling unit 150, the MIDDLE level voltage VM2 of the column transfer pulses φV1, φV3, and φV5 is −1 V. Thus, a pulse for the column transfer is a pulse having a minus voltage alone, such as −1 V and −6 V, on the basis of a potential of the p-type well region 191. The HIGH level voltage VH, 12 V, is applied to the transfer electrode (read-out gate) 199 at the signal charge read-out operation, and forms a potential distribution shown in FIG. 11A.

As conventionally performed, in FIG. 10, the read-out operation is performed at a time T1, and then the column transfer starts at a time T2.

Meanwhile, the difference from the conventional technique is that the MIDDLE level voltage VM2 and the LOW level voltage VL applied to the transfer electrode 199 are both minus voltages during a period in which the signal charge is accumulated in the photodiode 141 between one read-out operation and the next read-out operation.

Figure 11B:
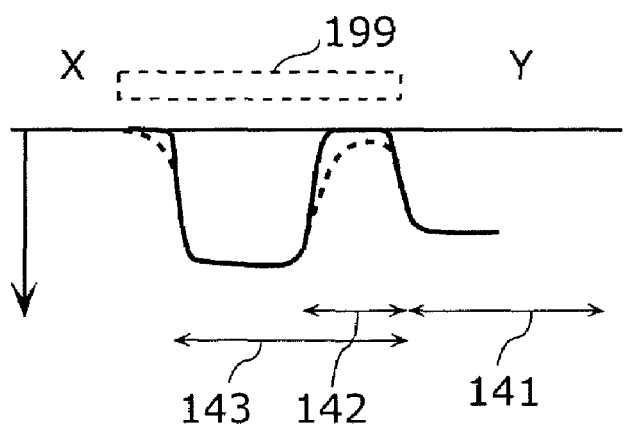
FIG. 11B shows potential distribution in a signal charge column transfer operation.

Here, as shown in the potential distribution in FIG. 11B, the potential rises in the vicinity of the surface of the p-type region (p-type well region 191) isolating the column CCD 143 and photodiode 141 because of the minus voltages applied to the transfer electrode 199. This causes a pinning state. This prevents the accumulated signal charge from exuding to the column CCD 143 even though the signal charge saturates the photodiodes 141, and causes the excessive signal charge to be extracted to the over flow drain in the deep part of the substrate. Hence, a deficiency such as blooming can be controlled.

In addition, since the minus voltages are applied to the transfer electrode 199, a hole density increases in the p-type region peripheral to the photodiodes 141. In particular, the hole density can be increased even in the region in the vicinity of a photodiodes 141-side of the read-out gate part 142, where p-type dopant concentration is low. This can reduce a dark signal, such as a white defect, occurred at an interface depending on a temperature by recombination, and significantly improves characteristics of dark signal noise.

In order to obtain an acceptable hole density in the p-type region, application of a voltage of approximately −2V to the transfer electrode 199 is adequate. According to the result of a simulation (not shown), when a voltage of approximately −1 V was applied to the transfer electrode 199, the hole density was increased in three digits compared to a voltage of 0 V was applied.

For the read-out operation, the p-type dopant concentration at the read-out gate part 142 cannot be raised. Thus, the potential barrier becomes insufficient, which tends to result in a deficiency such as an increase in dark signal noise due to lack of a hole density and blooming resistance. An assistance by the minus voltage from the transfer electrode 199, however, can solve both of the problems of the potential barrier and the residue of read-out charge.

The above effect can be significant when a pixel pitch is 1.8 μm or smaller due to recent miniaturization of pixels. In the case where the objective is to reduce an isolation area between the photodiodes 141 and the associated column CCD 143, a great effect can be achieved regardless of a pixel pitch.

Second Embodiment

Figure 12:
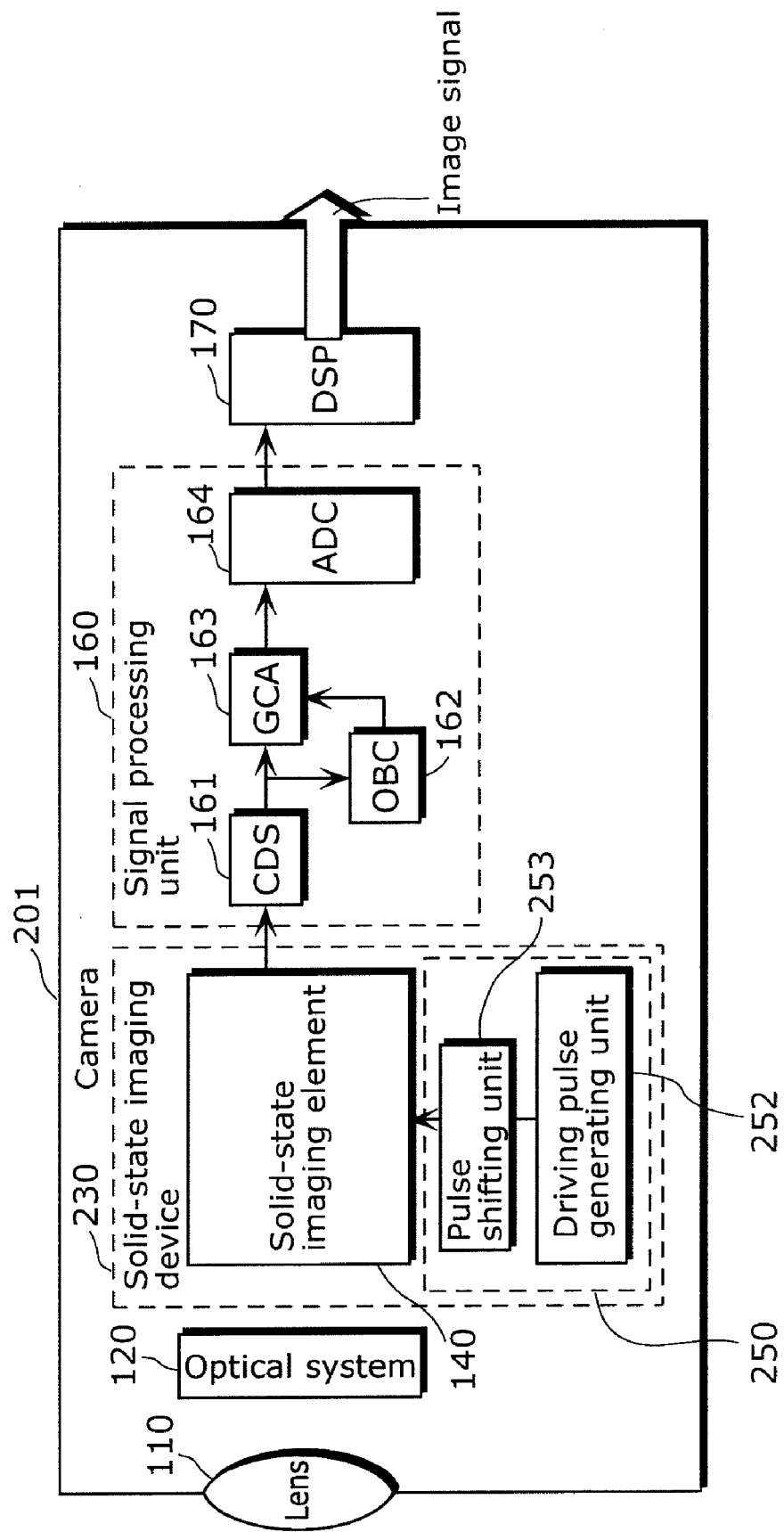
FIG. 12 shows a structure of a camera in a second embodiment of the present invention.

FIG. 12 shows a structure of a camera (imaging apparatus) 201 in a second embodiment.

The camera 201 in the embodiment is different from the camera 101 in the first embodiment in that the camera 201 includes a driving pulse controlling unit 250 which has a different structure from the driving pulse controlling unit 150 in the first embodiment. The driving pulse controlling unit 250 includes a driving pulse generating unit 252 and a pulse shifting unit 253. The pulse shifting unit 253 has a circuit part which is shared with the solid-state imaging element 140.

Figure 13A:
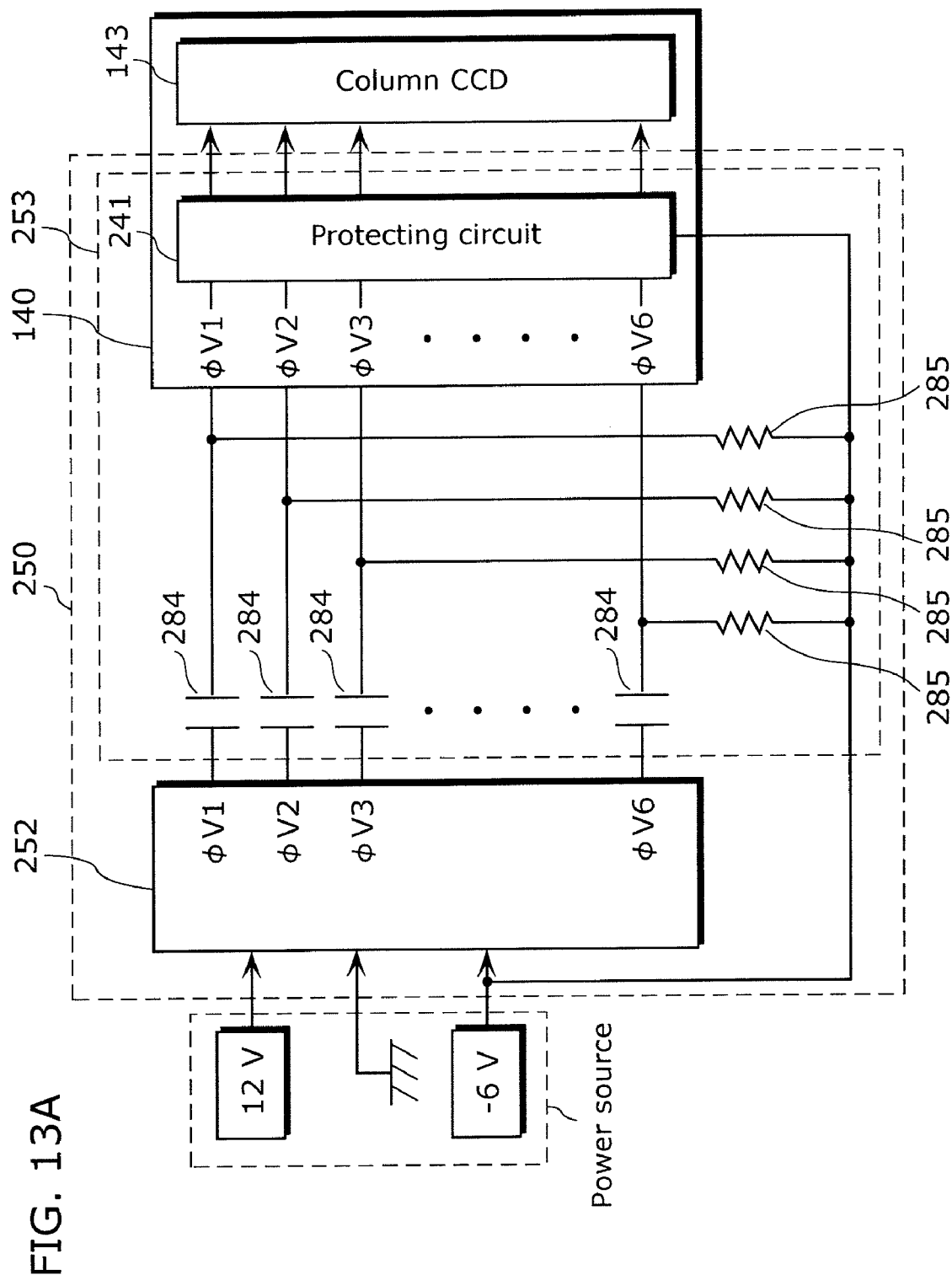
FIG. 13A shows a structure of the driving pulse controlling unit in the second embodiment.
Figure 13B:
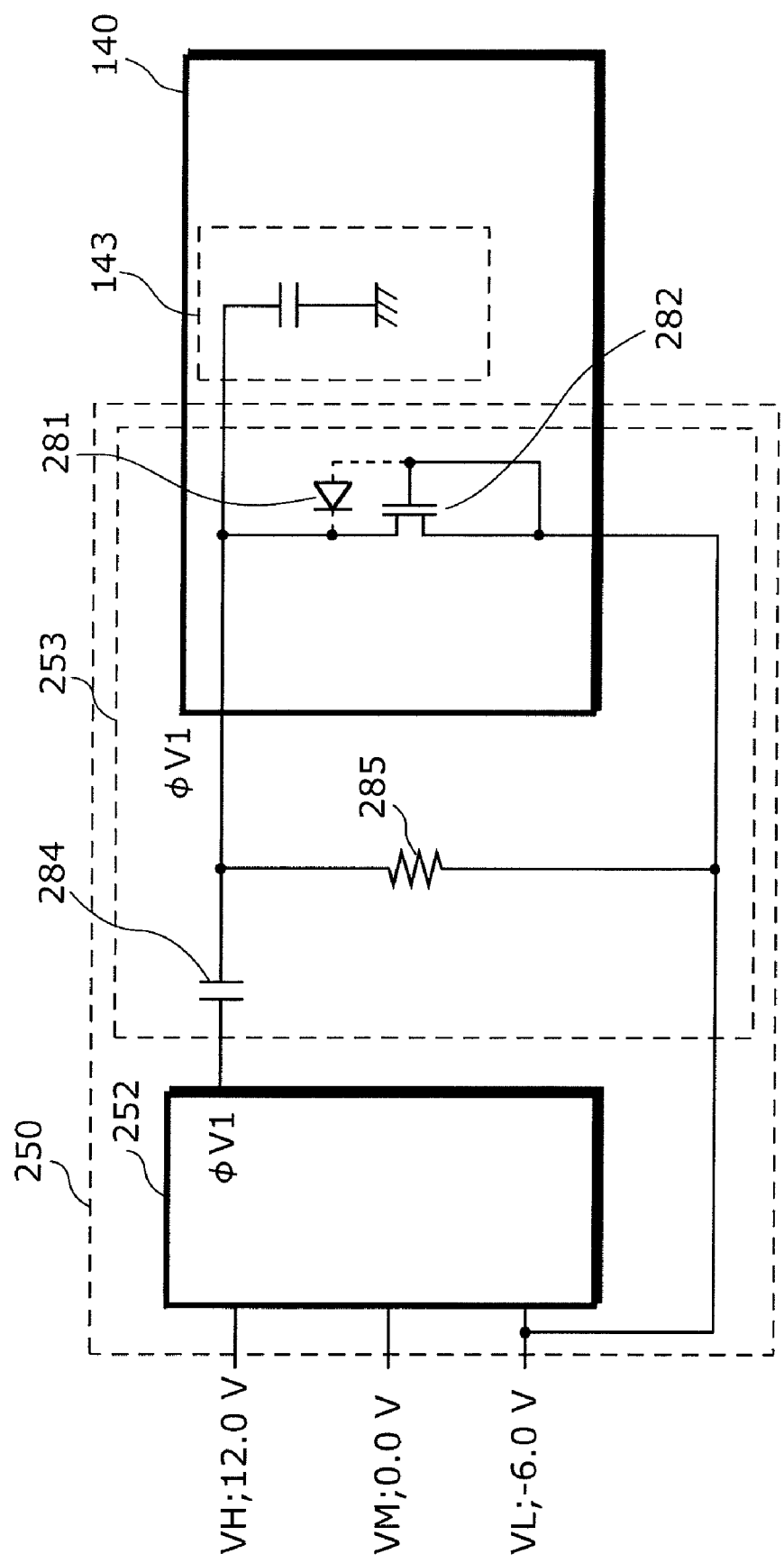
FIG. 13B shows a structure of the driving pulse controlling unit in the second embodiment.

FIGS. 13A and 13B illustrate a structure of the driving pulse controlling unit 250. It is noted that FIG. 13B only shows a structure to generate a column transfer clock φV1 in FIG. 13A. This structure is similar to a structure to generate column transfer clocks φV2 to φV6.

The driving pulse controlling unit 250 has no −1 V power supply, and thus has a similar structure to a power source of the driving pulse controlling unit in a conventional solid-state imaging device. In other words, the driving pulse generating unit 252 is structured to require only the HIGH level voltage VH, the GND level voltage VM, and the LOW level voltage VL as the input power source voltages. Here, the HIGH level voltage VH is 12 V and the LOW level voltage VL is −6 V, for example.

Similar to the power source of the driving pulse controlling unit in the conventional solid-state imaging device, the column transfer clocks φV1 to φV6 provided from the driving pulse generating unit 252 have a HIGH level voltage of 12 V, a MIDDLE level voltage of 0 V, and a LOW level voltage of −6 V. The driving pulse generating unit 252 is connected to the solid-state imaging element 140 Via the pulse shifting unit 253.

Here, the column transfer clocks φV1 to φV6 provided from the driving pulse generating unit 252 are an example of second driving pulses of the present invention, and the LOW level voltage and the MIDDLE level voltage of the column transfer clocks φV1 to φV6 are respective examples of a third and a fourth voltages of the present invention.

The pulse shifting unit 253 is a circuit to shift the column transfer clocks φV1 to φV6 provided from the driving pulse generating unit 252 by a predetermined voltage, approximately 0.7V, so that the lowest potential becomes −6.7V.

In other words, the pulse shifting unit 253 is a circuit to provide the column transfer clocks φV1 to φV6 having a HIGH level voltage of 11.3V, a MIDDLE level voltage of −0.7V, and a LOW level voltage of −6.7V.

Here, the column transfer clocks φV1 to φV6 provided from the pulse shifting unit exemplify first driving pulses of the present invention, and the LOW level voltage and the MIDDLE level voltage of the column transfer clocks φV1 to φV6 are respective examples of a first and a second voltages of the present invention.

In a protecting circuit 241 in the solid-state imaging element 140, a diode-connected MOS transistor 282 is formed. The pulse shifting unit 253 includes a clamping circuit, and a parasitic pn diode 281 in the protecting circuit 241 shifts the column transfer clocks φV1 to φV6 by a predetermined voltage. In the pulse shifting unit 253, the MOS transistor 282 clamps, from power supply of the LOW level voltage VL, a voltage decreased only by a built-in voltage, in the parasitic pn diode 281, existing in a drain voltage of the MOS transistor 282. Thus, the column transfer clocks φV1 to φV6 provided from the driving pulse generating unit 252 are superimposed to the clamped voltage. Accordingly, the column transfer clocks φV1 to φV6 become pulses which have shifted by a drop of the parasitic pn diode 281, and are provided from the pulse shifting unit 253. Since a built-in voltage at a regular pn (junction) diode is 0.7V, all of the HIGH level voltage, the MIDDLE level voltage and the LOW level voltage of the column transfer clocks φV1 to φV6 become pulses reduced by approximately 0.7V, and are provided from the pulse shifting unit 253. A typical MIDDLE level voltage is usually as high as the GND level; however, once running through the pulse shifting unit 253, the MIDDLE level voltage becomes a minus voltage of an approximately −0.7 voltage to be applied to the transfer electrode 199.

As values for a condenser 284 and a resistor 285 in the pulse shifting unit 253, values suitable to a capacity of the transfer electrode 199 included in the column CCD 143 are selected. Since the clamp operation is performed based on the power supply of the LOW level voltage VL, inappropriate values of the condenser 234 and the resistor 285 cause a deficiency to occur over time an excessively large variation in the predetermined voltage of the column transfer clocks φV1 to φV6. For example, a value of the condenser 284 is approximately 0.1 μF, and a value of the resistor 285 is approximately 390 kΩ. A capacity of the transfer electrode 199 including the column CCD 143 is approximately 1000 pF. It is noted that optimum values for these values can be set in accordance with capacities of each of the transfer electrodes to which the column transfer clocks φV1 to φV6 are applied.

As described above, the solid-state imaging device 230 in the embodiment can control increasing number of parts and power consumption since no additional power source supplying a voltage to the driving pulse controlling unit 250 is necessary. In addition, the solid-state imaging device 230 in the embodiment can reduce the number of parts since using the diode on the circuit in the solid-state imaging element 140 as a diode for performing the clamp operation.

Figure 14:
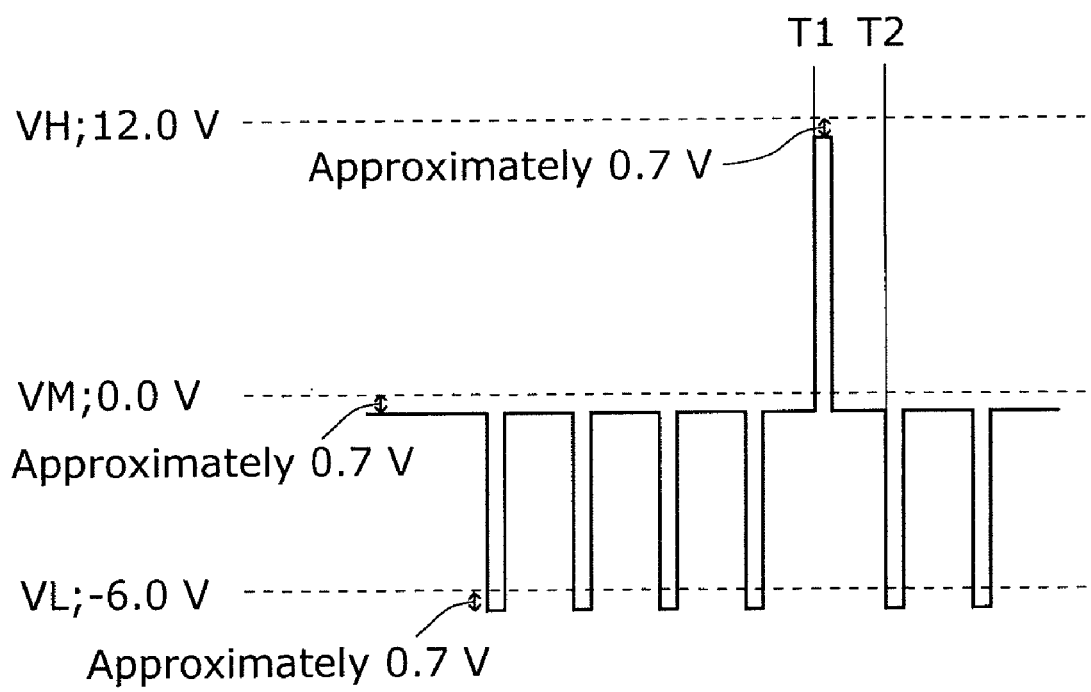
FIG. 14 exemplifies a column transfer pulse provided from the driving pulse controlling unit.

Further, in accordance with the solid-state imaging device 230 in the present invention, the pulse shifting unit 253 shifts all of the column transfer clocks φV1 to φV6, as shown in FIG. 14. Thus, variations in a voltage difference between the HIGH level voltage and the MIDDLE level voltage and a voltage difference between the MIDDLE level voltage and the LOW level voltage can be limited. A large voltage difference between the HIGH level voltage and the MIDDLE level voltage possibly causes an excessively large voltage difference to be applied to neighboring transfer electrodes 199, and thus a deficiency such as a breakdown voltage failure may occur. Meanwhile, a small voltage difference between the MIDDLE level voltage and the LOW level voltage causes the voltage difference between the neighboring transfer electrodes 199 to go out of the optimum value to become small, and thus a deficiency may occur such as a reduction of a maximum capacity, of a column transfer, to be able to handle and a transfer efficiency degradation. The solid-state imaging device 230 in the embodiment can prevent these harmful effects.

Further, the solid-state imaging device 230 in the embodiment causes the pulse shifting unit 253 to reduce voltages including the HIGH level voltage. For example, a 12 V can be reduced to a 11.3V. Accordingly, the solid-state imaging device 230 can reduce an absolute value of voltage to be applied to the read-out gate, and a voltage stress to the read-out gate without changing a power source voltage. Hence, a deficiency such as a breakdown failure can be prevented. In particular all the column transfer clocks φV1 to φV6 are shifted by the clamp operation of the diode. Thus, a shift amount of the HIGH level voltage becomes larger than the other shift amounts of the MIDDLE level voltage and the LOW level voltage, depending on characteristics of the diode. Consequently, a voltage reduction effect on the HIGH level voltage becomes great, so does the above stress reduction effect.

Figure 15:
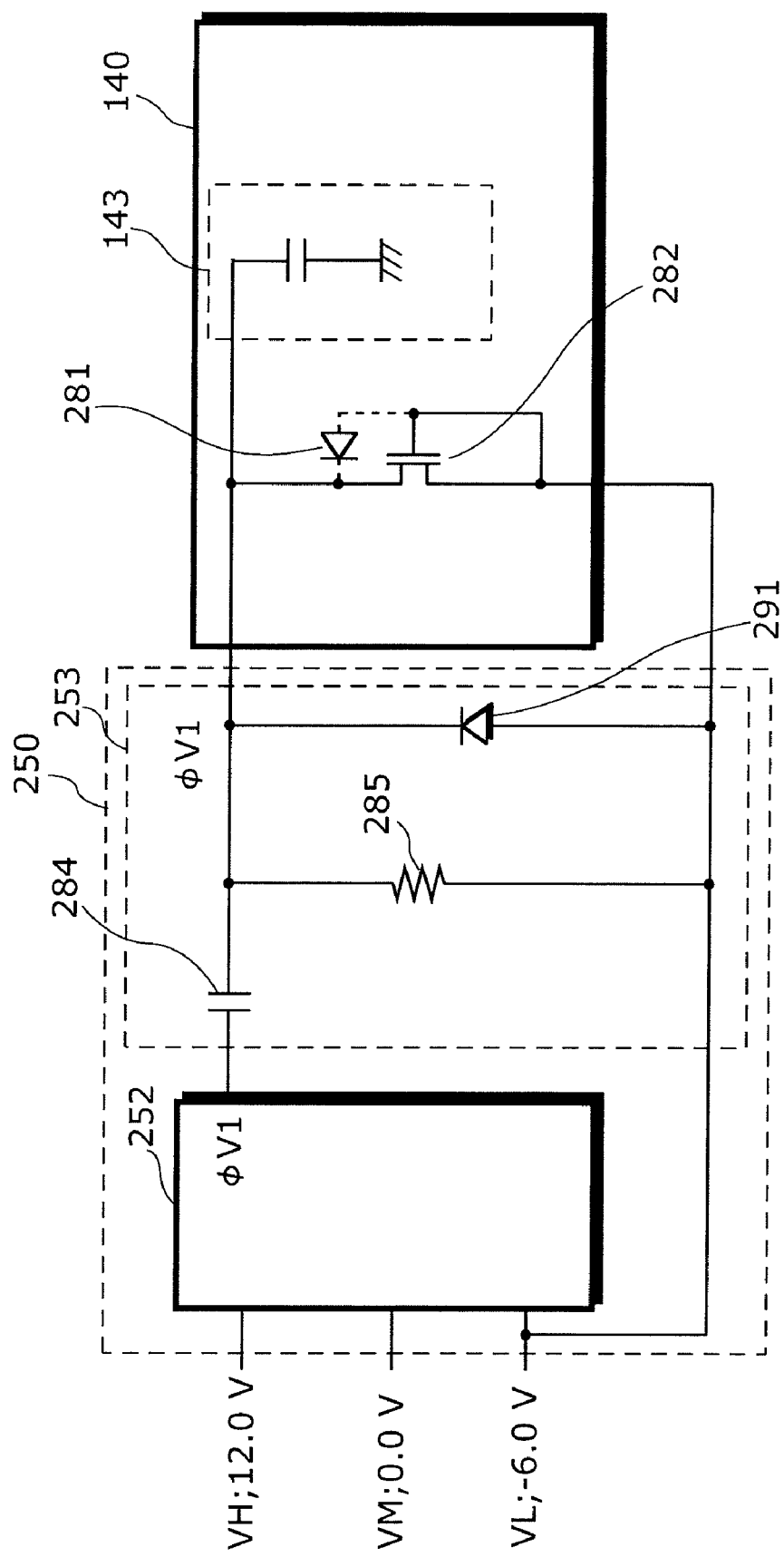
FIG. 15 shows a structure of a modification example of the driving pulse controlling unit in the second embodiment.
Figure 16:
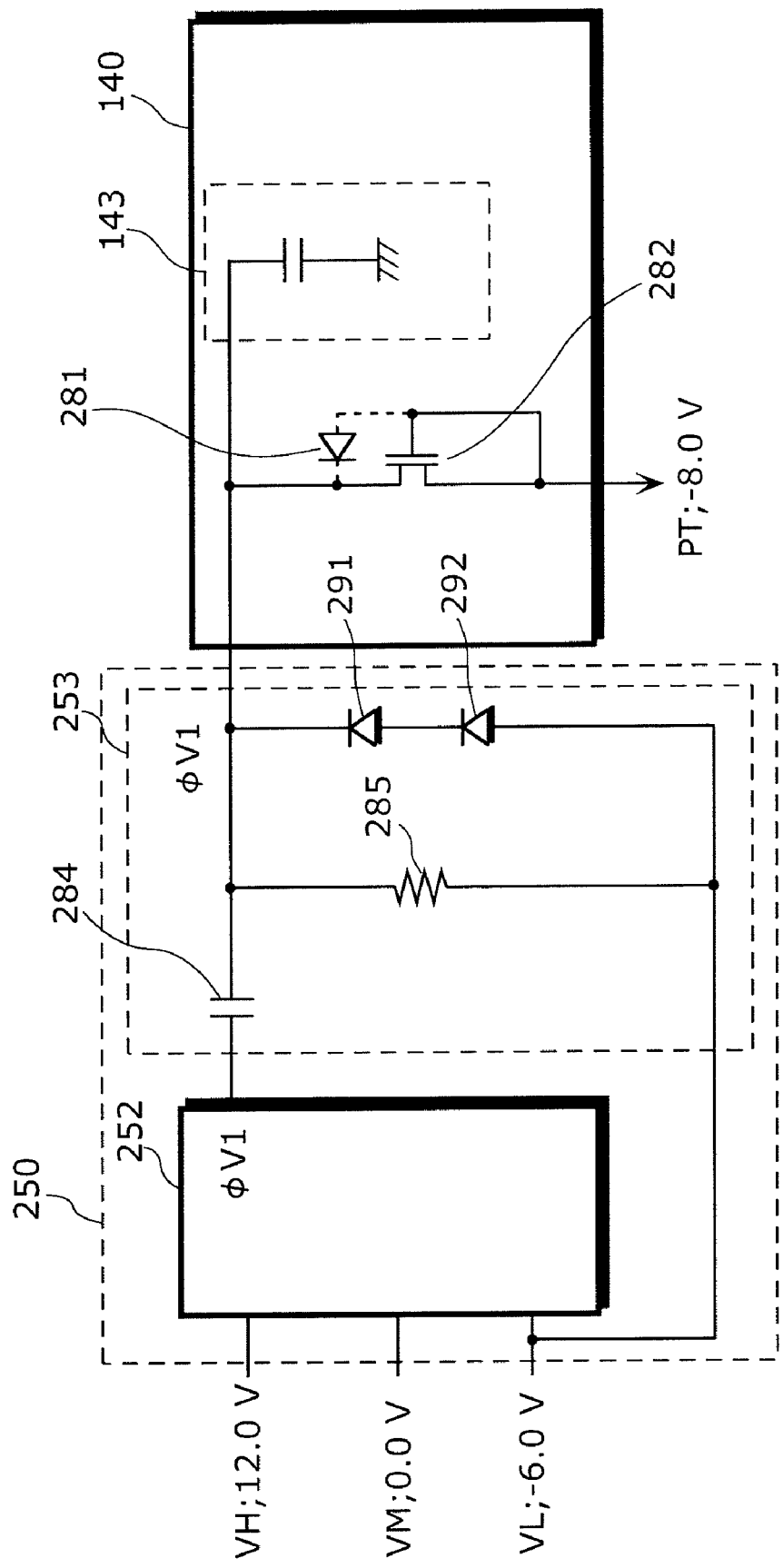
FIG. 16 shows a structure of a modification example of the driving pulse controlling unit in the second embodiment.

It is noted that the pulse shifting unit 253 in the embodiment may be structured as shown in FIG. 15 or 16. In other words, the pn diodes included in the pulse shifting unit 253 may be provided, as externally connected diodes 291 and 292, outside the solid-state imaging element 140.

Thus, by externally connecting the pn diodes in the pulse shifting unit 253, a voltage shift amount can be adjusted. By selecting a built-in voltage, of the externally connected diode 291, smaller than a built-in voltage of the parasitic pn diode 281 in the solid-state imaging element 140, the voltage shift amount can be adjusted in accordance with the built-in voltage of the externally connected diode 291. Further, in the case where the externally connected diodes 291 and 292 are connected in serial, as shown in FIG. 16, a degree of freedom of adjusting the voltage shift amount can be increased. It is noted in FIG. 16 that a minus voltage PT on a protecting circuit is assumed to be −8V; namely, a voltage lower than the VL voltage applied to the driving pulse controlling unit 250 by −6 V. By increasing the number of connected diodes in the pulse shifting unit 253, this structure allows the column transfer pulse to be shifted until the LOW level voltage becomes approximately −8.7V minimum.

Here, the above-described effect is described by externally connecting a diode having a low built-in voltage in FIGS. 15 and 16; meanwhile, a similar effect can obviously be achieved even though a modification to adjust diode characteristics at the circuit in the solid-state imaging element 140. A typical modification of a semiconductor integrated circuit (IC) structure requires a lead time of several months. In the case of modifying a substrate, the modification is possibly available in a short period of time despite the fact that the number of mounted parts increases. Thus, the best technique may be selected in a design stage.

It is noted that in FIGS. 13B, 15, and 16, a structure integrating the driving pulse generating unit 252 and the pulse shifting unit 253 (one-chip structure) may be employed. In FIGS. 13B, 15, and 16, a structure that the driving pulse generating unit 252 includes the condenser 284 and the resistor 285 (one-chip structure) may also be employed. These can further reduce the number of parts.

Third Embodiment

Figure 17:
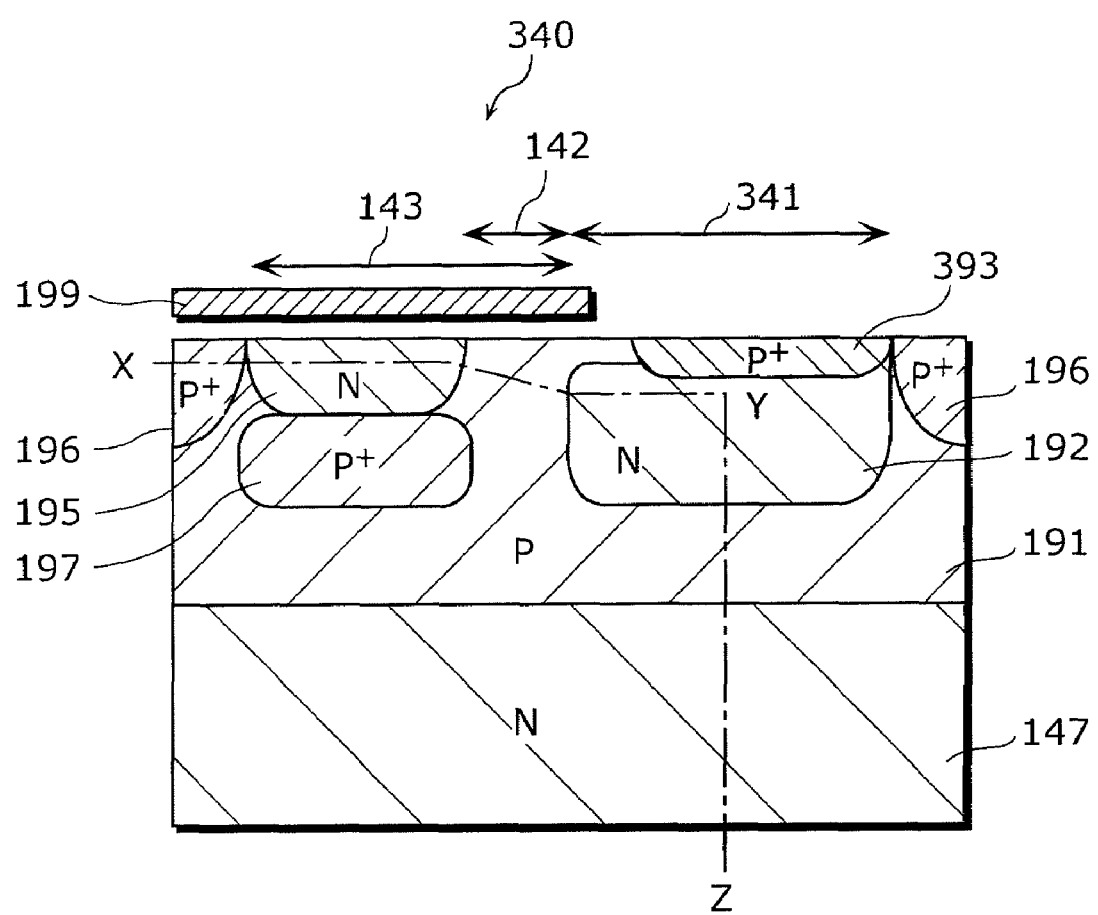
FIG. 17 is a cross-sectional view showing a structure of the solid-state imaging element, in a substrate in-depth direction, of a third embodiment of the present invention.

FIG. 17 is a cross-sectional view of a solid-state imaging element 340 in a third embodiment. In particular, FIG. 17 is a cross-sectional view showing a structure of the photodiode 341 and the column CCD 143 in a substrate in-depth direction.

The solid-state imaging element 340 in the embodiment is different from the solid-state imaging element 140 in the first embodiment in that the solid-state imaging element 340 includes a photodiode 341 having a different cross-sectional structure from that of the photodiode 141 in the first embodiment. The photodiodes 341 is structured to have the signal charge accumulating region 192 and a hole storage region 393. The signal charge accumulating region 192 and the hole storage region 393 are located beside the charge transfer region 195. A side portion, of the hole storage region 393, facing to the charge transfer region 195 recedes in a direction away from the charge transfer region 195 with respect to a side portion, of the signal charge accumulating region 192, facing to the charge transfer region 195. Hence, a p-type layer, on the surface of the p-type well region 191, having high impurity concentration is formed at a position away from an edge of the transfer electrode 199.

The p-type layer (hole storage region 393) is structured to recombine to erase a dark-output noise electron with a sufficient hole concentration and control generation of noise. Here, the dark-output noise electron includes a white defect resulting from an interface state in a silicon interface of the photodiode 341.

Forming this p-type layer having high impurity concentration close to the vicinity of an edge of the transfer electrode 199 possibly causes diffusion of a p-type impurity directly below the read-out gate, and fails to sufficiently decrease a potential at the time of a signal charge read-out operation. In addition, the p-type layer having high impurity concentration also works to fix the potential of the portion thereof to 0 V, so that the potential in the vicinity of a gate edge has difficulty in decreasing. As a result, residual read-out charge occurs, and a sufficient read-out operation becomes difficult.

Figure 18A:
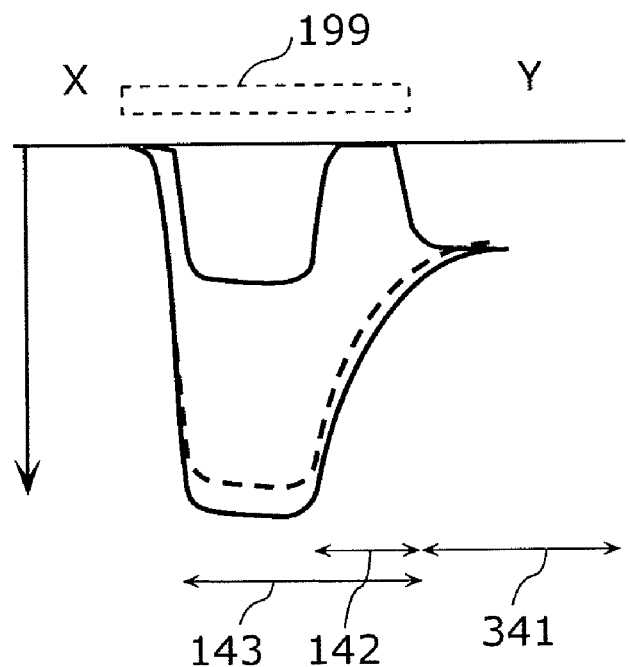
FIG. 18A shows potential distribution in a signal charge read-out operation.
Figure 18B:
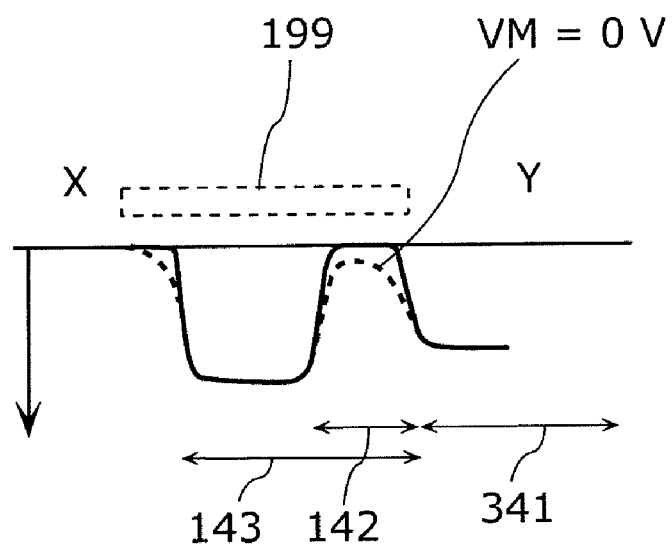
FIG. 18B shows potential distribution in a signal charge column transfer operation.

In order to prevent the above, the p-type layer having high impurity concentration in the photodiode 341 is formed, keeping a distance from the vicinity of the read-out gate. As shown in FIG. 18A, this allows the potentials of the photodiode 341 and the column CCD 143 to be sufficiently lowered at the time of the read-out operation. In addition, the column transfer clocks φV1 to φV6 themselves are minus voltages. Hence, as shown in FIG. 18B, an effect can be achieved except the time of the read-out operation, the effect which is similar to the case where the p-type impurity sufficiently exists up to directly below the transfer electrode 199. Even in the case where the p-type layer having high impurity concentration exists close to the vicinity of the edge of the transfer electrode 199, a sufficient read-out operation can be performed by applying a high voltage to the transfer electrode 199. Here, since the p-type layer having high impurity concentration is fixed to 0 V, a significantly high electrical field is generated in the vicinity of the p-type layer having high impurity concentration, resulting in an occurrence of hot carrier. This may cause various deficiencies. This happens to all edges of electrodes to which an appropriate high voltage is applied, as well as to a read-out gate at which a read-out operation is performed. Hence, the p-type layer having high impurity concentration preferably keeps a distance from an edge of an electrode. A p-type layer function which tends to be insufficient at the surface can be compensated with minus voltages of the column transfer clocks φV1 to φV6.

Fourth Embodiment

Figure 19A:
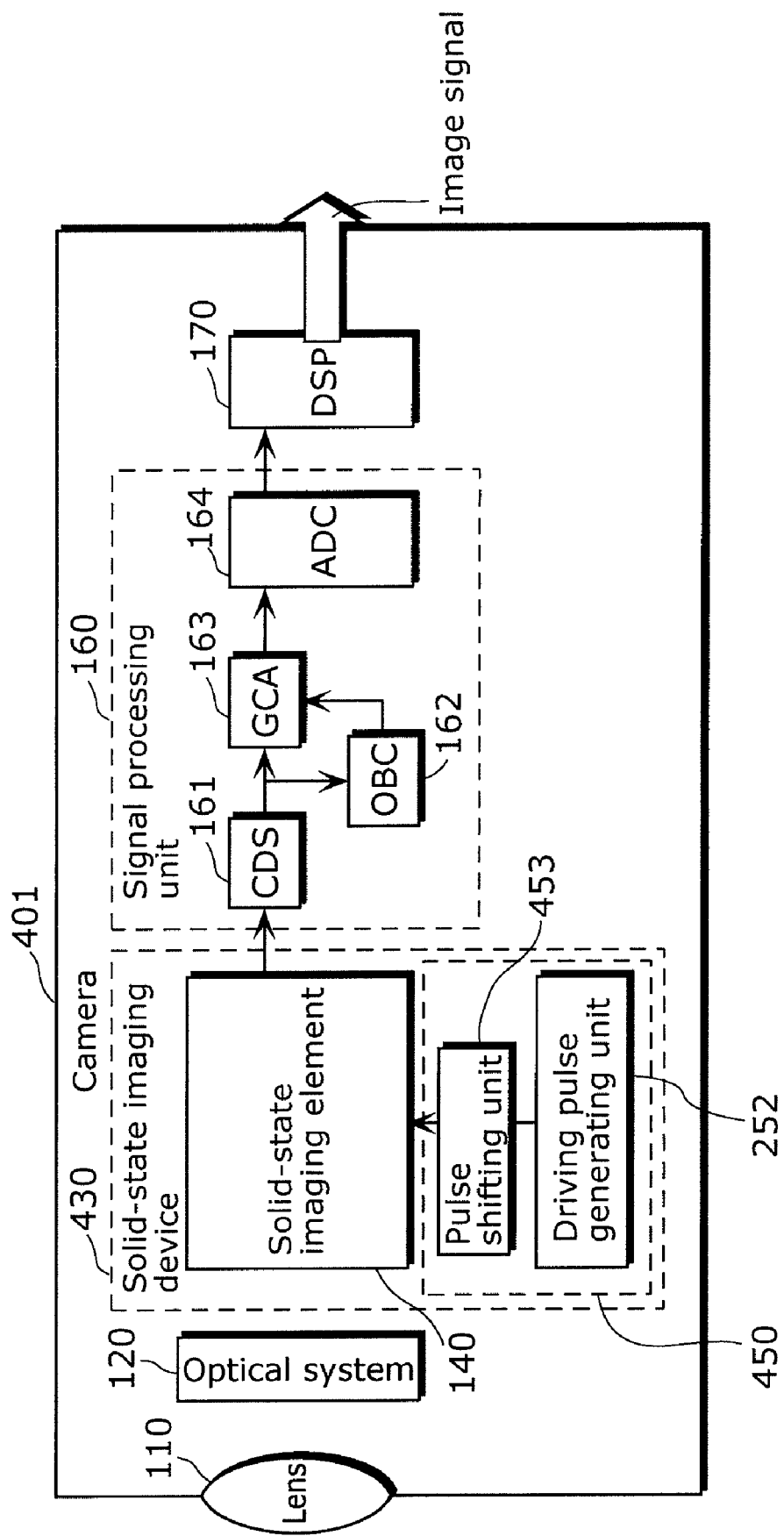
FIG. 19A shows a structure of a camera in a fourth embodiment of the present invention.
Figure 19B:
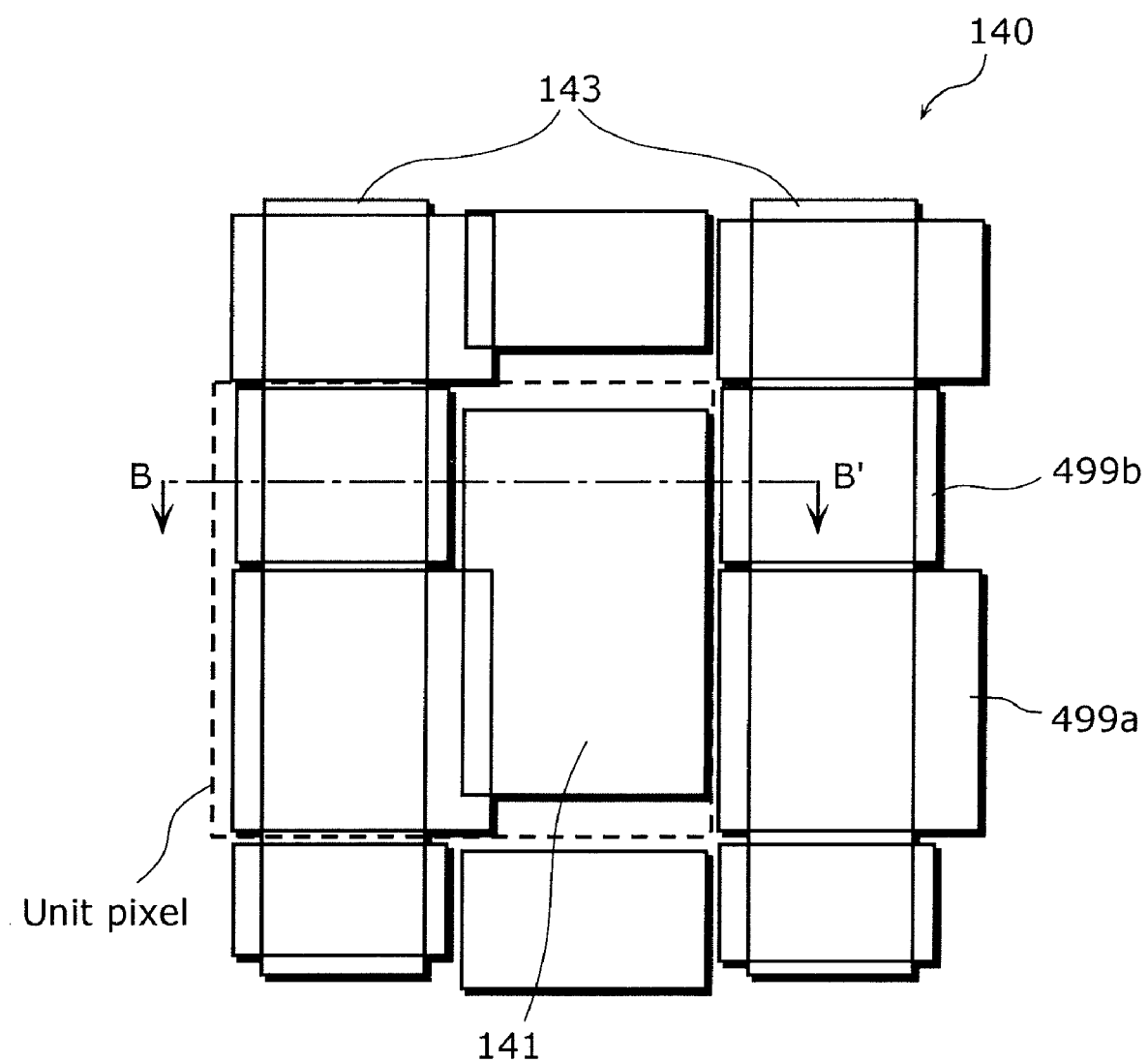
FIG. 19B shows an arrangement of a transfer electrode in the solid-state imaging element in the fourth embodiment.

FIG. 19A shows a structure of a camera 401 in a fourth embodiment. FIG. 19B shows an arrangement of the transfer electrode 199 in the solid-state imaging element 140 of the embodiment.

The camera 401 in the embodiment is different from the camera 201 in the second embodiment in that the camera 401 includes a driving pulse controlling unit 450 which has a different structure from the driving pulse controlling unit 250 in the second embodiment. In the solid-state imaging element 140, the transfer electrode 199 of the column CCD 143 is formed with a read-out gate 499a and a non read-out gate 499b alternatively arranged. The read-out gate 499a has a larger protrusion part toward the photodiodes 141 than that of the non read-out gate 499b, which facilitates a read-out operation.

Figure 20A:
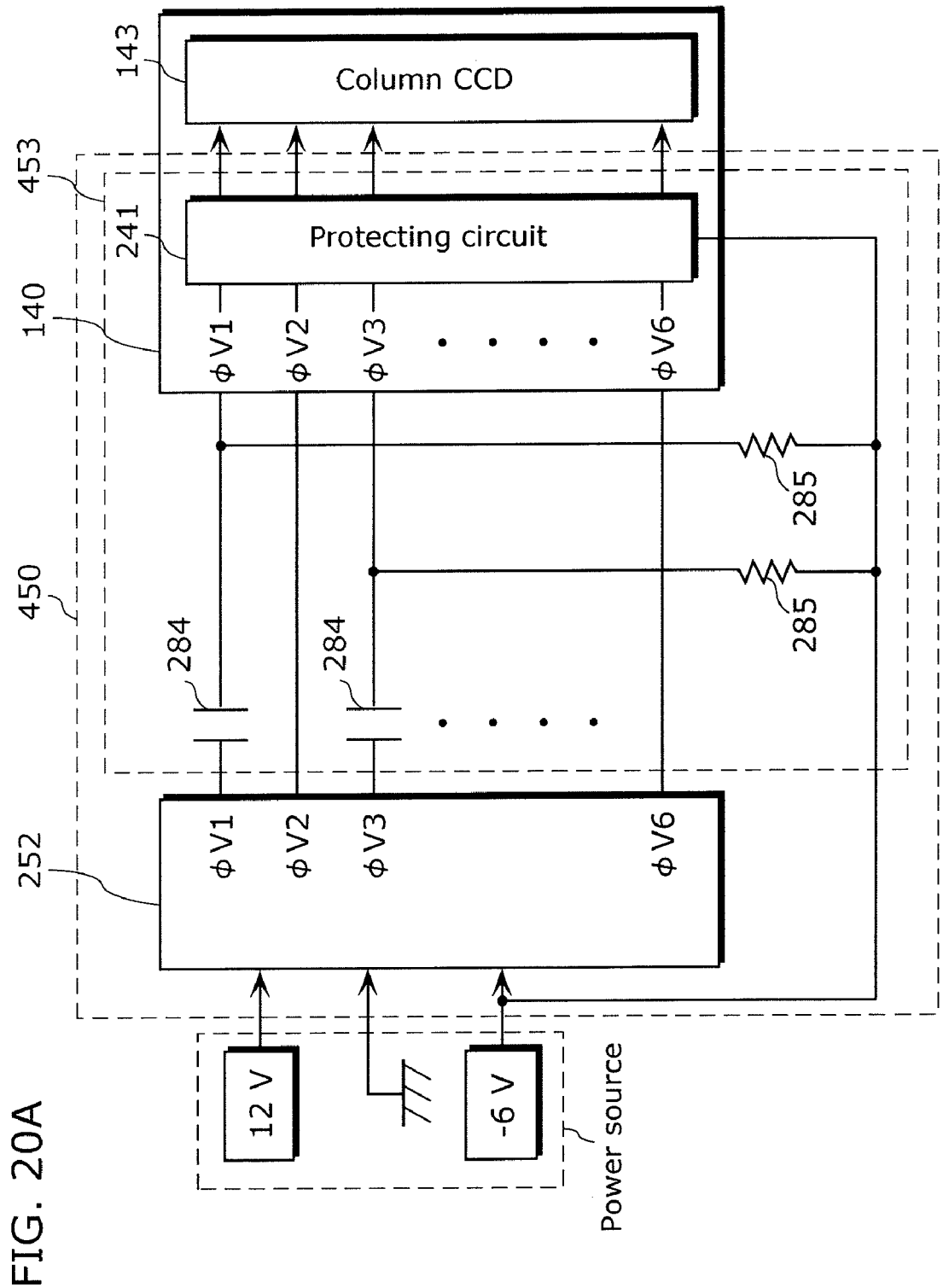
FIG. 20A shows a structure of a driving pulse controlling unit in the fourth embodiment.

FIG. 20A shows a structure of a driving pulse controlling unit 450 in the embodiment. FIG. 20B exemplifies column transfer pulses φV1, φV3, and φV5 applied to the read-out gate 499b by the driving pulse controlling unit 450. FIG. 20C exemplifies column transfer pulses φV2, φV4, and φV6 applied to the non read-out gate 499b by the driving pulse controlling unit 450.

The driving pulse controlling unit 450 includes the driving pulse generating unit 252 and a pulse shifting unit 453. The circuitry of the driving pulse controlling unit 450 is that: a clamp circuit in the pulse shifting unit 453 is connected only to a wiring for the read-out gate 499a, not to a wiring for the non read-out gate 499b; and the wiring for the non read-out gate 499b is directly connected to the solid-state imaging element 140.

The column transfer pulses φV1 to φV6 provided from the driving pulse generating unit 252 are applied to the read-out gate 499a or the non read-out gate 499b in the solid-state imaging element 140 via the pulse shifting unit 453. In the pulse shifting unit 453, a voltage shift is performed only on the column transfer pulses φV1, φV3, and φV5 to be applied to the read-out gate 499a, not on the column transfer pulses φV2, φV4, and φV6 to be applied to the non read-out gate 499b. Hence, to the non read-out gate 499b, column transfer pulses, with no voltage shifted, provided from the driving pulse generating unit 252 are directly applied.

Figure 21:
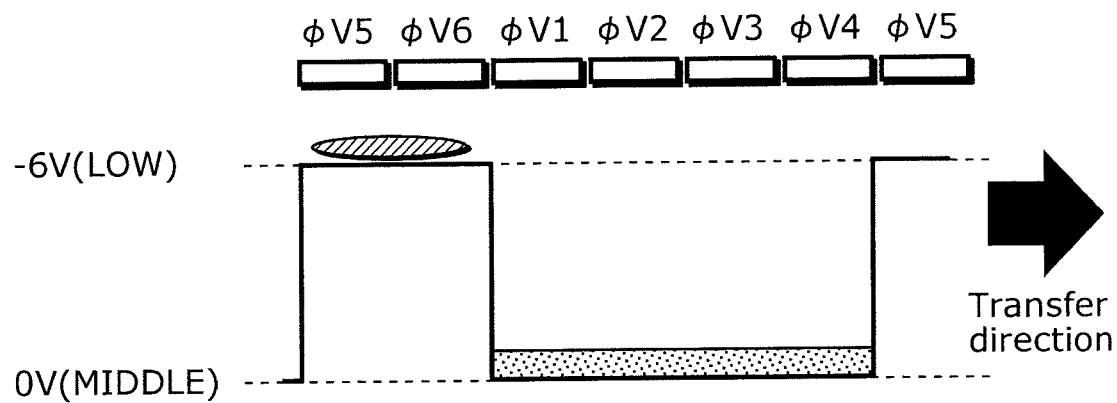
FIG. 21 shows potential distribution in a column CCD.
Figure 22:
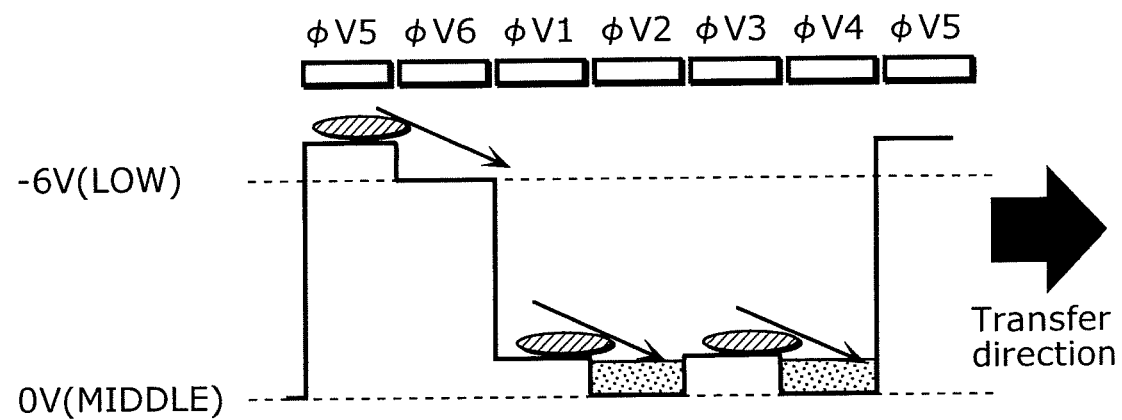
FIG. 22 shows potential distribution in the column CCD.

FIGS. 21 and 22 show potential distributions at a moment of a transfer with respect to a cross section, in a direction of a charge transfer, of the column CCD 143.

In the solid-state imaging device 430 in the embodiment, a MIDDLE level voltage and the LOW level voltage of the column transfer pulses φV1, φV3, and φV5, and the column transfer pulses φV2, φV4, and φV6 are different. Thus, as shown in FIG. 21, the electric charge transfer is not performed in a state that no voltage difference is observed between the read-out gate 499a and the non read-out gate 499b; instead, the charge transfer is performed in a state that a potential step is formed based on the voltage difference between the read-out gate 499a and the non read-out gate 499b, as shown in FIG. 22.

As a result, the signal charge to be transferred is as great as approximately 100 of electrons, for example. Even though the column transfer pulses are the MIDDLE level voltage, the signal charge is corrected almost directly below the non read-out gate 499b because of the potential steps between the read-out gate 499a and the non read-out gate 499b. Further, even though the column transfer pulses are the LOW level voltage, the potential steps between the read-out gate 499a and the non read-out gate 499b encourage the charge transfer. Thus, a transfer efficiency of the signal charge in each of transfer operations can be improved.

The above-described improvement in the transfer efficiency is based on the fact that a voltage difference between the pulses enables the potential steps caused by the voltage difference to nullify the following adverse effects: a long transfer time because of a long transfer distance due to a long electrode; and existence of a potential dip trapping the signal charge to interfere the transfer of the signal charge. This prevents deficiencies such as color mixture due to an imperfect transfer and a transfer deficiency. The smaller the signal charge amount becomes, the more apparent poor picture quality resulting from a transfer deficiency becomes. Hence, the effect of the transfer efficiency improvement described above is significant in enhancing in picture quality. In particular, the above technique is effective in recent improvement in ISO sensitivity and the following reduction of handlable charge amount.

Figure 23A:
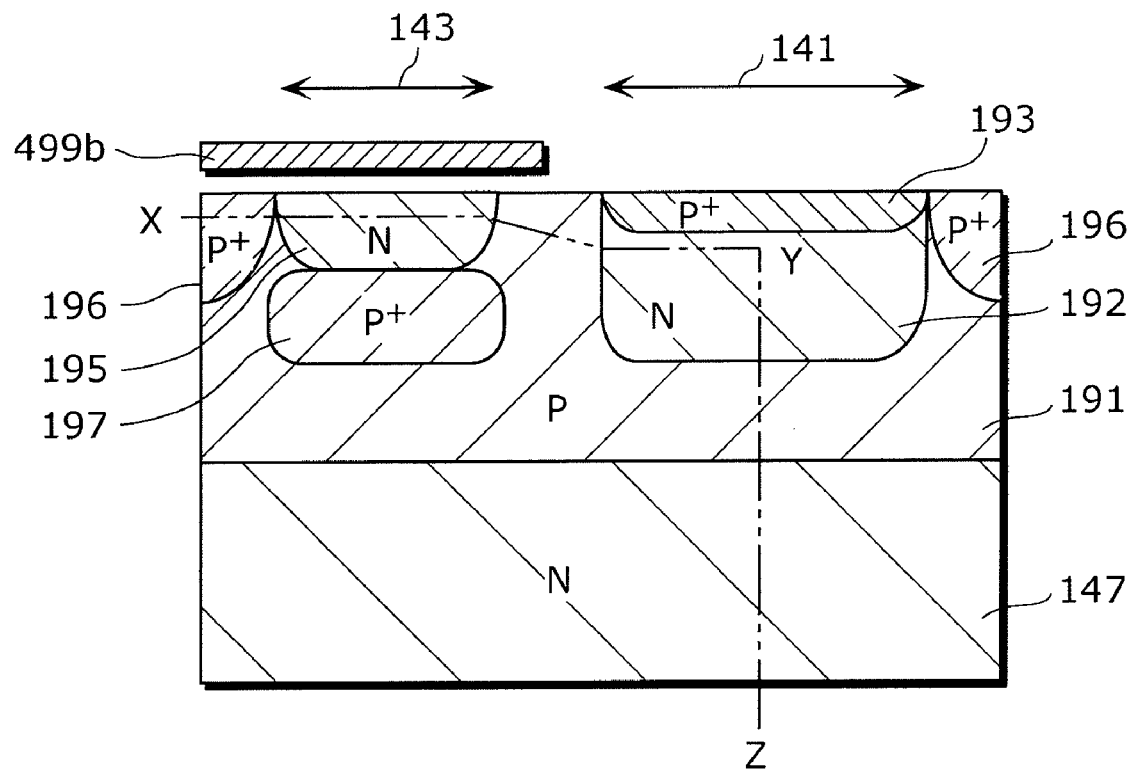
FIG. 23A is a cross-sectional view showing a structure of the solid-state imaging element, in a substrate in-depth direction, in the fourth embodiment (a cross-sectional view taken from the line B-B' of FIG. 19B)

FIG. 23A is a cross-sectional view of the solid-state imaging element 140 in the embodiment. Specifically, the FIG. 23A is a cross-sectional view showing a structure of the photodiode 141 and the column CCD 143 (a portion in which the non read-out gate 499b of the column CCD 143 is formed) in a substrate in-depth direction.

Figure 23B:
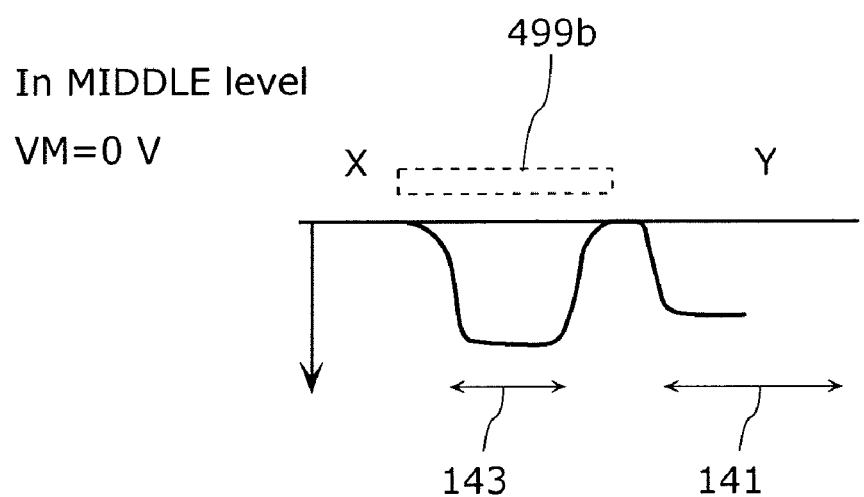
FIG. 23B shows potential distribution in a state that 0 V as a MIDDLE level voltage is applied to a non read-out gate.

With regard to a portion in which the non read-out gate 499b of the column CCD 143 is formed, the gate is not extended to the photodiode 141. Hence, as shown in a potential diagram of FIG. 23B (a diagram showing potential distribution with 0 V as the MIDDLE level voltage is applied to the non read-out gate 499b), the potential becomes 0 V at a gate edge even though the p-type layer (hole storage region 193) is thin. In this region, exudation of the signal charge from the photodiodes 141 to the column CCD 143, blooming, does not occur.

Figure 24A:
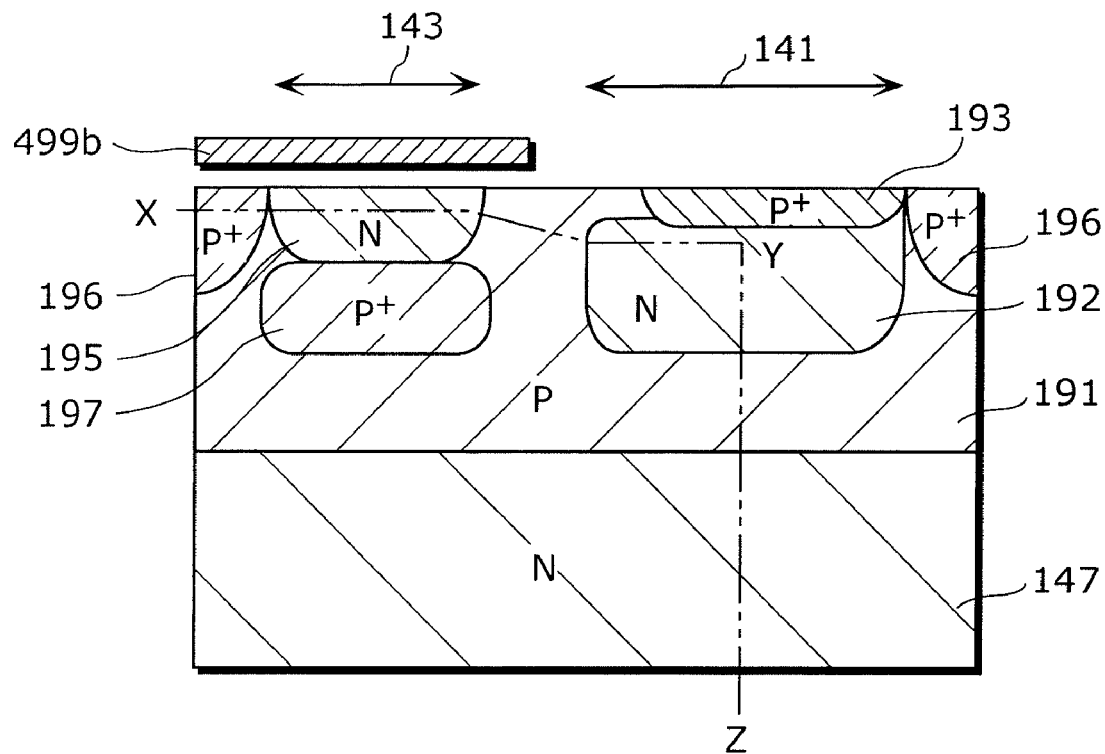
FIG. 24A is a cross-sectional view showing the structure of the solid-state imaging element, in a substrate in-depth direction, in the fourth embodiment (the cross-sectional view taken from the line B-B' of FIG. 19B)
Figure 24B:
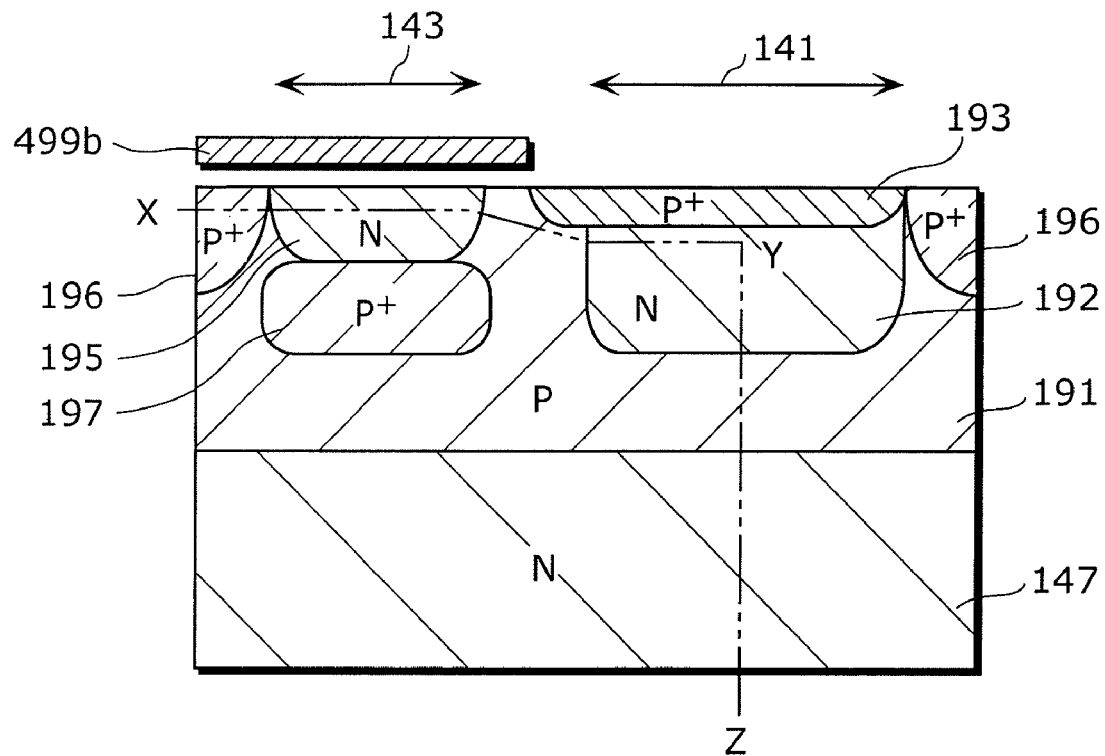
FIG. 24B is a cross-sectional view showing the structure of the solid-state imaging element, in a substrate in-depth direction, in the fourth embodiment (the cross-sectional view taken from the line B-B' of FIG. 19B)

This is similar to the case where a forming region of the p-type layer at the gate edge boundary of the non read-out gate 499b (hole storage region 193) is different. In other words, blooming does not occur in neither cases where: the p-type layer having high impurity concentration (hole storage region 193) recedes, to be formed, with respect to the photodiode 141, as shown in FIG. 24A; or the p-type layer having high impurity concentration (hole storage region 193) extends beyond the photodiode 141 to the vicinity of the gate edge of the non read-out gate 499b. Even in the above cases, no high voltage is applied to the non read-out gate 499b, and thus a high electric field does not occur in the vicinity of the gate edge. Hence, the p-type layer having high impurity concentration (hole storage region 193) may be away from the gate edge or extended to the vicinity of the gate edge.

As described above, the solid-state imaging device 430 in the embodiment appropriately controls the potential directly below the read-out gate, as the solid-state imaging device in the first embodiment controls. Thus, blooming can be controlled and a dark signal reduced. Further, since a voltage difference occurs between the read-out gate and the non read-out gate, transfer efficiency can be improved.

It is noted that in FIG. 20A, a structure integrating the driving pulse generating unit 252 and the pulse shifting unit 453 (one-chip structure) may be employed. It is also noted that in FIG. 20A, a structure integrating the condenser 284 and the resistor 285 into the driving pulse generating unit 252 (one-chip structure) may be employed. These can further reduce the number of parts.

Further, in the structure integrating the structure of a pulse shifting unit, such as the condenser 284 and the resistor 285, into the driving pulse generating unit 252, as described above, presence or absence of a pulse shift for the column transfer pulses φV1 to φV6 may be switched with a controlling signal from an external circuit, such as the DSP 170. This structure allows a pulse shift which suits various imaging modes to be selected, as well as further number of parts to be reduced.

It is noted that there is a technique that a minus voltage is applied to a photo-shield film, and a plus voltage is applied to the photo-shield film at the time of a read-out operation in order to assist the read-out operation (See Japanese Unexamined Patent Application Publication No. 2005-109021, for example). According to this technique, however, a sufficient blooming control effect cannot be achieved in a region directly below a gate except a period of the read-out operation. In addition, dark-output occurring directly below the gate in the same period cannot be reduced. As described with reference to the embodiments, the present invention can sufficiently control blooming in the region directly below a gate except a period of a read-out operation, and reduce dark-output occurring directly below the gate in the same period.

There is another technique that the photo-shield film is utilized as a column transfer wiring. This technique is to: utilize the photo-shield film as a wiring running in a column direction when a transfer electrode is connected with a high-resistance wiring (using polysilicon as an electrode material) in a row direction; and provide a column transfer pulse, directly establishing a contact between the photo-shield film and each of transfer electrodes. Here, since the column transfer pulse, instead of a constant voltage, is applied to the photo-shield film, the above-described prior art cannot reduce blooming or dark-output. As described in the embodiments, however, the present invention directly works on a region below a transfer electrode, so that blooming can be controlled and dark-output can be decreased regardless of a structure of the photo-shield film.

Moreover, an IT solid-state imaging device is referred in the above first to fourth embodiments. Instead, the solid-state imaging device may employ the Frame Interline Transfer (FIT) scheme; that is, a solid-state imaging device including an accumulating unit provided between the column CCDS and a row CCD. In addition, the solid-state imaging device may employ a progress scheme; that is, three or more transfer electrodes are provided for one photodiode. In case of the FIT solid-state imaging device, a column transfer can be separately driven in an image area and the accumulating unit. There is a conventional technique to shift the transfer voltage in an accumulating unit in order to reduce an occurrence of dark-output. The present invention utilizes a driving scheme of the imaging area as a driving scheme of the present invention, so that a white defect and dark-output can be reduced in the imaging area, as well as blooming control and read-out voltage reduction become compatible.

Further, in the above first to fourth embodiments, a pulse generated in the driving pulse controlling unit directly represents a voltage based on input power supply of the driving pulse controlling unit. In some cases, pulse amplitude does not match to a value of a power source voltage itself due to a constant of a peripheral circuit. Even in these cases, setting of the column transfer pulse on a minus-side clearly provides the same effects described above.

Fifth Embodiment

Figure 25:
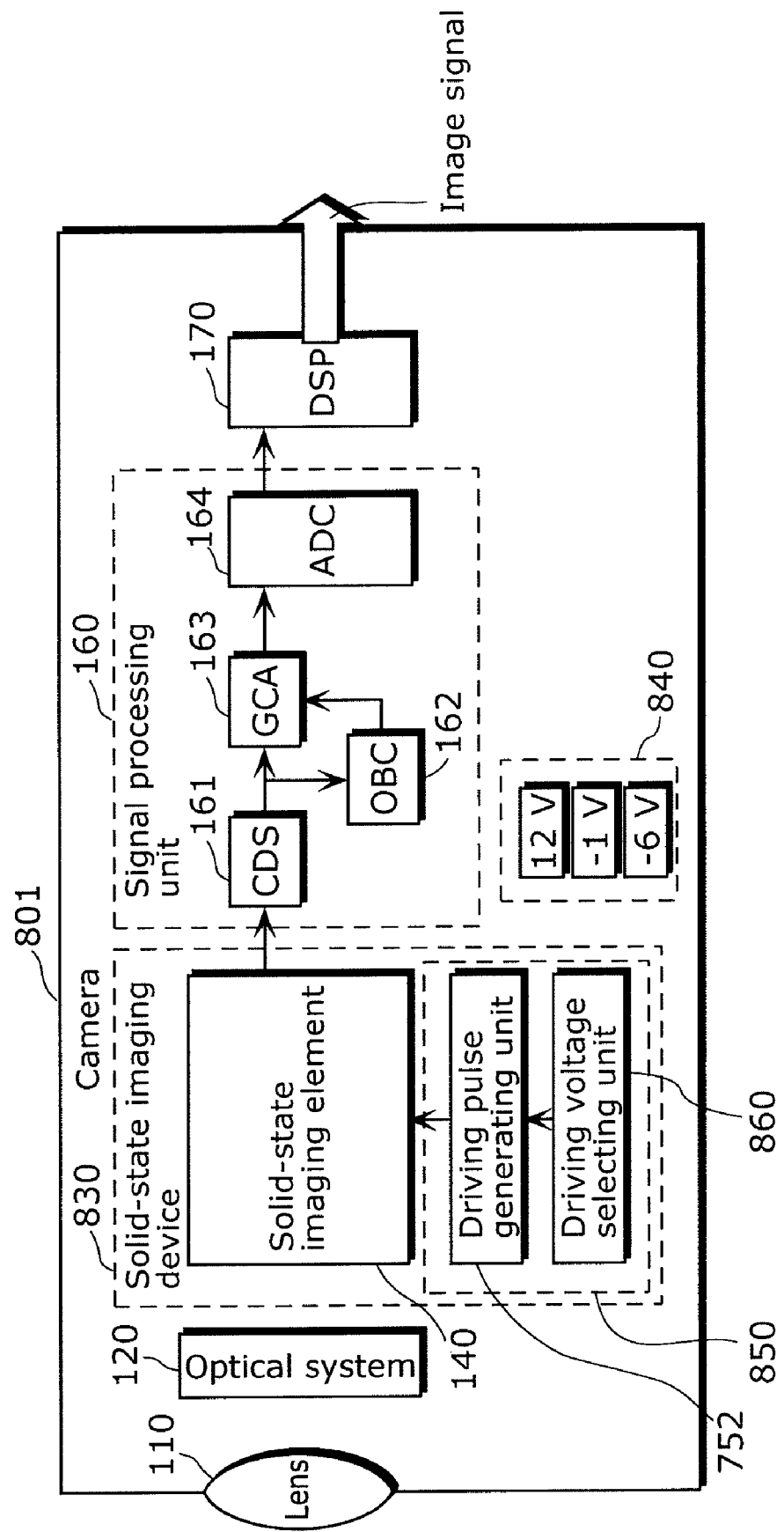
FIG. 25 shows a structure of a camera in a fifth embodiment of the present invention.

FIG. 25 shows a structure of a camera (imaging device) using a solid-state imaging device in a fifth embodiment. A camera 801 shown in FIG. 25 includes: the lens 110 forming an optical image of an object on a solid-state imaging element; an optical system 120 having a mirror optically processing the optical images passing through the lens 110, and a mechanical shutter; a solid-state imaging device 830 in the present invention; a camera power source 840 supplying power of 12 V, 0 V, −1 V and −6 V to the solid-state imaging device 830; the signal processing unit 160; and the digital signal processor (referred also to as "DSP", hereinafter) 170.

The solid-state imaging device 830 includes a solid-state imaging element 140 and a driving pulse controlling unit 850.

The solid-state imaging element 140, such as an CCD image sensor, generates a pixel signal in accordance with an amount of received light.

Following a direction from the DSP 170, the driving pulse controlling unit 850 controls the solid-state imaging element 140 by generating various driving pulses at various sets of timing, and providing for the solid-state imaging element 140. Specifically, the driving pulse controlling unit 850 controls the solid-state imaging element 140 by applying a driving pulse to a read-out gate and a non read-out gate on a column CCD in the solid-state imaging element 140. The driving pulse controlling unit 850 includes a driving pulse generating unit 752, and a driving voltage selecting unit 860.

The signal processing unit 160 includes: the CDS (Correlated Double Sampling) circuit 161 obtaining a difference between a field through signal and an output signal from the solid-state element 140; the OB clamp circuit 162 detecting an OB (Optical Black) level signal provided from the CDS circuit 161; the GCA (Gain Control Amplifier) 163 obtaining a difference between the OB level signal and an effective pixel signal level, and then adjusting a gain of the difference; and the ADC (Analogue-to-Digital Converter) 164 converting an analogue signal provided from the GCA 163 into a digital signal.

The DSP 170 performs signal processing on the digital signal provided from the ADC 164, and controls the driving pulse controlling unit 850.

Figure 26:
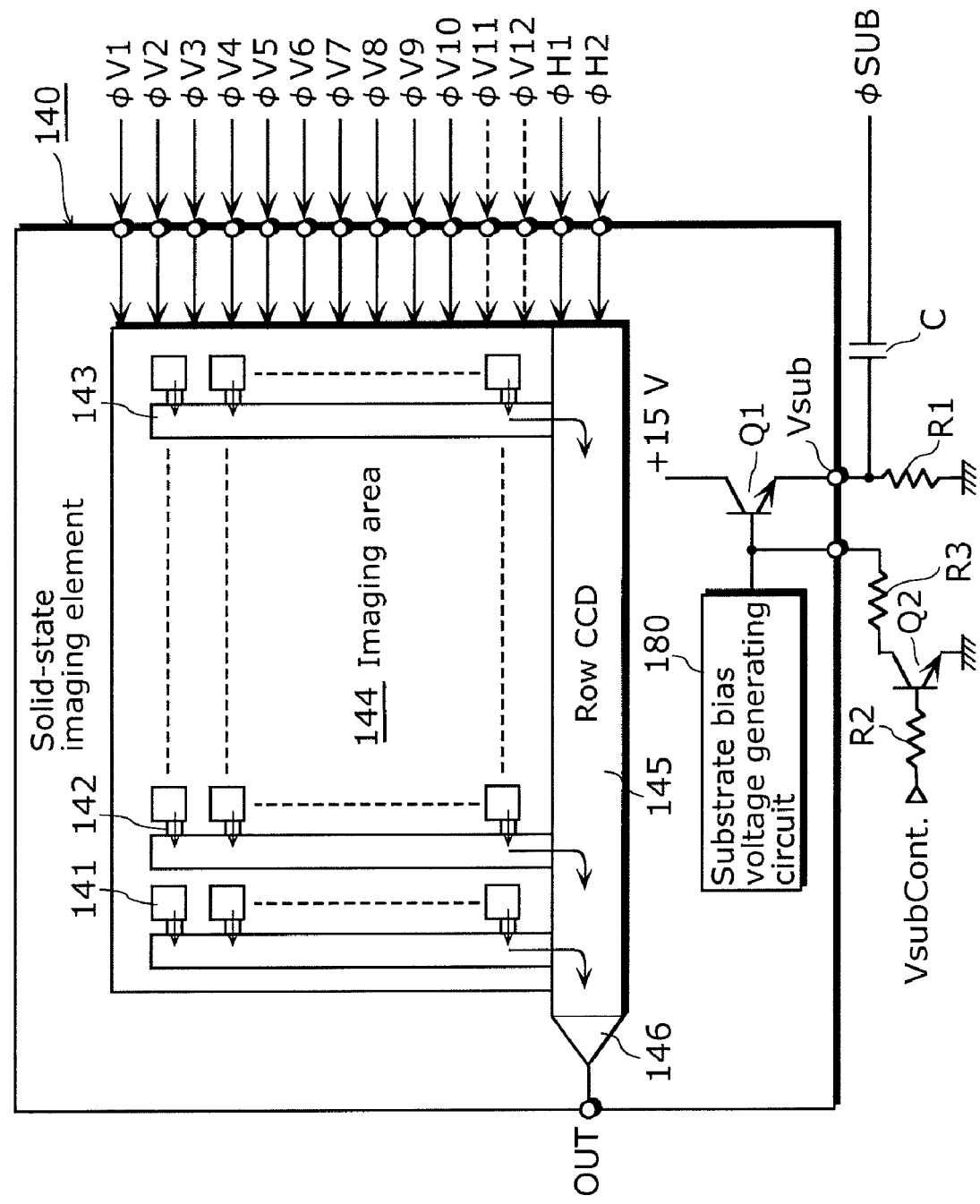
FIG. 26 is a block diagram showing a structure of a solid-state imaging element in the fifth embodiment.

FIG. 26 is a block diagram showing a structure of the solid-state imaging element 140 shown in FIG. 25.

As shown in FIG. 26, the solid-state imaging element 140, an interline-transfer (IT) CCD image sensor, includes: the semiconductor substrate (referred also to as a substrate, hereinafter) 147; the photodiodes 141 two-dimensionally arranged on the semiconductor substrate 147; the column CCDS 143; the row CCD 145; the output amplifier 146; the substrate bias voltage generating circuit 180; and the transistor Q1. In addition, FIG. 26 also illustrates the transistor Q2, the resistors R1 to R3, and the condenser C as a circuit for modulating a bias voltage (referred also to as a substrate bias, hereinafter) Vsub of the semiconductor substrate 147 on the solid-state imaging element 140.

The solid-state imaging element 140 is structured to preliminary increase in a saturating signal charge amount Qs to be decreased by controlling the substrate bias Vsub, expecting the decrease thereof in the event of a frame read-out.

Here, the frame read-out is a technique to read out signal charge on an odd-numbered line and signal charge on an even-numbered line on a field-to-field basis with the mechanical shutter of the optical system 120 (not shown) closed upon elapsing an exposure time. The technique is often used when recording a single still picture.

In FIG. 26, the photodiodes 141 are two-dimensionally arranged to form the imaging area 144. Each of the photodiodes 141 converts, to accumulate, incident light to signal charge in accordance with the amount of the incident light. Each of the photodiodes 141 is structured out of a pn-junction photodiode, for example. An application of a read-out pulse to the read-out gate part 142 of the column CCD 143 causes the signal charge accumulated in each of the photodiodes 141 in a column to be read out to the column CCD 143.

The column CCD 143 is provided for each of column lines having the photodiodes 141, and transfers in a column direction the signal charge read out from each of the photodiodes 141 to the row CCD 145 via the read-out gate part 142. The column CCD 143 has a read-out gate for reading out the signal charge, of the photodiode 141, to the column CCD 143, and a non read-out gate for performing a column transfer on the signal charge. Here, the read-out gate and the non read-out gate are provided to each of the photodiodes 141. In the case of an IT solid-state imaging element, transfer electrodes for transfer driving by column transfer clocks (driving pulse) φV1 to φV12 in 12 phases (read-out gate and non read-out gate) are alternatively arranged on each of the column CCDS 143. Upon applying the column transfer clocks φV1 to φV12 to the transfer electrodes, the signal charge read-out from each of the photodiodes 141 is sequentially transferred by the associated column CCD 143 in a column direction. This forwards the signal charge for one signal line (one line) from the column CCDS 143 to the row CCD 145 in a row blanking period. Out of the 12 phases of the column transfer clocks φV1 to φV12, the second, fourth, sixth, eighth, tenth, and twelfth column transfer clocks φV2, φV4, φV6, φV8, φV10, and φV12 possibly obtain alternatively changing two values; namely a LOW level voltage and a HIGH level voltage for a column transfer. On the contrary, each of the transfer electrodes to which the first, third, fifth, seventh, ninth, and eleventh column transfer clocks φV1, φV3, φV5, φV7, φV9, and φV11 are applied also serves as a read-out electrode for each of read-out gate parts 142. Thus, the column transfer clocks φV1, φV3, φV5 φV7, φV9, and φV11 possibly obtain alternatively changing three voltages; namely, the LOW level voltage, a MIDDLE level voltage, and the HIGH level voltage. The third HIGH level voltage pulse is a read-out pulse applied to the read-out gate part 142.

Here, the column transfer clocks φV1 to φV12 provided to the column CCD 143 are an example of driving pulses in the present invention. The LOW level voltage of the column transfer clocks φV1 to φV12 is an example of a fifth voltage in the present invention.

It is noted that in the case where the column CCD 143 is structured to perform transfer driving on column transfer clocks φV1 to φV6, out of six phases of the column transfer clocks φV1 to φV6, the second, fourth, and sixth column transfer clocks, φV2, φV4, and φV6 are applied to the non read-out gate, and the column transfer clocks φV1, φV3, and φV5 are applied to the read-out gate. The embodiment shall exemplify below the case of the twelve-phase drive.

The row CCD 145 sequentially transfers in a row direction the signal charge, for one line, transferred from the column CCDS 143 within one row scanning period, and forwards the signal charge via the output amplifier 146. Here, the signal charge is transferred in the in the row blanking period. The row CCD 145 is transfer-driven by two phases of the row transfer clocks φH1 and φH2, for example, and sequentially transfers in a row direction the signal charge, for one line, transferred from the column CCDS 143 in a row scanning period after the row blanking period.

The output amplifier 146 sequentially converts, to forward, the signal charge transferred in a row direction by the row CCD 145 into signal voltages.

The substrate bias voltage generating circuit 180 generates the substrate bias voltage Vsub, and applies the substrate bias voltage Vsub to the semiconductor substrate 147 via the transistor Q1. Controlled by the VsubCont signal, the substrate bias Vsub is set to a first bias voltage when the transistor Q2 is off, and a second bias voltage which is lower than the first voltage when the transistor Q2 is on.

The above solid-state imaging element 140 is formed on the semiconductor substrate 147. Various kinds of timing signals, including the substrate shutter pulse φSUB for sweeping the signal charge accumulated in the photodiodes 141 to the semiconductor substrate 147, are applied to the semiconductor substrate 147. It is noted that a substrate shutter function by the substrate shutter pulse φSUB is also referred to as an electronics shutter.

Figure 27:
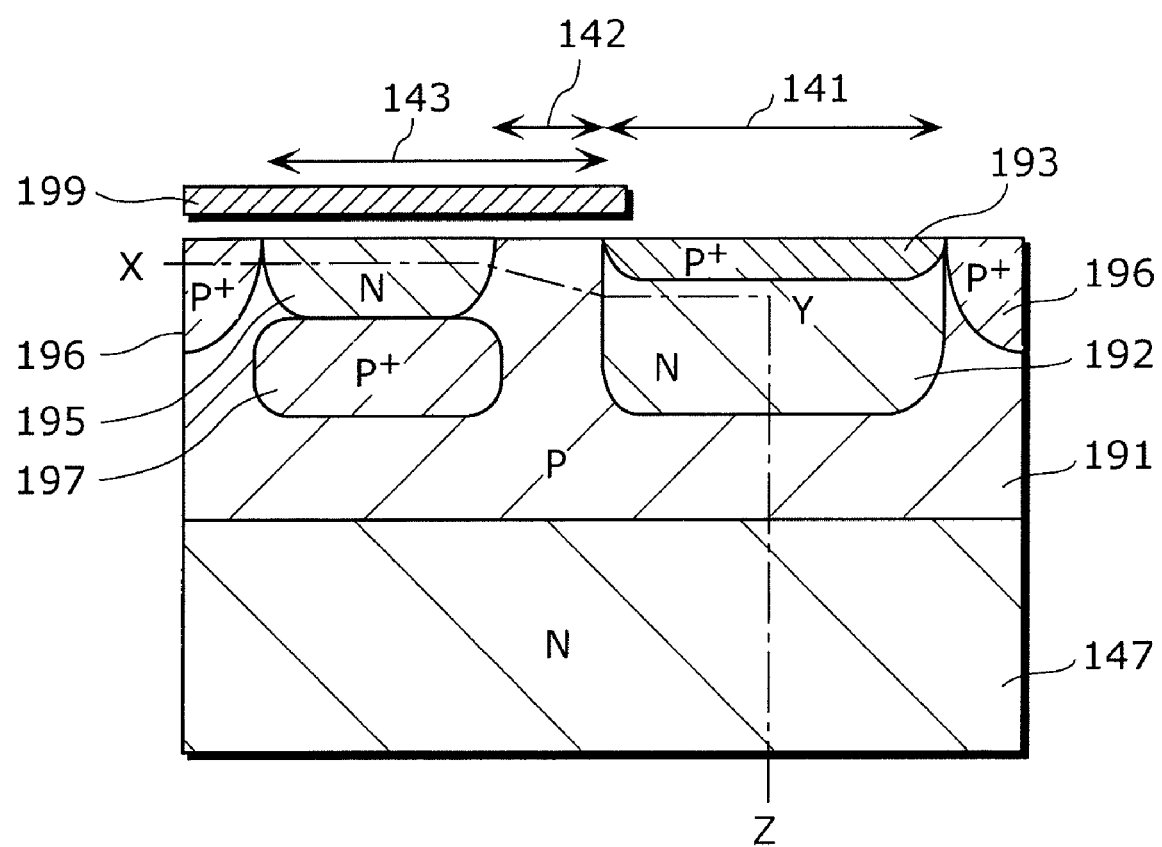
FIG. 27 is a cross-sectional view exemplifying the structure of the solid-state imaging element, in a substrate in-depth direction, in the fifth embodiment (the cross-sectional view taken from the line B-B' of FIG. 29)

FIG. 27 is a cross-sectional view showing a structure of the photodiodes 141 and the column CCD 143 in a substrate in-depth direction.

As shown in FIG. 27, the p-type well region 191 is formed on the n-type semiconductor substrate 147, for example. On the surface of the p-type well region 191, the $p^+$-type hole storage region 193 is formed. Under the hole storage region 193, the N-type signal charge accumulating region 192 is formed. The photodiodes 141 is structured to have the signal charge accumulating region 192 and the hole storage region 193.

Here, the n-type semiconductor substrate 147 exemplifies the semiconductor substrate of a first conductivity type in the present invention, and the p-type well region 191 the second conductivity type semiconductor substrate in the present invention. Further, the $p^+$-type hole storage region 193 exemplifies the first semiconductor region of a second conductivity type in the present invention, and the n-type signal charge accumulating region 192 the second semiconductor region of a first conductivity type in the present invention.

A charge amount of signal charge e accumulated in the photodiodes 141 is determined depending on height of a potential barrier of an overflow barrier OFB structured in the p-type well region 191. The overflow barrier OFB determines the saturating signal charge amount Qs accumulated in the photodiodes 141. In the case where accumulated signal charge exceeds the saturating signal charge amount Qs, an exceeding amount of the signal charge goes over the potential barrier and is swept to the semiconductor substrate 147 side.

As described above, the semiconductor substrate 147 has a photodiode 141 including a so-called vertical type overflow drain structure.

Along a crosswise direction in the photodiode 141, the n-type charge transfer region 195 and the $p^+$-type channel stopper region 196 are formed via a portion including the read-out gate part 142 in the p-type well region 191. The charge transfer region 195, a region for transferring the signal charge read-out from the photodiodes 141, is formed in the p-type well region 191. Under the charge transfer region 195, the $p^+$-type impurity diffusion region 197 is formed in order to prevent a smear component from incorporating.

Above the semiconductor substrate 147, the transfer electrode 199 made of polysilicon, for example, is disposed in order to be located above the charge transfer region 195.

The column CCD 143 is structured to have the charge transfer region 195 and the transfer electrode 199. A portion of the transfer electrode 199 lay above the p-type well region 191 serves as a gate electrode of the read-out gate part 142.

To the semiconductor substrate 147 is applied a substrate bias Vsub determining a charge amount of the signal charge accumulated in the photodiode 141 (in other words, determining a potential of the overflow barrier OFB).

Figure 28:
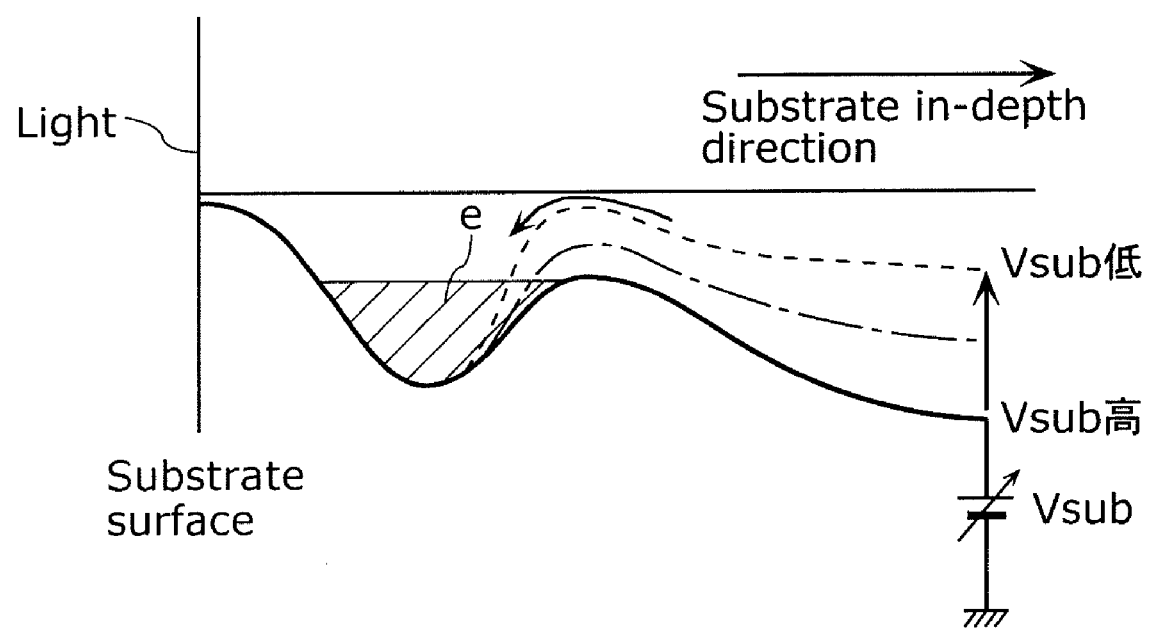
FIG. 28 shows potential distribution in a substrate in-depth direction of the photodiode.

FIG. 28 shows potential distribution in a substrate in-depth direction of the photodiode 141.

The charge amount of the signal charge e accumulated in the photodiode 141 is determined depending on height of a potential barrier of the overflow barrier OFB structured in the p-type well region. In other words, the overflow barrier OFB determines the saturating signal charge amount Qs accumulated in the photodiode 141. In the case where the accumulated charge amount exceeds the saturating signal charge amount Qs, an exceeding amount of the signal charge goes over the potential barrier and is swept to the semiconductor substrate 147 side. A potential of the overflow barrier OFB in such a vertical type overflow drain structure can be controlled by a overflow drain bias; namely, the substrate bias Vsub. In other words, the height of the barrier can be controlled by the substrate bias Vsub.

The driving pulse controlling unit 850 executes a long delay accumulating mode when the DSP 170 issues an instruction that the signal charge needs to be accumulated in the photodiode 141 for a time of two column periods or more (8 seconds, for example), and the mechanical shutter of the optical system 120 is opened.

When the instructed time elapses and the mechanical shutter is closed, the driving pulse controlling unit 850 finishes the execution of the long delay accumulating mode, transfer-drives the column CCDS 143 alone, and then executes a column CCD sweeping mode for sweeping channel noise of the column CCDS 143. Then, when the execution of the column CCD sweeping mode ends, the driving pulse controlling unit 850 causes: the column CCDS 143 to read out the signal charge accumulated in all the photodiodes 141, and to transfer the read-out signal charge from the column CCDS 143 to the row CCD 145; and the output amplifier 146 to forward the signal charge.

Figure 29:
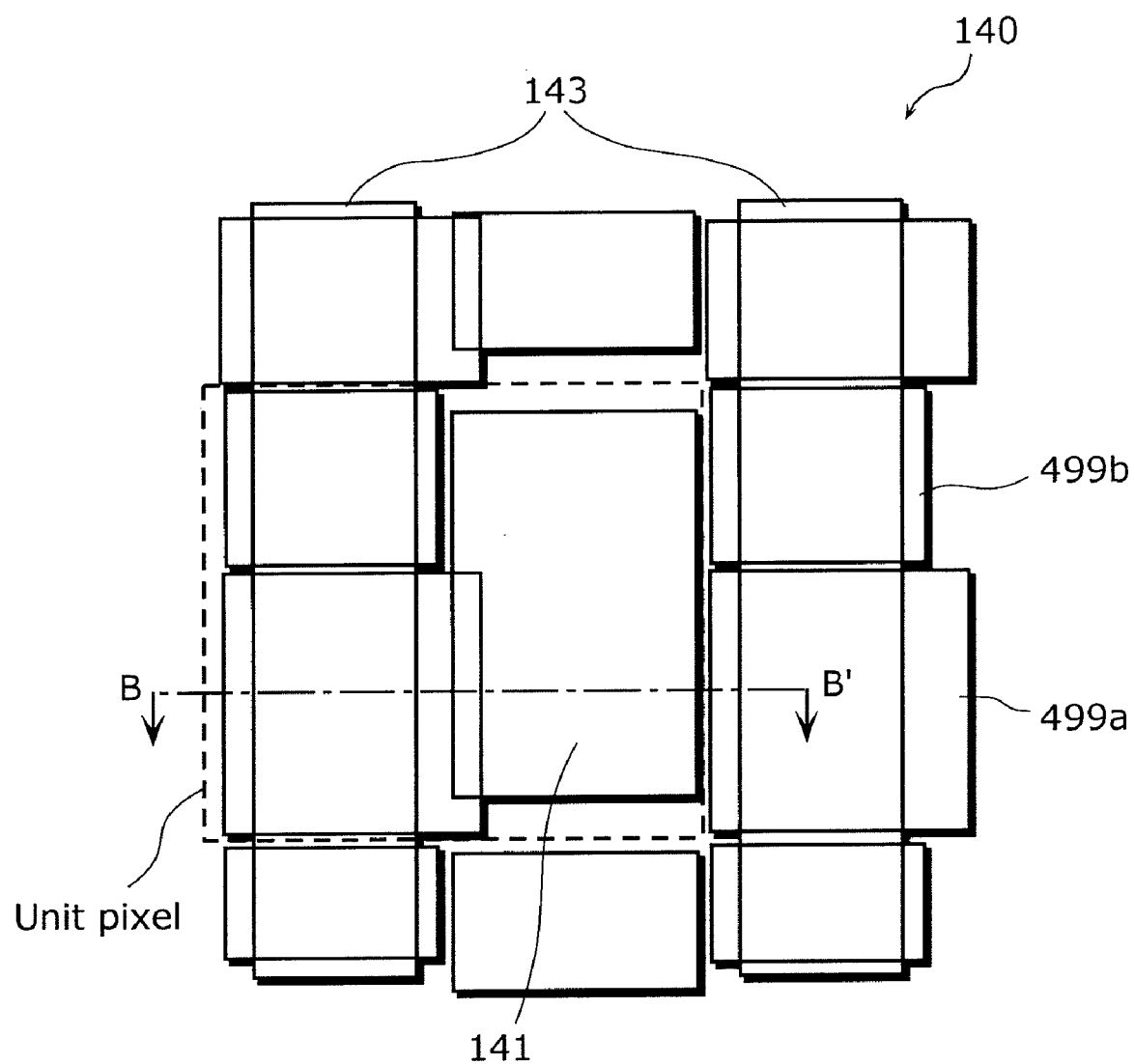
FIG. 29 shows an arrangement of a transfer electrode in the solid-state imaging element in the fifth embodiment.

FIG. 29 shows an arrangement of the transfer electrode 199 in the solid-state imaging element 140 of the embodiment.

In the solid-state imaging element 140, the transfer electrode 199 of the column CCD 143 is formed with the read-out gate 499a and the non read-out gate 499b alternatively arranged. The read-out gate 499a has a larger protrusion part toward the photodiodes 141 than that of the non read-out gate 499b, which facilitates a read-out operation.

Figure 30:
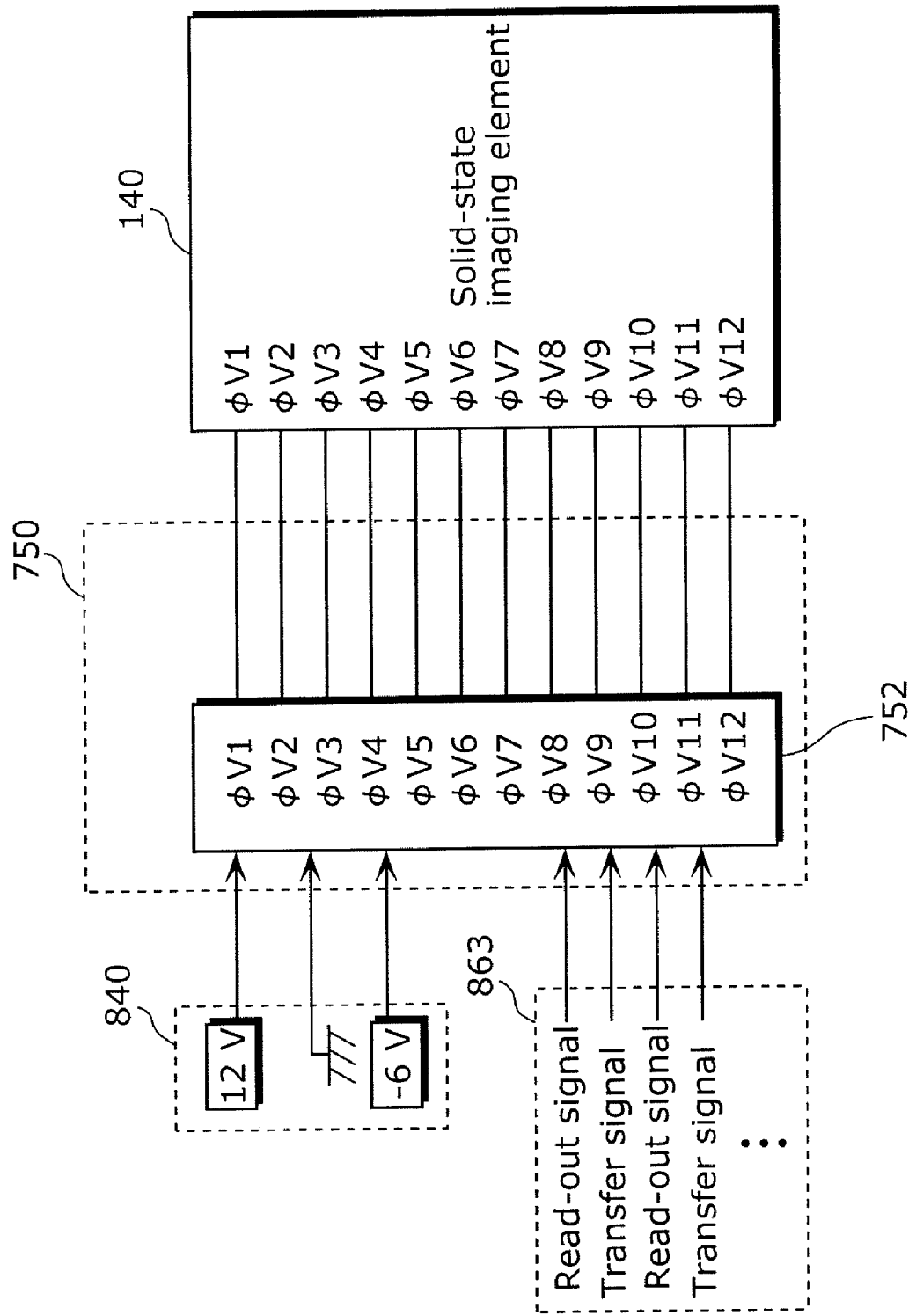
FIG. 30 shows a schematic structure of a conventional driving pulse controlling unit.

FIG. 30 shows a schematic structure of a conventional driving pulse controlling unit 750.

Figure 31:
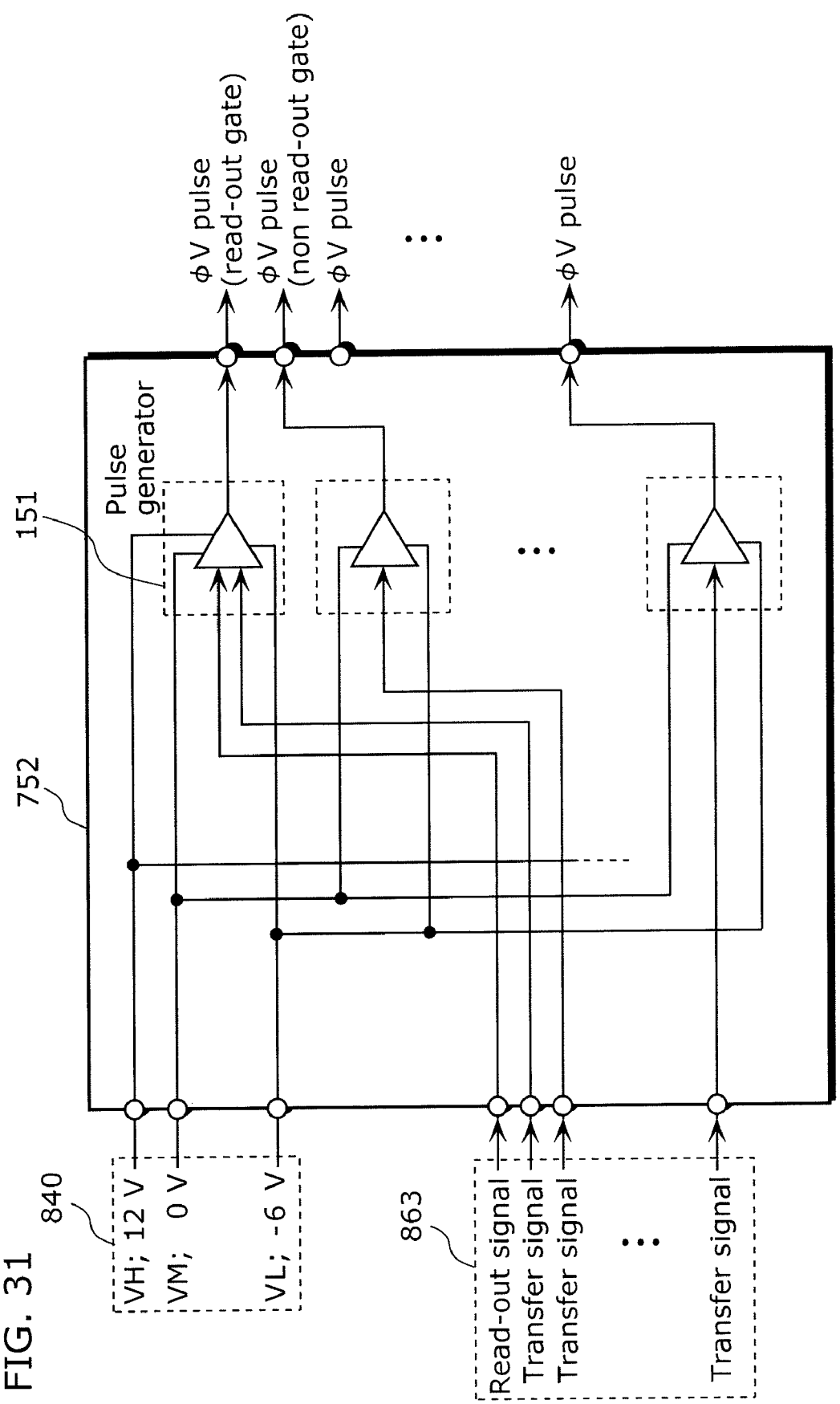
FIG. 31 shows a detailed structure of a conventional driving pulse generating unit.
Figure 32A:
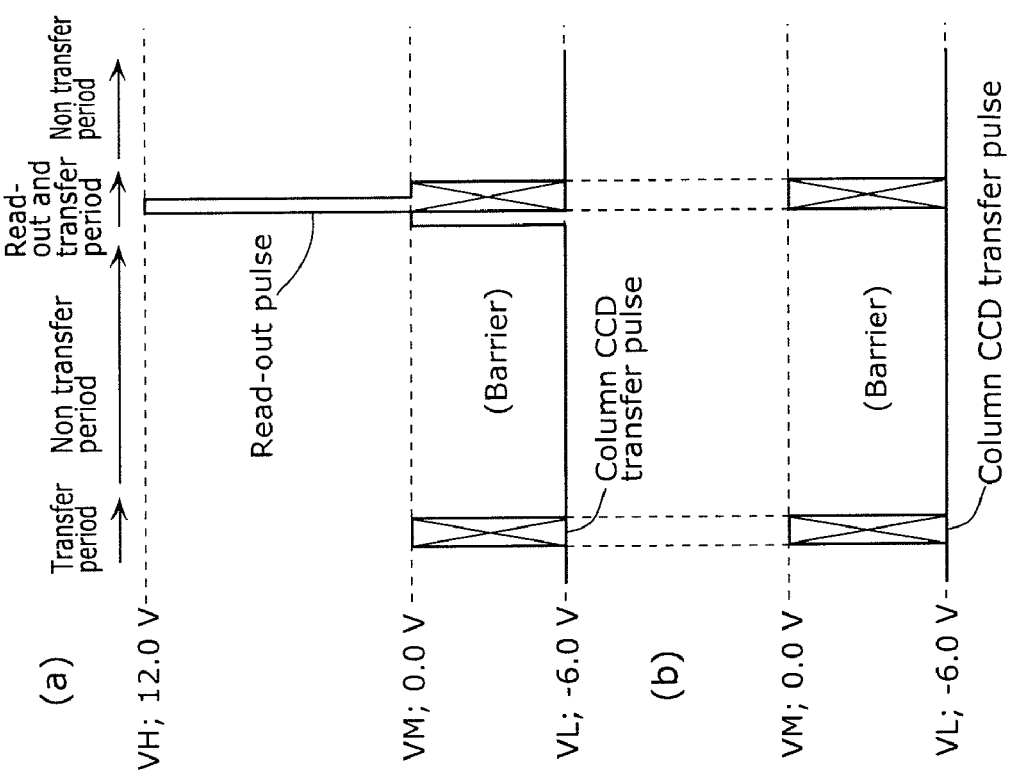
FIG. 32A exemplifies a column transfer clock provided from a conventional driving pulse controlling unit to a read-out gate and a non read-out gate.
Figure 32B:
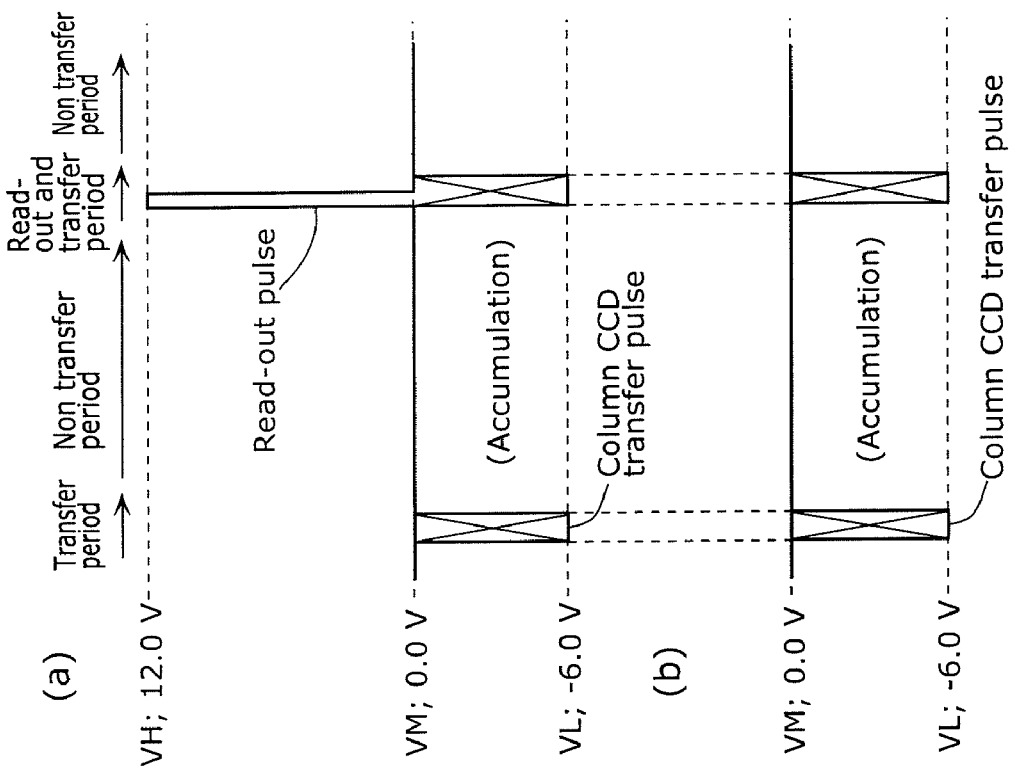
FIG. 32B exemplifies a column transfer clock provided from the conventional driving pulse controlling unit to the read-out gate and the non read-out gate.

FIG. 31 shows a structure of the conventional driving pulse generating unit 752 in the conventional driving pulse controlling unit 750. FIGS. 32A and 32B exemplify column transfer clocks provided from the driving pulse controlling unit 750 to the read-out gate 499a and the non read-out gate 499b. It is noted that FIGS. 32A(a) and 32B(a) exemplify column transfer clocks applied to the read-out gate 499a, and FIGS. 32A(b) and 32B(b) column transfer clocks applied to non read-out gate 499b.

The driving pulse generating unit 752 includes the pulse generator 151. Receiving power supply from the external camera power source 840, and a read-out signal and a transfer signal from a gate signal inputting unit 863, the pulse generator 151 generates column transfer clocks φV1 to φV12 to be applied to the column CCDS 143 in the solid-state imaging element 140.

Figure 33:
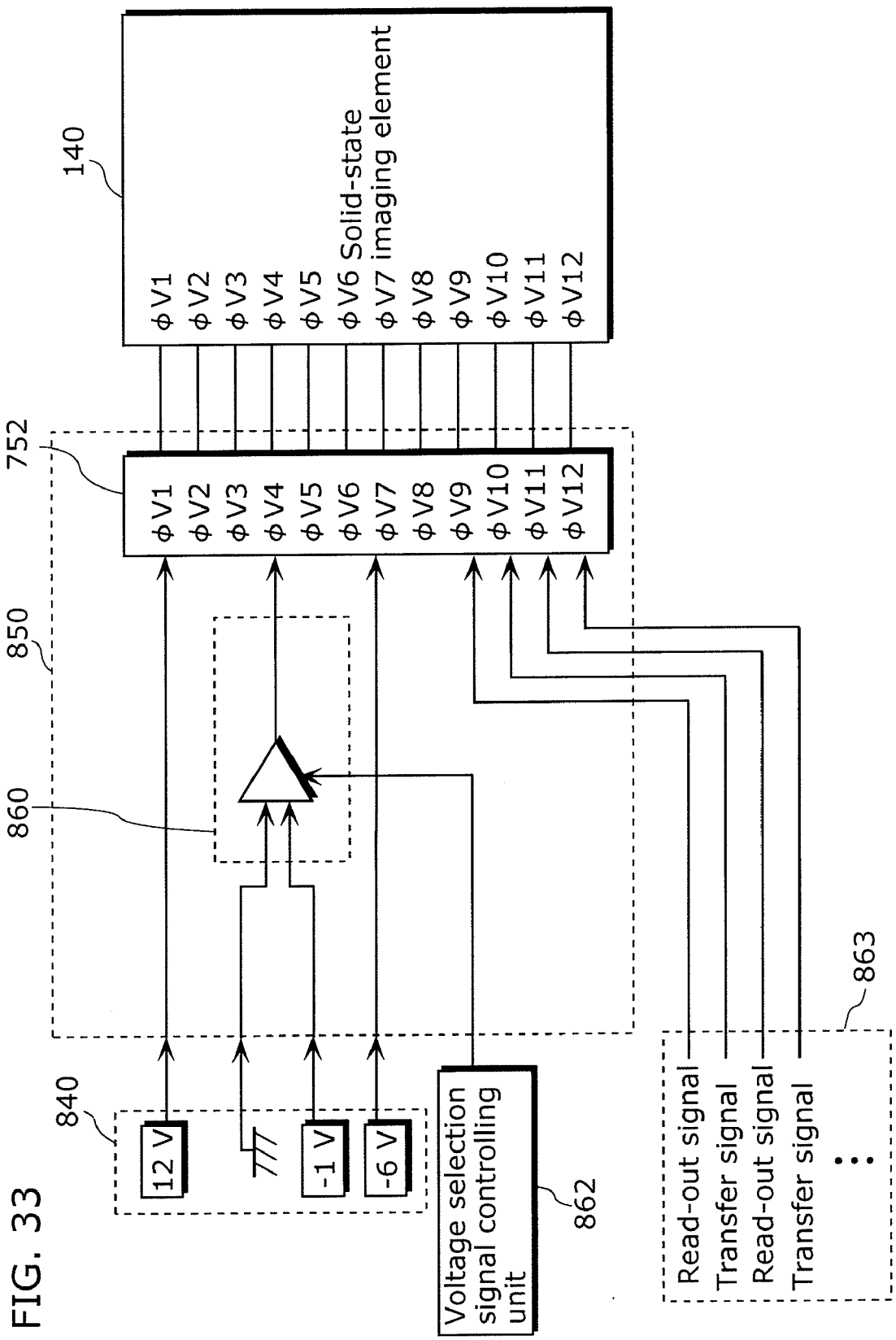
FIG. 33 shows a structure showing the driving pulse controlling unit in the fifth embodiment.
Figure 34A:
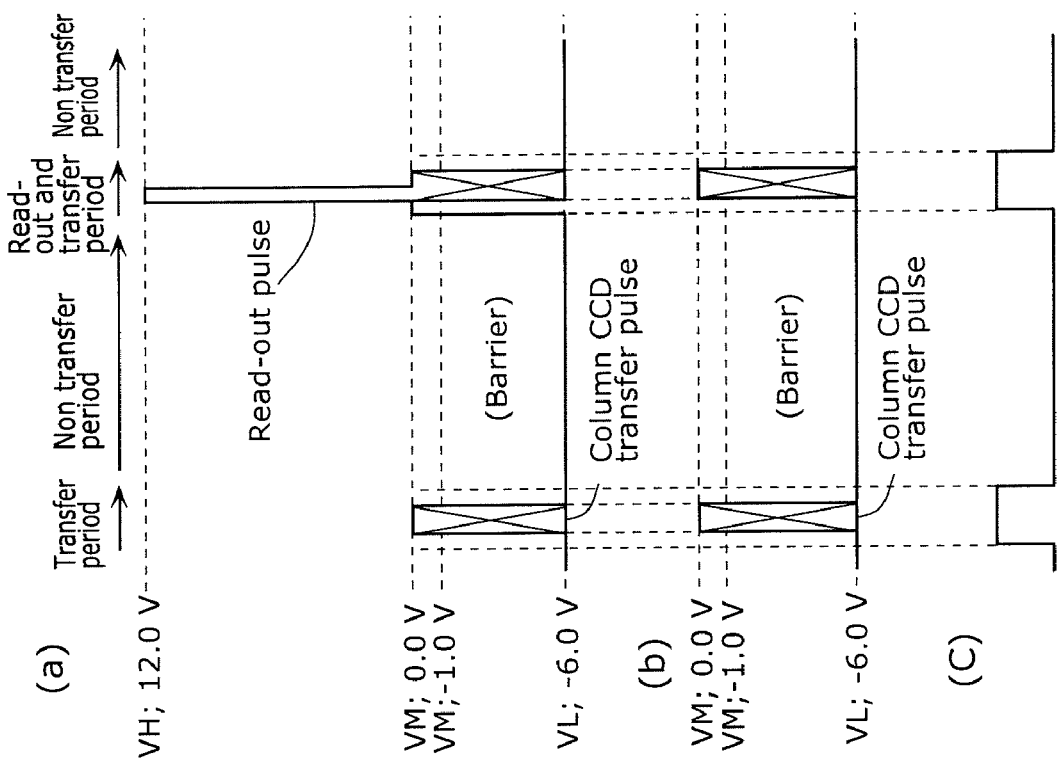
FIG. 34A exemplifies a relationship between a row blanking synchronizing signal and a column transfer clock provided from the driving pulse controlling unit in the embodiment to a read-out gate and a non read-out gate.
Figure 34B:
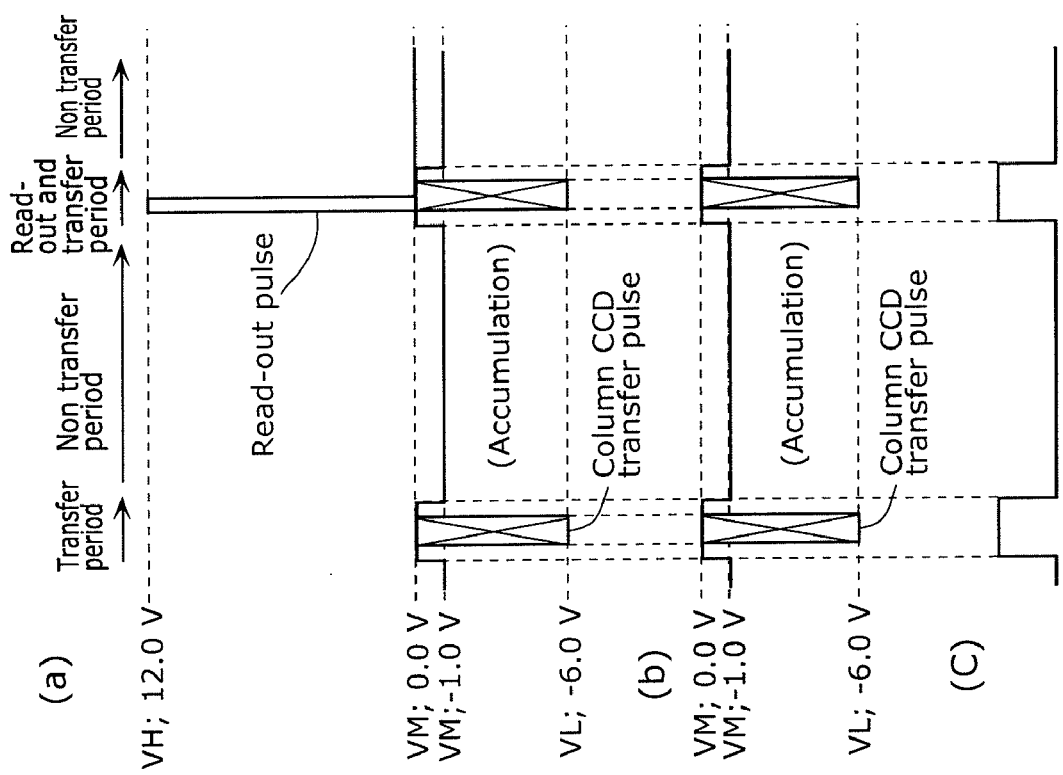
FIG. 34B exemplifies a relationship between a column transfer clock and a row blanking synchronizing signal provided from the driving pulse controlling unit in the embodiment to a read-out gate and a non read-out gate.

FIG. 33 shows a structure of the driving pulse controlling unit 850 in the embodiment. FIGS. 34A and 34B exemplify: the column transfer clocks provided from the driving pulse controlling unit 850 to the read-out gate 499a and the non read-out gate 499b; and a signal indicating a row blanking period. It is noted that FIGS. 34A(a) and 34B(a) exemplify column transfer clocks to be applied to the read-out gate 499a, FIGS. 34A(b) and 34B(b) column transfer clocks to be applied to non read-out gate 499b, and FIGS. 34A(c) and 34B(c) a signal showing a row blanking period.

The driving pulse controlling unit 850 includes the driving pulse generating unit 752, and the driving voltage selecting unit 860. Receiving power supply from the external camera power source 840, and a read-out signal and a transfer signal from a gate signal inputting unit 863, the driving pulse generating unit 752 generates column transfer clocks φV1 to φV12 to be applied to the column CCDS 143 in the solid-state imaging element 140. Out of power supplied to the driving pulse generating unit 752, the MIDDLE level voltages of −1 V and 0 V are switched by the driving voltage selecting unit 860. The column transfer clocks φV1 to φV12 provided from the driving pulse generating unit 752 are applied to the read-out gate 499a or the non read-out gate 499b in the solid-state imaging element 140.

Here, the 0 V MIDDLE level voltage of the column transfer clocks φV1 to φV12 is an example of a sixth voltage in the present invention, and the −1 V LOW level voltage a seventh voltage in the present invention.

On the basis of a voltage selection signal provided from a voltage selection signal controlling unit 862, the driving voltage selecting unit 860 switches the MIDDLE level voltage supplied from the external camera power source 840, and forwards either the −1 V or the 0 V to the driving pulse generating unit 752 as the MIDDLE level voltage. The voltage selecting signal is a synchronizing signal of which HIGH and LOW switch between: a period in which a voltage of the column transfer clocks changes, and thus a read-out and a column transfer of the signal charge is performed (referred to as a column transfer period, hereinafter); and a period in which the voltage change of the column transfer clocks is suspended to halt the column transfer of the signal charge, and thus accumulation of the signal charge is performed (referred to as a non column transfer period, hereinafter). On the basis of the voltage selecting signal, the driving voltage selecting unit 860 switches the MIDDLE level voltage in the column transfer period and the non column transfer period; that is, forwarding 0 V in the column transfer period and −1 V in the non column transfer period. It is noted that the voltage selection signal controlling unit 862 serves as a voltage selecting signal generating unit or a voltage selecting signal inputting unit.

In the solid-state imaging device 830 of the embodiment, the MIDDLE level voltage applied to the read-out gate 499a and the non read-out gate 499b is 0 V in the column transfer period, and a minus voltage (−1 V) in the non column transfer period. Since the non column transfer period is much longer than the column transfer period, setting the MIDDLE level voltage in the non column transfer period to a minus voltage (−1 V) and controlling to keep the potential of the read-out gate part 142 high and to increase hole concentration can significantly reduce blooming and a white defect. A typical column transfer period lasts approximately 90 percent as long as a non column transfer period or more. Moreover, in the column transfer period, a time to apply the MIDDLE level voltage to the read-out gate 499a and the non read-out gate 499b is down to a half of the column transfer period (the other half is for the LOW level voltage). Thus, in the column transfer period, an actual time for applying the MIDDLE level voltage to the read-out gate 499a and the non read-out gate 499b is very short; that is, five percent or shorter compared with that in the non column transfer period. Hence, in order to reduce blooming and a white defect, the potential of the read-out gate part 142 in the non column transfer period, occupying most of the transfer time, needs to be precisely controlled. Meanwhile, an electric potential difference, which significantly affects capacity of a charge packet in the column transfer period, between the MIDDLE level voltage and the LOW level voltage is secured as has conventionally been, reduction of transfer efficiency is not observed.

FIGS. 35A and 35B show potential distributions at a moment of a transfer with respect to a cross section, in a direction of a charge transfer, of the column CCD 143. It is noted that FIG. 35A shows potential distribution in the column transfer period, and FIG. 35B in the non column transfer period.

A saturation charge amount, a transferable maximum charge amount, depends more on an electric potential difference between the MIDDLE level voltage and the LOW level voltage in the column transfer period than on that in the non column transfer period. As shown in FIGS. 35A and 35B, this is because: movement of a part of electrons cannot follow an alternative change between the MIDDLE level voltage and the LOW level voltage; and a high potential barrier is required in the column transfer period, rather than in the non column transfer period in which the column transfer is suspended, in order to prevent a transfer charge amount from decreasing. FIG. 35A illustrates a moment at which a voltage of a column transfer clock changes from the MIDDLE level voltage to the LOW level voltage, showing that charge accumulated in a portion under a transfer electrode to which the column transfer clock φV1 is applied moves with a time-lag to a portion under another transfer electrode to which the column transfer clock φV2 is applied. Here, charge amounts of signal charge (a) in FIG. 35a and signal charge (b) in FIG. 35B are equal. Hence, by setting the MIDDLE level voltage in the column transfer period to 0 V and increasing the electric potential difference between the MIDDLE level voltage and the LOW level voltage in the column transfer period greater than in the non column transfer period, an adverse effect, such as reduction of a saturation charge amount, can be minimized.

Figure 36:
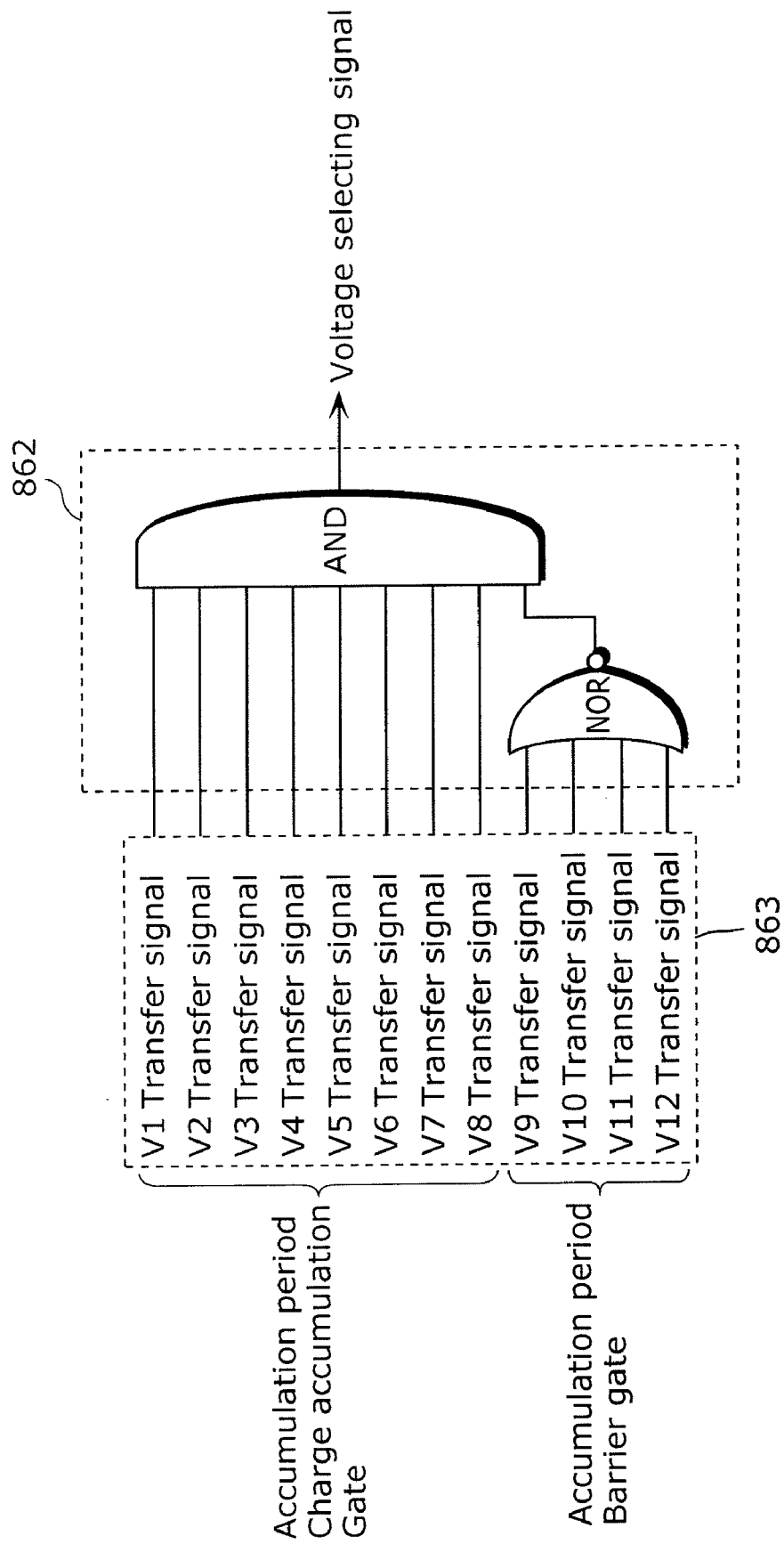
FIG. 36 exemplifies a logic circuit, generating a voltage selecting signal, in the fifth embodiment.

In addition, the voltage selecting signal as a reference signal switching the MIDDLE level voltage can be utilized without burdens, such as adding an extra unit to generate a signals. However, a change timing of the versatile row synchronization signal has a time-lag, compared with the switching timing between the column transfer period and the non column transfer period. In order to further reduce blooming and a white defect by reducing the time-lag, the voltage selection signal controlling unit 862 can also be structured with a simple logical circuit as shown in FIG. 36. The logical circuit provides the voltage selecting signal based on a result of a logical operation of a column transfer signal (V1 transfer signal to V12 transfer signal) for driving a different read-out gate 499*a* and a different non read-out gate 499*b*. Column transfer signals to be provided to the voltage selection signal controlling unit 862 are usually two values; namely HIGH and LOW. Receiving the column transfer signals, the voltage selection signal controlling unit 862 provides a voltage selecting signal with the MIDDLE level voltage of the column transfer pulse. Since an output signal from the voltage selection signal controlling unit 862 changes from LOW to HIGH upon changing from the non column transfer period to the column transfer period and from HIGH to LOW upon changing from the column transfer period to the non column transfer period. Thus, the MIDDLE level voltage can be switched between the 0 V and the minus voltage by eliminating a time-lag between a switching timing of the output signal between HIGH and LOW and the switching timing between the column transfer period and the non column transfer period. Hence, generating the voltage selecting signal by the voltage selection signal controlling unit 862 can improve effects of controlling blooming and reducing a white defect.

FIG. 36 exemplifies that there are eight gates for the column CCD 143 set to the MIDDLE level voltage and four gates for the column CCD 143 set to the LOW level voltage in the non column transfer period. Even in the case where the number of gates to be set to the MIDDLE level voltage or the LOW level voltage is different, a similar effect is apparently achieved.

Figure 37:
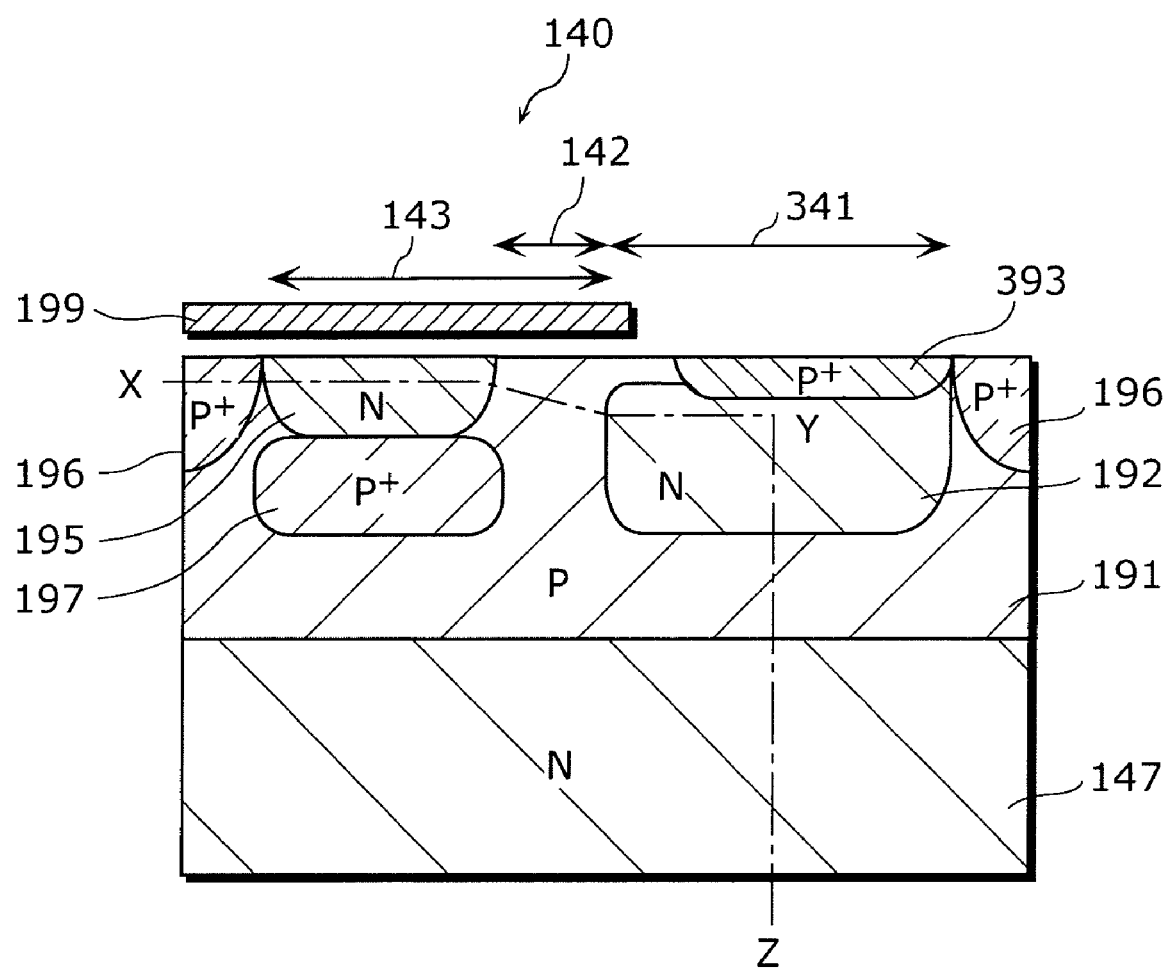
FIG. 37 is a cross-sectional view showing a modification example of a structure of the solid-state imaging element, in a substrate in-depth direction, of the fifth embodiment of the present invention (a cross-sectional view taken from the line B-B' of FIG. 29)

FIG. 37 is a cross-sectional view showing a modification example of the structure of the solid-state imaging element 140 (more preferable example of the solid-state imaging element 140 to that in FIG. 27). In particular, FIG. 37 is a cross-sectional view showing a structure of the photodiode 341 and the column CCD 143 in a substrate in-depth direction (a cross-sectional view taken from the line B-B' of the FIG. 29).

The solid-state imaging element 140 in the modification is different from the solid-state imaging element 140 shown in FIG. 27 in that the imaging the solid-state imaging element 140 in the modification has a photodiode 341 having a different cross-sectional structure from that of the photodiodes 141. The photodiodes 341 is structured to have the signal charge accumulating region 192 and a hole storage region 393. The signal charge accumulating region 192 and the hole storage region 393 are located beside the charge transfer region 195. A side portion, of the hole storage region 393, facing to the charge transfer region 195 recedes in a direction away from the charge transfer region 195 with respect to a side portion, of the signal charge accumulating region 192, facing to charge transfer region 195. Hence, a p-type layer, on the surface of the p-type well region 191, having high impurity concentration is intended to be formed at a position away from an edge of the transfer electrode 199.

The p-type layer (hole storage region 393) is structured to recombine to erase a dark-output noise electron with a sufficient hole concentration and control generation of noise. Here, the dark-output noise electron includes a white defect resulting from an interface state density in a silicon interface of the photodiode 341.

Forming this p-type layer having high impurity concentration close to the vicinity of an edge of the transfer electrode 199 possibly causes diffusion of a p-type impurity directly below the read-out gate, and fails to sufficiently decrease a potential at the time of a signal charge read-out operation. In addition, also the p-type layer having high impurity concentration works to fix the potential thereof to 0 V, so that the potential in the vicinity of a gate edge has difficulty in decreasing. As a result, residual read-out charge occurs and a sufficient read-out operation becomes difficult.

Figure 38A:
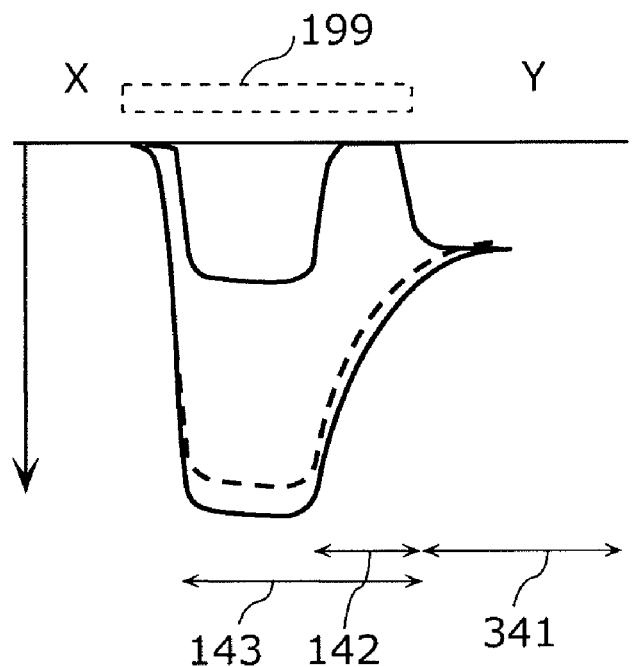
FIG. 38A shows potential distribution in a signal charge read-out operation.
Figure 38B:
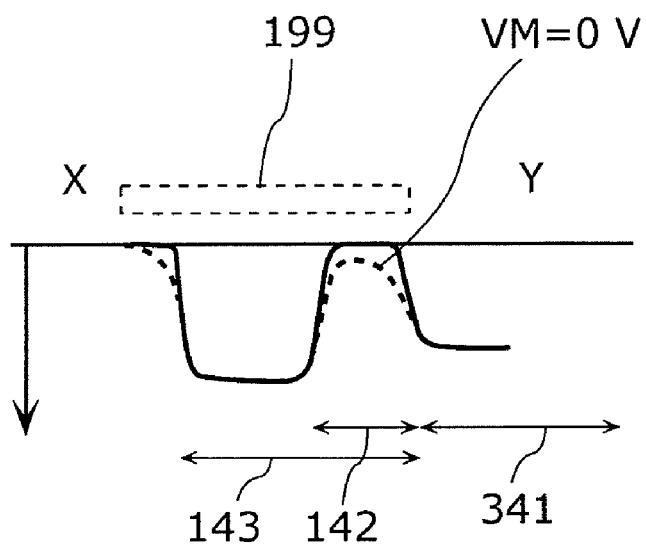
FIG. 38B shows potential distribution in a signal charge column transfer operation.

In order to prevent the above, the p-type layer having high impurity concentration in the photodiode 341 is formed, keeping a distance from the vicinity of the read-out gate. As shown in FIG. 38A, this allows the potentials of the photodiode 341 and the column CCD 143 to be sufficiently lowered at the time of the read-out operation. In addition, the column transfer clocks φV1 to φV12 themselves are minus voltages. Hence, as shown in FIG. 38B, an effect can be achieved except the time of the read-out operation, the effect which is similar to the case where the p-type impurity sufficiently exists up to directly below the transfer electrode 199.

Even in the case where the p-type layer having high impurity concentration exists close to the vicinity of the edge of the transfer electrode 199, a sufficient read-out operation can be performed by applying a high voltage to the transfer electrode 199. Here, since the p-type layer having high impurity concentration is fixed to 0 V, a significantly high electrical field is generated in the vicinity of the p-type layer having high impurity concentration, resulting in an occurrence of hot carrier. This may cause various deficiencies. This happens to all edges of electrodes to which an appropriate high voltage is applied, as well as to a read-out gate at which a read-out operation is performed. Hence, the p-type layer having high impurity concentration preferably keeps a distance from an edge of an electrode. A p-type layer function which tends to be insufficient at the surface can be compensated with minus voltages of the column transfer clocks φV1 to φV12.

As described above, the solid-state imaging device 830 in the embodiment appropriately controls the potential directly below the read-out gate. Thus, an effect such as reducing blooming and a dark signal can be achieved. Further, the solid-state device 830 in the embodiment is free from degradation of a transfer efficiency since switching the MIDDLE level voltage in the column transfer period and the non column transfer period.

Sixth Embodiment

Figure 39:
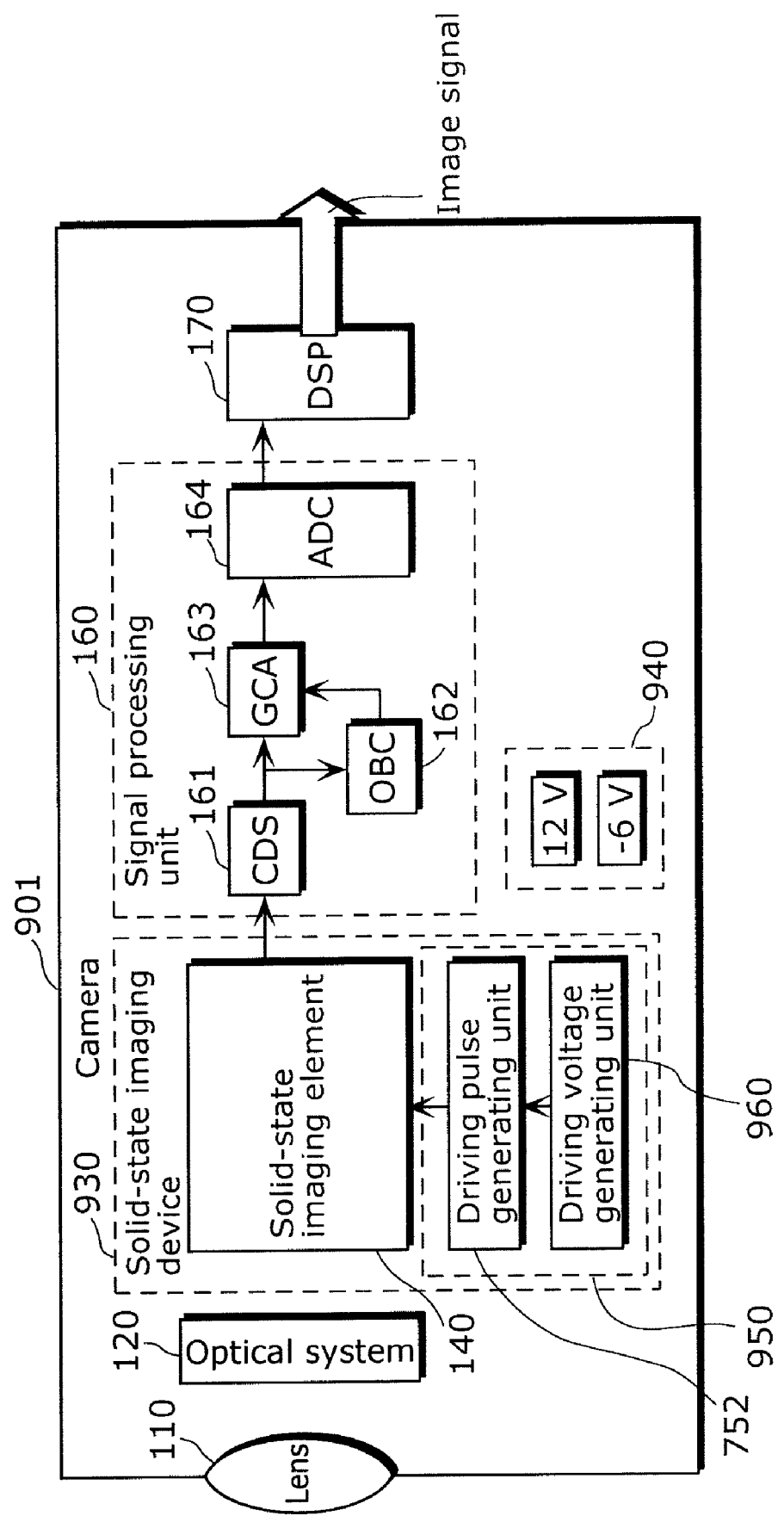
FIG. 39 shows a structure of a camera in a sixth embodiment of the present invention.

FIG. 39 is a camera 901 in a sixth embodiment.

The camera 901 in the embodiment is different from the camera 801 in the fifth embodiment in that the camera 901 includes a driving pulse controlling unit 950 and a camera power source 940 which have different structures from the driving pulse controlling unit 850 and the camera power source 840 in the fifth embodiment.

The driving pulse controlling unit 950 includes the driving pulse generating unit 752 and a driving voltage generation selecting unit 960 having a driving voltage selecting unit 961 and a negative potential generating circuit 964.

The camera power source 940 supplies power of 12 V, 0 V, and −6 V to the solid-state imaging device 930.

Figure 40:
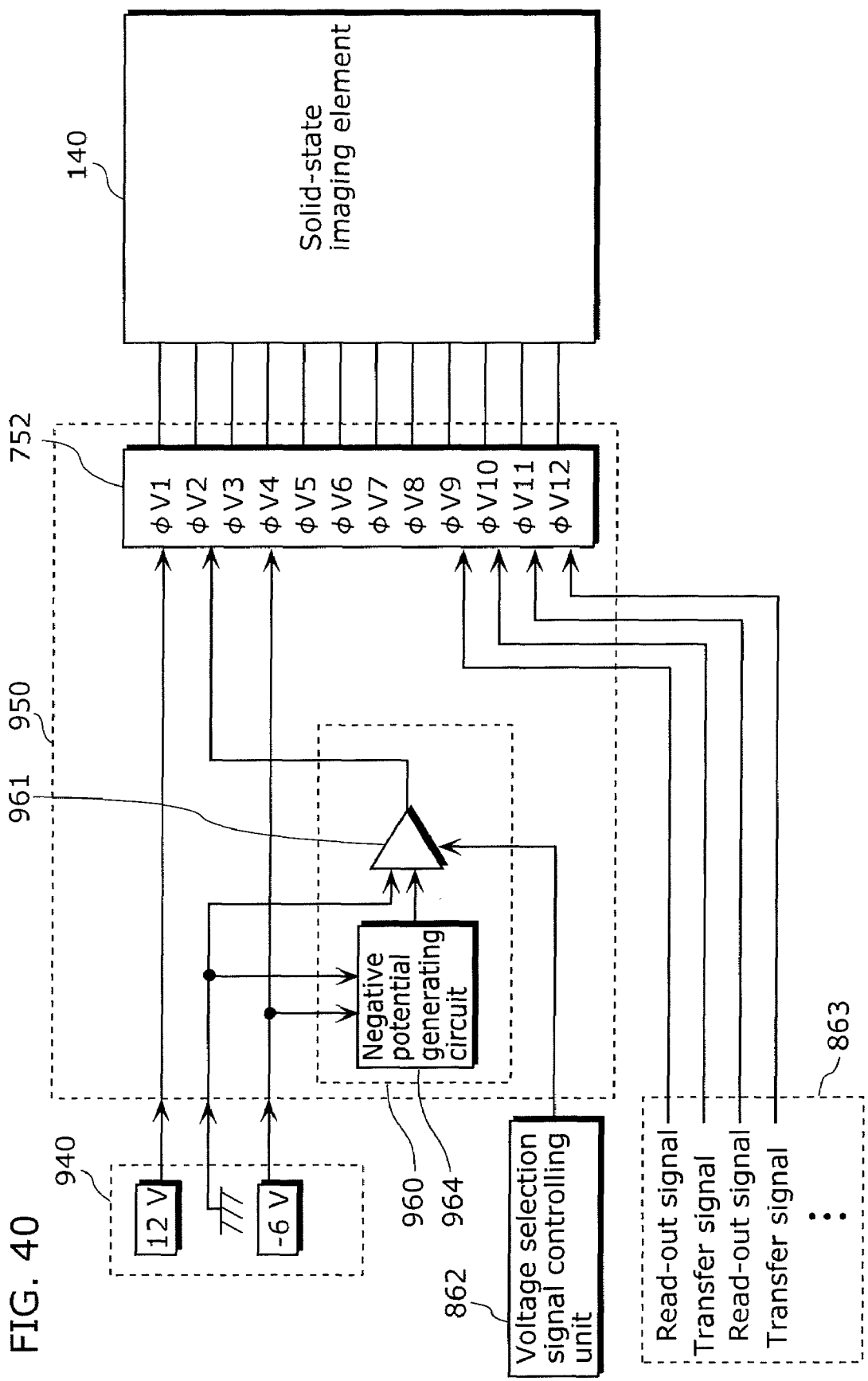
FIG. 40 shows a structure of a driving pulse controlling unit in the sixth embodiment.

FIG. 40 shows a structure of the driving pulse controlling unit 950 in the embodiment.

Receiving power supply from the external camera power source 940, and a read-out signal and a transfer signal from the gate signal inputting unit 863, the driving pulse generating unit 752 generates column transfer clocks φV1 to φV12 applied to the column CCDS 143 in the solid-state imaging element 140.

Out of power supplied to the driving pulse generating unit 752, the MIDDLE level voltage is switched between a voltage supplied from the external camera power source 940 (0 V)

and a voltage generated by the negative potential generating circuit 964 (−1 V, for example) by the driving voltage selecting unit 961. On the basis of the voltage selecting signal, the driving voltage selecting unit 961 switches the MIDDLE level voltage in the column transfer period and the non column transfer period in order to forward 0 V in the column transfer period and −1 V in the non column transfer period. The column transfer clocks φV1 to φV12 provided from the driving pulse generating unit 752 are applied to the read-out gate 499a or the non read-out gate 499b in the solid-state imaging element 140.

Figure 41:
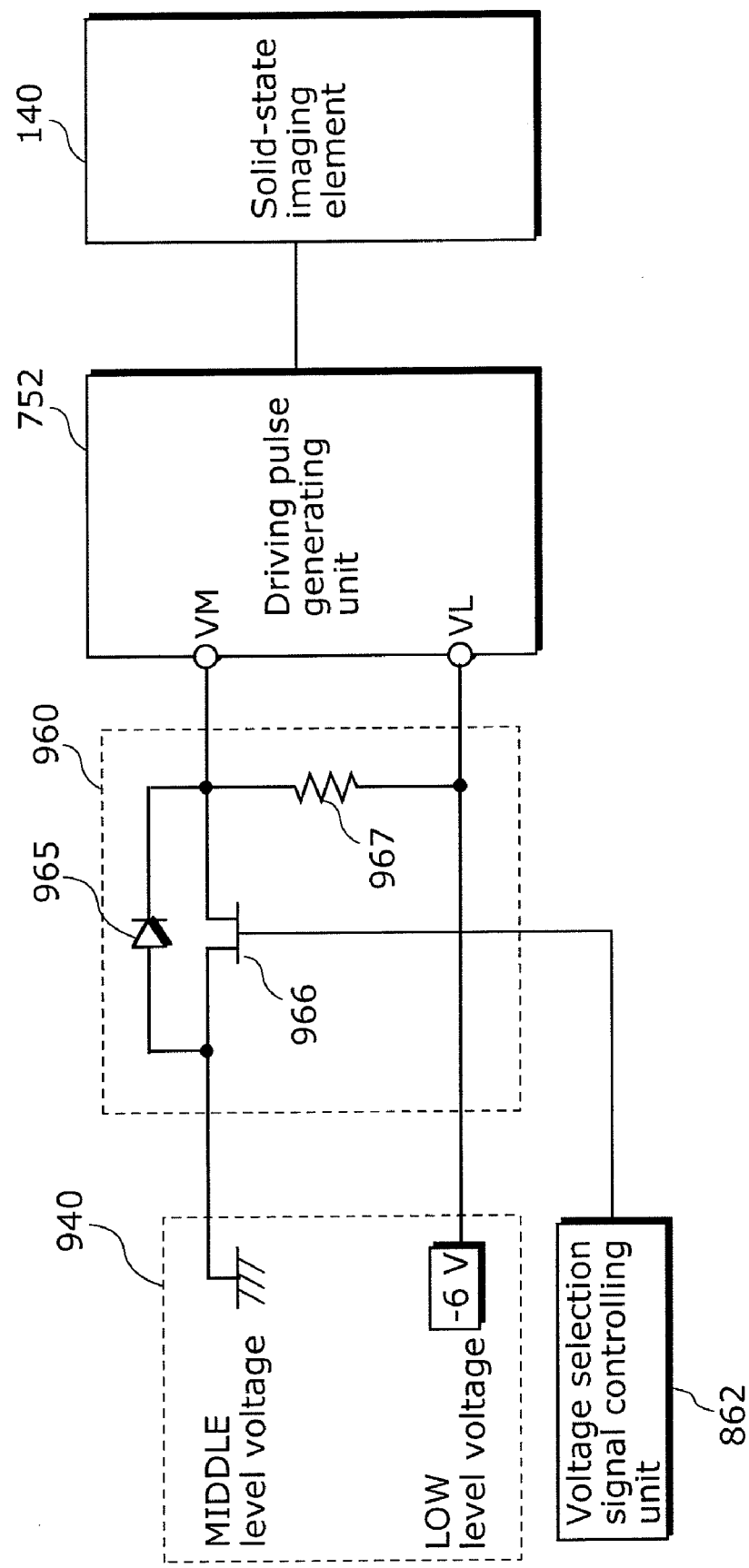
FIG. 41 exemplifies a detailed structure of a driving voltage generation selecting unit in the sixth embodiment.

FIG. 41 exemplifies a structure of the driving voltage generation selecting unit 960 in the embodiment.

In this driving voltage generation selecting unit 960, a serially-connected diode 965 and a discharging resistor 967 correspond to the negative potential generating circuit 964, and a field-effect transistor 966 corresponds to the driving voltage selecting unit 961.

As a result, the camera 901 needs to have no extra power source for the MIDDLE level voltage in a non column transfer period. Thus, integrating the driving voltage generation selecting unit 960 into a conventional camera allow the MIDDLE level voltage in the non column transfer period to be generated and switched. Moreover, according to the driving voltage generation selecting unit 960 in FIG. 41, the driving voltage generation selecting unit 960 can be structured in a small circuit. Thus, the embodiment is significantly viable.

Figure 42:
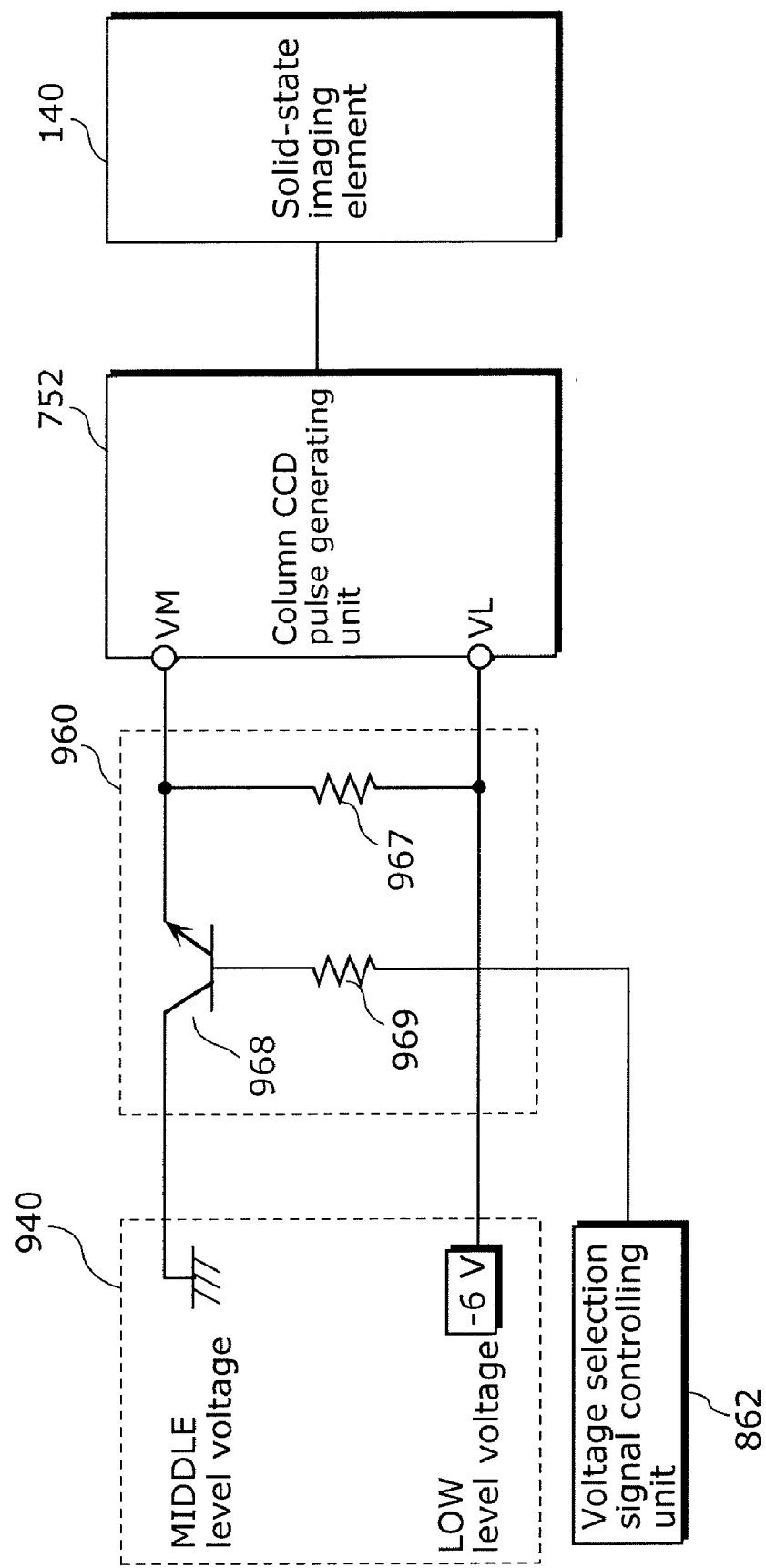
FIG. 42 exemplifies a detailed structure of the driving voltage generation selecting unit in the sixth embodiment.

FIG. 42 exemplifies a structure a modification example of the driving voltage generation selecting unit 960 in the embodiment.

Having a bipolar transistor 968, the discharging resistor 967, and a base resistance 969 in a circuit, the driving voltage generation selecting unit 960 works as the negative potential generating circuit 964 and the driving voltage selecting unit 961 combined. As described above, functions corresponding to the negative potential generating circuit 964 and the driving voltage selecting unit 961 can be integrated on a working circuit.

As described above, the solid-state imaging device 930 in the embodiment appropriately controls the potential directly below the read-out gate, as the solid-state imaging device 830 in the fifth embodiment controls. Thus, blooming can be controlled and a dark signal reduced. Further, the solid-state device 930 in the embodiment is free from degradation of transfer efficiency since switching the MIDDLE level voltage in the column transfer period and the non column transfer period.

It is noted that there is a technique that a minus voltage is applied to a photo-shield film, and a plus voltage is applied to the photo-shield film at the time of a read-out operation in order to assist the read-out operation (See Japanese Unexamined Patent Application Publication No. 2005-109021, for example). According to this technique, however, a sufficient blooming reduction effect cannot be obtained in a region directly below a gate except a period of the read-out operation. In addition, dark-output occurring directly below the gate in the same period cannot be reduced.

There is another technique that the photo-shield film is utilized as a column transfer wiring. This technique is to: utilize the photo-shield film as a wiring running in a column direction when a transfer electrode is connected with a high-resistance wiring (using polysilicon as an electrode material) in a row direction; and provide a column transfer clock, directly establishing a contact between the photo-shield film and each of transfer electrodes. Here, since the column transfer clock, instead of a constant voltage, is applied to the photo-shield film, the above-described prior art cannot reduce blooming or dark-output. Meanwhile, the present invention can sufficiently cope with such a solid-state imaging device.

Moreover, an IT solid-state imaging device is referred in the above fifth and sixth embodiments. Instead, the solid-state imaging device may employ the Frame Interline Transfer (FIT) scheme; that is, a solid-state imaging device including an accumulating unit provided between the column CCDS and a row CCD. In addition, the solid-state imaging device may employ a progress scheme; that is, three or more transfer electrodes are provided for one photodiode. In case of the FIT solid-state imaging device, a column transfer can be separately driven in an imaging area and the accumulating unit. There is a conventional technique to shift the transfer voltage in an accumulating unit in order to reduce an occurrence of dark-output. Utilizing the present driving technique to drive the imaging area, a white defect and dark-output can be reduced in the imaging area, as well as blooming control and read-out voltage reduction become compatible.

Since a solid-state imaging device having significant high-pixel density requires much time to output image data, and much time to accumulate signal charge to a photodiode increases. Thus, the solid-state imaging device is considerably affected by a defect out of dark-output. Hence, the present invention having effect of reducing a defect out of the dark-output is of great use in both of the IT and FIT schemes.

Further, in the above fifth and sixth embodiments, a pulse generated in the driving pulse controlling unit directly represents a voltage based on input power supply of the driving pulse controlling unit. In some cases, pulse amplitude does not match to a value of a power source voltage itself due to a constant of a peripheral circuit. Even in these cases, setting of MIDDLE level voltage on a minus-side clearly achieves the same effects described above.

In the above fifth and sixth embodiments, the MIDDLE level voltage having the minus voltage (−1 V) is supposed to be applied to both of the read-out gate and the non read-out gate. Even though the MIDDLE level voltage having the minus voltage (−1 V) is applied to one of either the read-out gate or the non read-out gate, setting of the MIDDLE level voltage on a minus-side clearly achieves the same effects described above.

Moreover, in the above fifth and sixth embodiments, even though the MIDDLE level voltage applied to the read-out gate and the non read-out gate is selectively set to the MIDDLE level voltage on a minus side in the non column transfer period, the same effects can be achieved. Further, a benefit that a driving voltage selecting unit can be simplified can be enjoyed.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention can be utilized for a solid-state imaging device. In particular, the present invention can be applicable to a high quality digital camera and video camera.

What is claimed is:

1. A solid-state imaging device comprising:
a solid-state imaging element including
a semiconductor substrate of a first conductivity type on which a second conductivity type well region is formed, photodiodes arranged two dimensionally on said semiconductor substrate, each of said photodiodes formed in the well region, and a column CCD having a read-out gate, a non read-out gate, and a charge transfer region, the read-out gate reading out signal charge of said photodiode and transferring the signal charge in a column direction, the non read-out gate transferring signal charge in a column direction, and the charge transfer region, which is formed in the well region, for transferring the read-out signal charge; and a driving pulse controlling unit configured to control said solid-state imaging element by applying a first driving pulse to each of read-out gates, wherein said driving pulse controlling unit transfers in a column direction signal charge within the charge transfer region by applying the first driving pulse to each of the read-out gates, the first driving pulse for alternating a first voltage at a MIDDLE level and a second voltage at a LOW level, and the first and the second voltages are minus voltages with respect to a potential of the well region.

2. The solid-state imaging device according to claim 1, wherein said driving pulse controlling unit generates the first driving pulse upon receiving the first and the second voltages from a power source.

3. The solid-state imaging device according to claim 1, wherein said photodiode includes a first semiconductor region of a second conductivity type formed on a surface of the well region, and a second semiconductor region of a first conductivity type formed under the first semiconductor region, the first and the second semiconductor regions are located beside the charge transfer region, and a side portion of the first semiconductor region, facing to the charge transfer region recedes in a direction away from the charge transfer region with respect to a side portion of the second semiconductor region, facing to the charge transfer region.

4. A camera comprising a solid-state imaging device according to claim 1.

5. The solid-state imaging device according to claim 1, wherein said driving pulse controlling unit includes:

a driving pulse generating unit configured to generate a second driving pulse alternating a third voltage at the LOW level and a fourth voltage at the MIDDLE level; and a pulse shifting unit configured to shift the second driving pulse by a predetermined voltage to generate the first driving pulse.

6. The solid-state imaging device according to claim 5, wherein said driving pulse controlling unit transfers in a column direction the signal charge within the charge transfer region by applying the second driving pulse to each of non read-out gates.

7. The solid-state imaging device according to claim 5, wherein said solid-state imaging element includes a diode, and said pulse shifting unit includes a clamp circuit causing the diode to shift the second driving pulse by a predetermined voltage.

8. A solid-state imaging device comprising:
a solid-state imaging element including
a semiconductor substrate of a first conductivity type on which a second conductivity type well region is formed,
photodiodes arranged two dimensionally on said semiconductor substrate, each of said photodiodes formed in the well region, and a column CCD having a read-out gate and a non read-out gate provided on each of said photodiodes, and a charge transfer region, the read-out gate reading out signal charge of said photodiode, the non read-out gate transferring the signal charge in a column direction, and the charge transfer region, which is formed in the well region, for transferring the read-out signal charge; and a driving pulse controlling unit configured to control said solid-state imaging element by applying a driving pulse to each of read-out gates and each of non read-out gates, wherein, in a column transfer period in which transfer of the signal charge in a column direction is performed, said driving pulse controlling unit transfers in a column direction signal charge within the charge transfer region by applying the driving pulse to each of the read-out gates and the non read-out gates, the driving pulse alternating a fifth voltage at a LOW level and a sixth voltage at a MIDDLE level, said driving pulse controlling unit applies a seventh voltage at the MIDDLE level to at least either each of the read-out gates or the non read-out gates in a non column transfer period in which the transfer of the signal charge is suspended, the seventh voltage is a minus voltage with respect to a potential of the well region, said photodiode includes a first semiconductor region of a second conductivity type formed on a surface of the well region, and a second semiconductor region of a first conductivity type formed under the first semiconductor region, the first and the second semiconductor regions are located beside the charge transfer region, and a side portion, of the first semiconductor region, facing to the charge transfer region recedes in a direction away from the charge transfer region with respect to a side portion, of the second semiconductor region, facing to the charge transfer region.

9. A camera comprising a solid state imaging device according to claim 8.

10. The solid-state imaging device according to claim 8, wherein said driving pulse controlling unit includes:

a driving voltage selecting unit configured to forward the sixth voltage in the column transfer period and the seventh voltage in the non column transfer period; and a driving pulse generating unit configured to generate the driving pulse upon receiving the sixth or the seventh voltages forwarded from said driving voltage selecting unit.

11. The solid-state imaging device according to claim 10, wherein said driving voltage selecting unit switches between the sixth and the seventh voltages with respect to a signal synchronizing a row scanning period, and forwards the switched voltage.

12. The solid-state imaging device according to claim 10, wherein said driving voltage selecting unit switches between the sixth and the seventh voltages and forwards the switched voltage with respect to a signal based on a result of a logical operation of the driving pulse applied to read-out gates and non read-out gates.

13. The solid-state imaging device according to claim 10, wherein said driving pulse controlling unit further includes a negative potential generating unit configured to generate the seventh voltage out of power supply.

14. A driving method for a solid-state imaging device including: a solid-solid-state imaging element having a semiconductor substrate of a first conductivity type on which a second conductivity type well region is formed, photodiodes arranged two dimensionally on the semiconductor substrate, each of the photodiode formed in the well region, and a column CCD having a read-out gate, a non read-out gate, and a charge transfer region, the read-out gate reading out signal charge of the photodiode and transferring the signal charge in a column direction, the non read-out gate transferring signal charge in a column direction, and the charge transfer region, which is formed in the well region, for transferring the read-out signal charge; and a driving pulse controlling unit controlling the solid-state imaging element by applying a first driving pulse to each of read-out gates, said driving method comprising
transferring in a column direction signal charge within the charge transfer region by applying the first driving pulse to each of the read-out gates, the first driving pulse alternating a first voltage at a MIDDLE level and a second voltage at a LOW level,
wherein both of the first and the second voltages are minus voltages with respect to a potential of the well region.

15. The driving method for the solid-state imaging device according to claim 14,
wherein the first driving pulse is generated by shifting a second driving pulse by a predetermined voltage, the second driving pulse alternating a third voltage at the LOW level and a fourth voltage at the MIDDLE level.

16. The driving method for the solid-state imaging device according to claim 15,
wherein the second driving pulse is applied to each of non read-out gates in said transferring the signal charge in a column direction.

17. A driving method for a solid-state imaging device including: a solid-state imaging element having a semiconductor substrate of a first conductivity type on which a second conductivity type well region is formed, photodiodes arranged two dimensionally on the semiconductor substrate, each of the photodiodes formed in the well region, and a column CCD having a read-out gate and a non read-out gate provided on each of the photodiodes, and a charge transfer region, the read-out gate reading out signal charge of the photodiode, the non read-out gate transferring signal charge in a column direction, and the charge transfer region, which is formed in the well region, for transferring the read-out signal charge; and a driving pulse controlling unit controlling the solid-state imaging element by applying a driving pulse to each of read-out gates and each of non read-out gates, said driving method comprising: transferring in a column direction signal charge within the charge transfer region by applying the driving pulse to each of the read-out gates and the non read-out gates, said transferring performed in a column transfer period in which the transfer of the signal charge is performed in a column direction, and the driving pulse alternating a fifth voltage at a LOW level and a sixth voltage at a MIDDLE level; and
applying a seventh voltage at the MIDDLE level to at least either each of the read-out gates or each of the non read-out gates in a non column transfer period in which the transfer of the signal charge in a column direction is suspended,
wherein the seventh voltage is a minus voltage with respect to a potential of the well region.

18. The driving method for the solid-state imaging device according to claim 17, comprising
generating the driving pulse upon receiving the sixth and the seventh voltages forwarded from a driving voltage selecting unit forwarding the sixth voltage in the column transfer period and the is seventh voltage in the non column transfer period.

* * * * *